United States Patent [19]

Lindhorst

[11] Patent Number: 5,386,570
[45] Date of Patent: Jan. 31, 1995

[54] METHOD FOR A TWO PASS COMPILER WITH THE SAVING PARSE STATES FROM FIRST TO SECOND PASS

[75] Inventor: Gregory S. Lindhorst, Woodinville, Wash.

[73] Assignee: Hewlett-Packard Company, Palo Alto, Calif.

[21] Appl. No.: 66,687

[22] Filed: May 24, 1993

[51] Int. Cl.6 .............................................. G06F 9/44
[52] U.S. Cl. ............................... 395/700; 364/DIG. 1; 364/280.4; 364/280.5; 364/280
[58] Field of Search ............... 395/700; 364/DIG. 1

[56] References Cited

U.S. PATENT DOCUMENTS

| 4,667,290 | 5/1987 | Goss et al. | 364/300 |
|---|---|---|---|
| 4,914,585 | 4/1990 | Packard et al. | 364/200 |
| 5,170,456 | 12/1992 | McKeeman et al. | 395/700 |
| 5,182,806 | 1/1993 | McKeeman et al. | 395/700 |
| 5,193,191 | 3/1993 | McKeeman et al. | 395/700 |
| 5,230,049 | 7/1993 | Chang et al. | 364/700 |
| 5,276,881 | 1/1994 | Chan et al. | 395/700 |

OTHER PUBLICATIONS

Mason, Tony and Brown, Doug, "lex & Yacc", O'-Reilly & Associates, Inc., 1990, pp. 1-20.
Aho, Alfred V., Sethi, Ravi and Ullman, Jeffrey D., "Compilers: Principles, Techniques, and Tools", Addison-Wesley Publishing Company, 1986, pp. 105-113, 257-266.

*Primary Examiner*—Kevin A. Kriess
*Assistant Examiner*—Majid A. Banankhah

[57] ABSTRACT

A system which scans and parses input source code of a computer programming language during a first pass, and saves the parse states to be replayed during a second pass. Therefore, the source file is not rescanned nor is it reparsed during the second pass. The parse states are replayed during the second pass, reexecuting all the parser actions in the grammar in the same order during the second pass that they were originally recorded during the actual parsing in the first pass. This eliminates the need to rescan and reparse the original input language, reducing the processing time of the compiler. The user specifies what code is to be executed during each pass, and the system also provides facilities for communication between the passes.

29 Claims, 27 Drawing Sheets

METHOD FOR A TWO PASS COMPILER WITH THE SAVING PARSE STATES FROM FIRST TO SECOND PASS

COPYRIGHT NOTICE

A portion of the disclosure of this patent document contains material which is subject to copyright protection. The copyright owner has no objection to the facsimile reproduction by any one of the patent disclosure, as it appears in the Patent and Trademark Office patent files or records, but otherwise reserves all copyright rights whatsoever.

FIELD OF THE INVENTION

This invention relates to computer systems and more particularly to language compilers within such computer systems. Even more particularly, the invention relates to a method of creating an efficient two pass language compiler.

BACKGROUND OF THE INVENTION

Compilers are programs which run on digital computers to convert one language into another language. Typically, the language being converted, called the source language, is a language that is easily read and understood by a computer programmer skilled in the programming arts. The source language is typically translated into a target language, which is often the machine language for the computer on which the compiler itself runs. The target or machine language is typically understandable only by the computer itself.

A compiler typically reads each statement of the source language, and translates that statement into one or more target language statements. In some languages, a "forward reference" is allowed, wherein a language statement at one location in the source file refers to information that occurs at a later point in the source file. When this occurs, the compiler cannot complete the translation the first time it reads the source statement since it does not know where the forward reference is located. Thus, when forward references are allowed, the compiler must make two or more passes over the source code in order to completely compile the source code into a target language, such as machine code or an intermediate code for later optimization.

Compilers are often constructed using two major sections, called a lexical scanner and a parser. The lexical scanner, often just called the scanner, reads the source statements and separates each word symbol or number from the source statement into a "token". Each token is given a symbolic reference, often a number, and this symbolic reference is passed to the parser section of the compiler. The parser section of the compiler processes multiple tokens to separate the tokens into statements which are valid in the language. That is, the scanner separates the source code into a stream of tokens, then the parser analyzes multiple tokens to determine whether the tokens match a statement within the language. Once the parser finds a match between one or more tokens and a valid statement in the language, a parser action routine is called to output target language code corresponding to the statement of the language.

Multiple passes for a compiler can take many forms. One form is to scan and parse the source language during a first pass, obtaining the required type information for the variables within the source, and then rescan and reparse the source again during a second pass using this type information to actually create the target language code. Thus, the first pass resolves the location of all information, so that during the second pass the location of all forward references is known and correct target language code can be created. Although it is relatively easy to use this technique to change an existing one pass compiler into a multi-pass compiler, this approach requires scanning and parsing the source code twice, thus adding significantly to the time required to compile the source into the target language. Another approach is to scan and parse the source code once, saving the needed type information and the parse trees for a second pass, which uses only the parse trees. This technique also works well, however, it generally affects the fundamental design of the entire compiler, for example requiring parsing rules be defined separately for the second pass, thus making it a difficult process when retrofitting an existing compiler from one pass to two passes.

In most cases, two passes are all that are required to successfully convert the source code into target language code.

There is need in the art then for efficient two pass compilers that do not rescan and reparse the source language. There is further need in the art for compilers that are easy to understand for the compiler writer with the ability to retrofit older one pass compilers into two pass compilers. Still another need in the art is for two pass compilers that keep the code for both passes together in the compiler source code.

SUMMARY OF THE INVENTION

It is an aspect of the present invention to provide a method for creating a two pass language compiler for a computer system.

It is another aspect to create such a compiler wherein the source input is processed only once.

Yet another aspect is to use an intermediate file containing the compiler states.

A further aspect is to allow parsing instructions for both passes to be provided at a single location.

The above and other aspects of the invention are accomplished in a system which scans and parses the input source code during the first pass, and saves the parse states to be replayed during the second pass. Therefore, the source file is not rescanned nor is it reparsed during the second pass. The parse states are replayed during the second pass, essentially reexecuting all the parser actions in the grammar in the same order during the second pass that they were originally recorded during the actual parsing in the first pass. This eliminates the need to rescan and reparse the original input language, reducing the processing time of the compiler.

The user specifies in the grammar which code is to be executed during each pass, within each grammar action. The system also provides facilities for efficient communication between the two passes, both inside and outside the grammar. In addition, facilities are made for compiler source code outside of the grammar to defer procedure calls, save and automatically restore variable values, and handle compiler error messages easily. These allow for quick and easy retrofiting of an existing one pass compiler.

BRIEF DESCRIPTION OF THE DRAWINGS

The above and other aspects, features, and advantages of the invention will be better understood by reading the following more particular description of the invention, presented in conjunction with the following drawings, wherein.

DESCRIPTION OF THE PREFERRED EMBODIMENT

Figure 1:
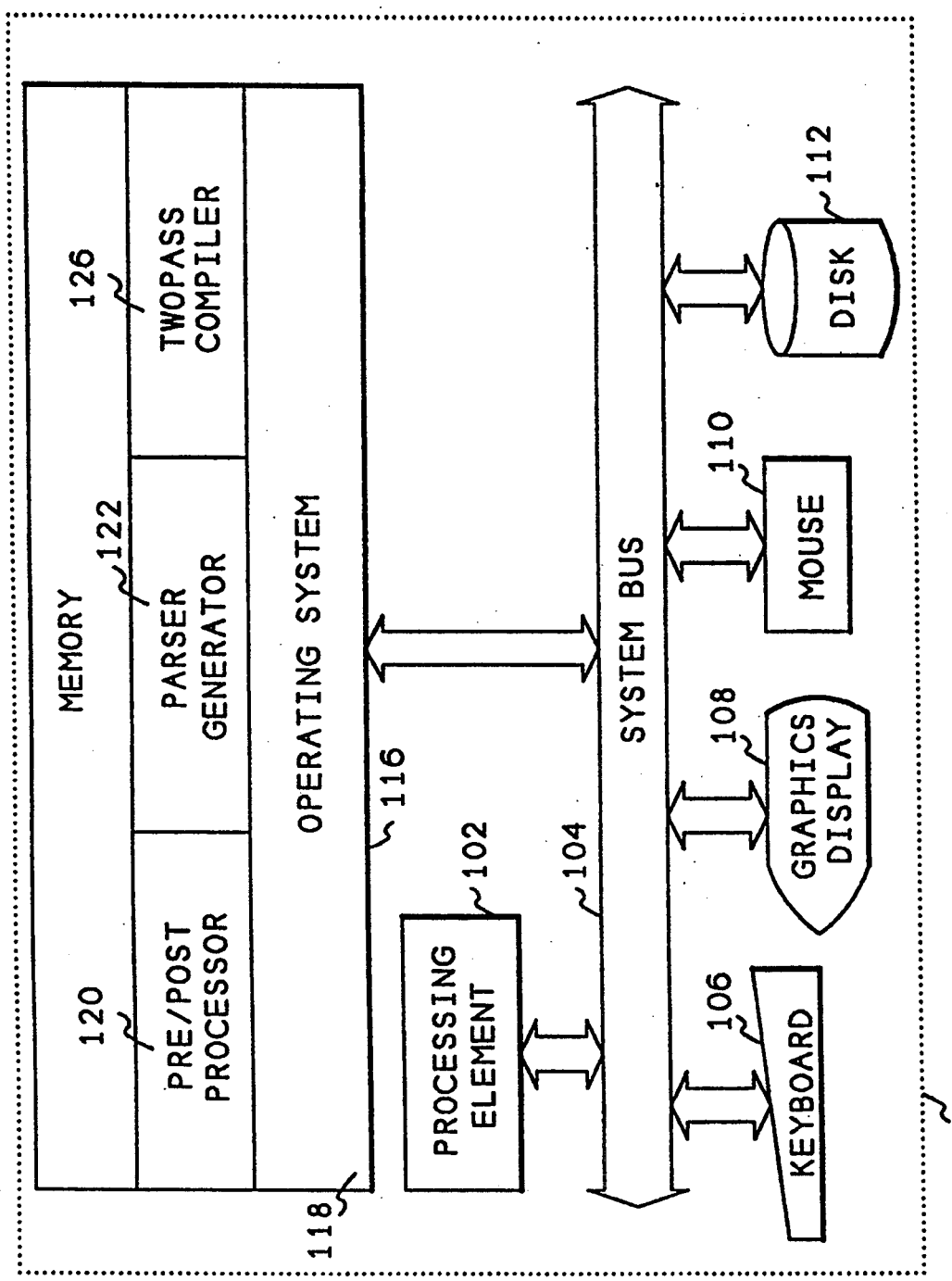
FIG. 1 shows a block diagram of a computer system incorporating the present invention.

The following description is of the best presently contemplated mode of carrying out the present invention. This description is not to be taken in a limiting sense but is made merely for the purpose of describing the general principles of the invention. The scope of the invention should be determined by referencing the appended claims.

The present invention uses two utility programs, lex and yacc, commonly available on all UNIX (UNIX is a registered trademark of AT & T) operating systems. The lex scanner and yacc parser generator were developed at Bell Telephone Laboratories in the 1970's. The lex scanner utility is described in "Compilers Principles, Techniques, and Tools" by Alfred V. Aho, Ravi Sethi, and Jeffery D. Ullman, Addison Wesley 1986, starting on page 105. The yacc parser generator utility is described in this same reference starting on page 257. In addition, both the lex and yacc utilities are described in a book entitled "Lex & Yacc", by Tony Mason and Doug Brown, O'Reilly & Associates, Inc., 1990.

The language grammar that is input to the present invention in order to create a two pass compiler is a standard yacc grammar with additional twopass directives. Each parser action in this grammar is executed exactly twice, unless such execution is restricted by definitions in the grammar described below. Control over which parser actions are executed during each of the two passes, and communications between the two passes, are facilitated by directives described below.

The programmer who creates the grammar for the language to be compiled, specifies what code is to be executed within each parser action for each of the two passes. This specification is done through the use of pass scopes. These special pass scopes may be used anywhere a normal scope may be used in the grammar, but in addition they specify which pass is to execute the code contained within the scope. For example, consider the following twopass parser action:

```
defname:   SNAME
{
        pass1 {$$ = def_name( $1 ); }
};
```

In this example, def_name() is only called during the first pass. During the second pass, this parser action does nothing. The pass scopes which are available are as follows:

```
pass1{ /* code to be executed during pass 1 only */ }
   or 1{}
pass2{ /* code to be executed during pass 2 only */ }
   or 2{}
pass12{ /* code to be executed during both passes */ }
   or *{}
```

Therefore, we could have also written the above example as:

```
defname:   SNAME
1{
        $$ = def_name( $1 );
};
```

For further illustration, the following is another example. In this example, only one call to printf is executed in each pass.

```
printpass:   /* empty */
*{
    1( printf(" In First Pass   n" ); }
    2{ printf( "In Second Pass   n"); }
};
```

Very often, it is desirable to do some of the work in the first pass and then continue the work in the second pass. Also, since the lexical scanner only scans the source code during the first pass, the tokens created by the scanner, and possibly some state of the lexical scanner, may be needed during the second pass.

A function called TWOPASS_SAVE() provides the means for saving values after the first pass code in a parser action, and then restoring them during the execution of the second pass code in the same parser action. When the compiler executes the first pass, the variable identified by the TWOPASS_SAVE function is saved away, at the point where the call to TWOPASS_SAVE occurs, and when the compiler executes the second pass, the variable is restored, also at the point where the call to TWOPASS_SAVE occurs, so that it is available during the second pass.

For example, in the code below, assume that SICON returns a character pointer during the first pass, and that for some reason, we need to defer the addition operation to the second pass:

```
add: SICON '+' SICON
*{
    int a, b;
    1{
        a = atoi( $1 );  /* a gets its value during pass1 */
        b = atoi( $3 );  /* b gets its value during pass1 */
    }
    TWOPASS_SAVE(a); /*a is saved during pass1, restored in pass2*/
    TWOPASS_SAVE(b); /*b is saved during pass1, restored in pass2*/
    2{
        $$ = a + b;  /* a and b are finally used during pass2 */
    }
};
```

During the first pass, "a" and "b" take on numeric values returned from the function call to the ATOI function. The values of these variables are then saved by the calls to the TWOPASS SAVE function and the parser action is completed. During the second pass, the values for a and b are restored, at the location of the call to TWOPASS_SAVE, and then added together to create the variable $$ in the code included in the second pass scope. These values are restored during the second pass at the same place in this token stream that they occurred during the first pass. For example, the above parser actions may be executed many times during the first pass, and each corresponding execution in the second pass will restore the values stored at the location during each occurrence of the code being executed during the first pass.

Since the function TWOPASS SAVE must be executed in both passes, it must be within a pass 12{} scope. This is accomplished in the above example since TWOPASS_SAVE is within the scope that starts with ,(.

For functions performed outside the grammar rules, additional capability is provided. A variable "yypass" is an integer variable which contains the number of the current pass, either one or two. If yyparse() has yet to be called, or has terminated, the value of the yypass variable is zero.

The compiler has the ability to define a function call in the first pass, however, deferring actual calling of the function until the same location in the replay of the token stream during the second pass as when that token was originally processed by the parser during the first pass. This function is called twopass_callfunc(), and it causes a function to be called during the second pass, at the same point in the input token stream as the location of the twopass_callfunc in the first pass. This is a very useful function for deferring work, without having the grammar directly involved.

For example, consider a compiler that generates user error messages during the first pass and during the second pass. It is desirable that the error messages appear in order, based on the input language (that is, all errors for a line n, are printed before any errors for line n+1). The following function will handle this case:

```
void error( char *str, int line )
{
    if( yypass == 1 )
    {
        twopass_callfunc( error, "%s%d", str, line );
        return;
    }
    fprintf( stderr, "Compiler Error, Line %d: %s  n", line, str);
}
```

If error() is called during the first pass, twopass_callfunc() is called to cause the error function to be called at this same location during pass2, so that the fprintf statement is actually performed only during the second pass, at the same point in the source. If error() is called during the second pass, the function will simply call fprintf.

The parameters to twopass_callfunc include the name of the function to be called (in the C programming language, a pointer to the function is used instead of the name), and the arguments that will be passed to that function when it is actually called.

In a manner similar to deferring function calls, the contents of variables can be restored in the second pass to the same value they had at the location in the input token stream in the first pass. This is performed using a function called twopass_restore. When twopass_restore is called in the first pass, it saves the contents of a variable. The contents of this variable are restored in the second pass at the same location in the replay of the token stream during the second pass (see the description of FIG. 18 below). Twopass_restore accepts two parameters, the first is a pointer to the variable and the second is the size in bytes of the variable. Twopass_restore cannot be used for local variables since their address may change from one pass to another.

Some variables, for example, a variable containing the line number of the line being parsed, need to always have the same value for both pass one and pass two. The compiler provides a mechanism for handling these variables which need to be constantly kept up to date. This mechanism is called "TWOPASS VAR", which is more efficient than twopass_restore, since it automatically saves and restores data, whereas the twopass_restore function only restores automatically, the user still needs to call the function to save. The TWOPASS_VAR mechanism is implemented as C programming language preprocessor "#define" statements as follows:

```
#define TWOPASS_VAR1         lineno
#define TWOPASS_VAR1_TYPE    int
```

With the above two statements, for example, the compiler will maintain lineno between the two passes; that is, if it chanqes in pass one, it will also change at each location in pass two where it changed in pass 1. This mechanism is limited in the preferred embodiment to three such variables, and they can only be defined in the header section of the grammar.

Normally, the first pass ends and the second pass begins when the scanner returns an EOF token indicating that the end of file has been found and the source code. However, at any point the compiler can be forced to stop processing pass one and immediately start processing pass two The directive "TWOPASS DO-PASS2" causes the immediate end of the first pass and beginning of the second pass. When the second pass is complete, the first pass then resumes with new tokens from the scanner. That is, the first pass is merely suspended while the second pass is processed up to this same point in the input token stream. This allows a reduction in dynamic memory and intermediate file size where it is used. Memory usage is reduced since information up to this directive can probably be purged after the second pass is complete, such as procedure symbol tables, and the intermediate file will be smaller, since when the first pass restarts the intermediate file.

If a fatal error is detected, one for which recovery is impossible, a compiler typically stops operation at that point. However, since error messages may not have been printed because of the deferred function called described above, the compiler provides a mechanism to print all error messages before stopping execution. This function is called twopass_error_callfunc(). When this function is called, it goes back through all the queued twopass_callfunc()s and calls those which are error related, thus printing out the error messages. After this function is called then the compiler can stop execution due to the unrecoverable error.

This system also provides two functions that are called at the beginning of each pass, to allow for initialization that needs to occur at the beginning of each of the passes.

FIG. 1 shows a block diagram of a computer system incorporating the present invention. Referring now to FIG. 1, a computer system 100 contains a processing element 102. The processing element 102 communicates to other elements of the computer system 100 over a system bus 104. A keyboard 106 allows text entry into the system by a user of the system, and a mouse 110 allows graphical data input into the system. A graphics display 108 allows text and graphics information to be displayed to a user of the system. A disk 112 contains the software and data files of the present invention.

A memory 116 contains an operating system 118 which allows the software of the present invention to communicate to the various input/output devices of the system. A pre/post processor 120 and a parser generator 122 are used to read language grammar information from the disk 112 and create a twopass compiler 126 which processes the language commands of the target language to create code for the user of the system.

Figure 2:
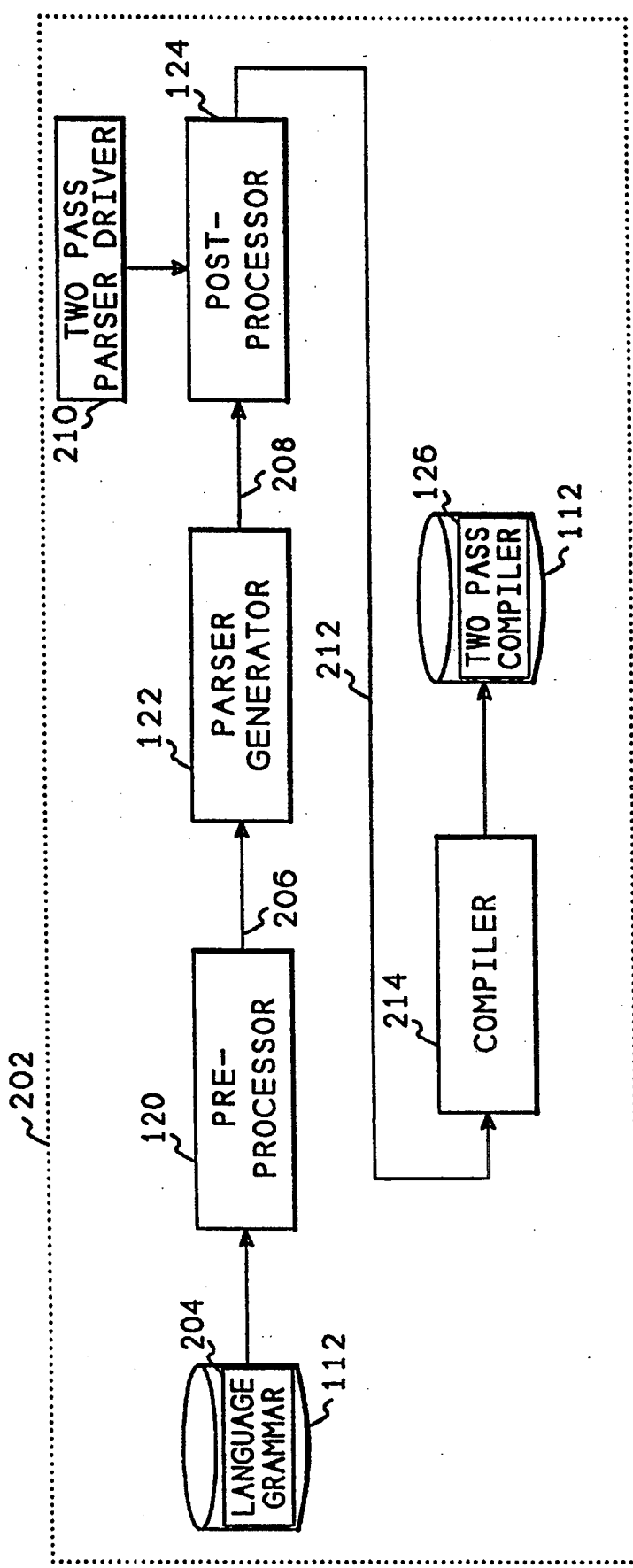
FIG. 2 shows a block diagram of the process for creating the two pass compiler of the present invention.

FIG. 2 shows a block diagram of the process for creating the twopass compiler of the present invention. Referring now to FIG. 2, language grammar information 204 contained in a file on the disk 112 (FIG. 1) is input to a preprocessor 120. The preprocessor 120 alters the language grammar so that it is in a form acceptable to a yacc parser generator. This information is then fed as file 206 to a yacc parser generator 122. The output of the yacc parser generator 122 is file 208 which is fed to postprocessor software 124. Postprocessor software 124 reads the twopass parser driver file 210 and combines this file with the output 208 of the parser 122 to create the source code 212 of the twopass compiler. This source code is input to a language compiler 214 which converts the source code into object code capable of executing within the computer system 100. This object code is then stored as the twopass compiler 126 on the disk 112.

Figure 3:
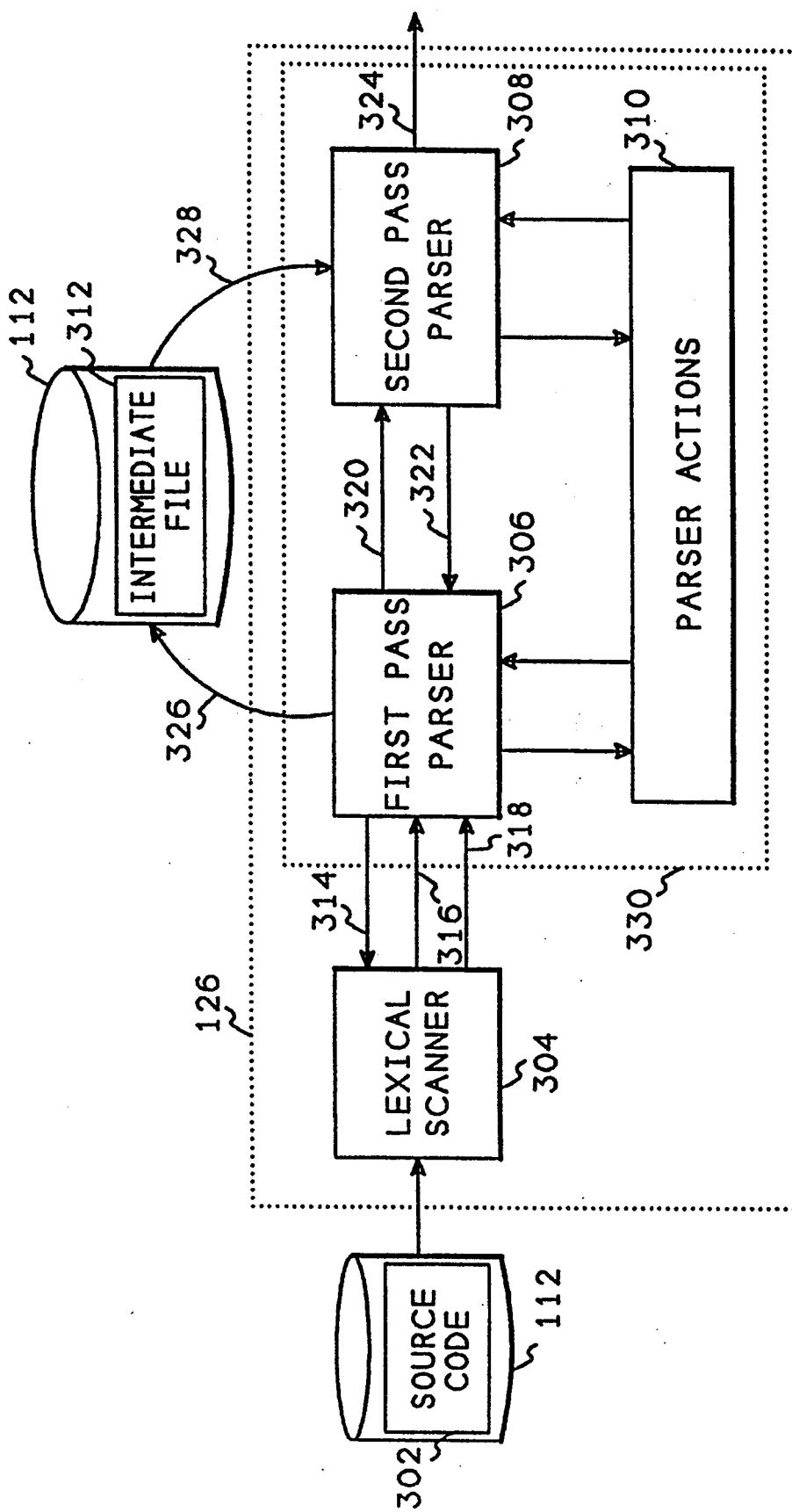
FIG. 3 shows a block diagram of the operation of the twopass compiler.

FIG. 3 shows a block diagram of the operation of the twopass compiler of the present invention. Referring now to FIG. 3, data from a source code file 302, which resides on disk 112, is input to a lexical scanner 304. The lexical scanner 304 is called by the first pass parser 306, indicated here by line 314. The lexical scanner separates each word, number, etc. from the source file 302 and identifies each as a "token" over line 316 to the first pass parser 306. In addition, when the token is a number or string of characters, etc., which has a definable value, the value is passed, in a variable called yytext, to the first pass parser over line 318. The first pass parser 306 reads the tokens from the lexical scanner 304 and matches the grammar of the language against the tokens being received from the source code file 302. Each state of the parser is stored into an intermediate file 312 on the disk 112 for use by the second pass parser 308. Both the first pass parser 306 and the second pass parser 308 call parser action functions 310 which are defined within the language grammar 204 (FIG. 2) when the twopass compiler 126 was created. The output 324 of the second pass parser 308 is the compiled code suitable for running within the computer system 100.

Figure 4:
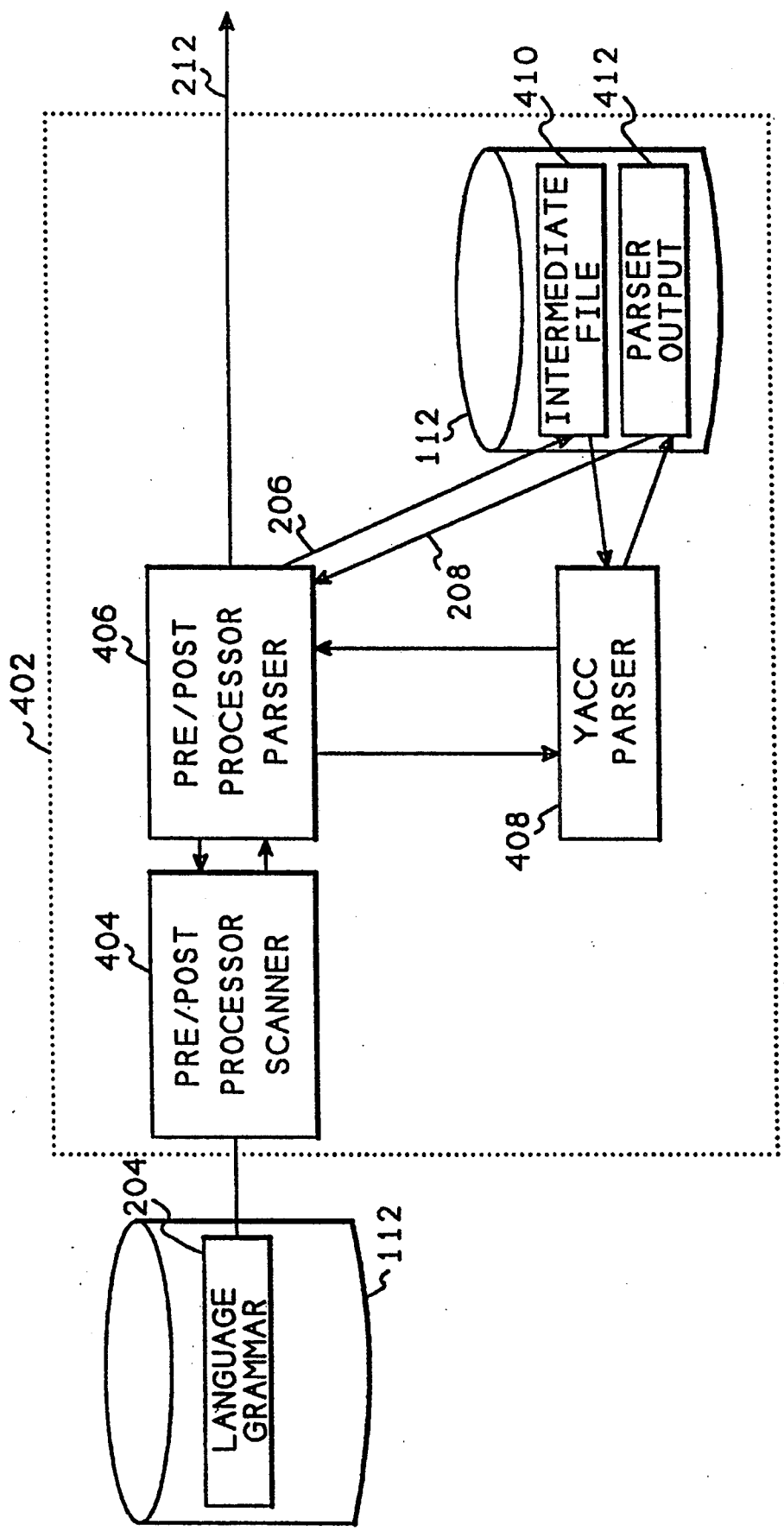
FIG. 4 shows a block diagram of the pre-processor and post-processor blocks of FIG. 2.

FIG. 4 shows a block diagram of the preprocessor and postprocessor blocks 120 and 124 of FIG. 2. Although shown separate in FIG. 2, the preprocessor 120 and the post processor 124 are implemented as a single module in the preferred embodiment. This single module preprocesses the language grammar 204 and creates an intermediate file 410. The pre/post processor 406 then calls the yacc parser generator 408, by creating a child process and executing the yacc parser generator in the child process, and passes the intermediate file 410 as input to the yacc parser generator 408. The yacc parser generator 408 processes the intermediate file 410 and creates a parser output file 412. When the yacc parser generator 408 has completed processing, it returns to the pre/post processor parser 406 which reads the parser output file 412 and processes it to create the compiler output source file 212 which it then passes to the compiler 214 (FIG. 2).

Figure 5:
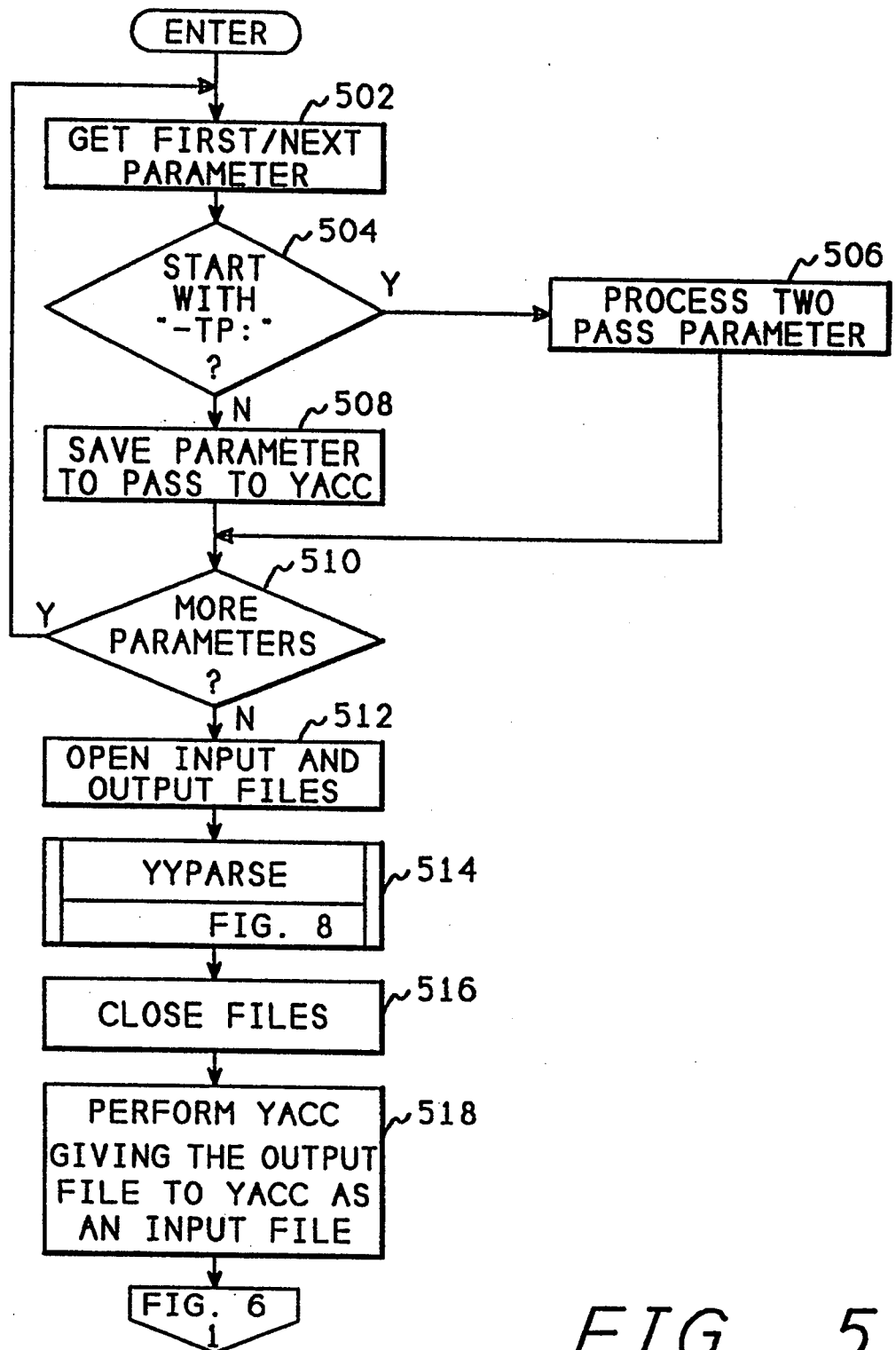
FIG. 5 shows a flowchart of the pre processor parser of FIG. 4.
Figure 6:
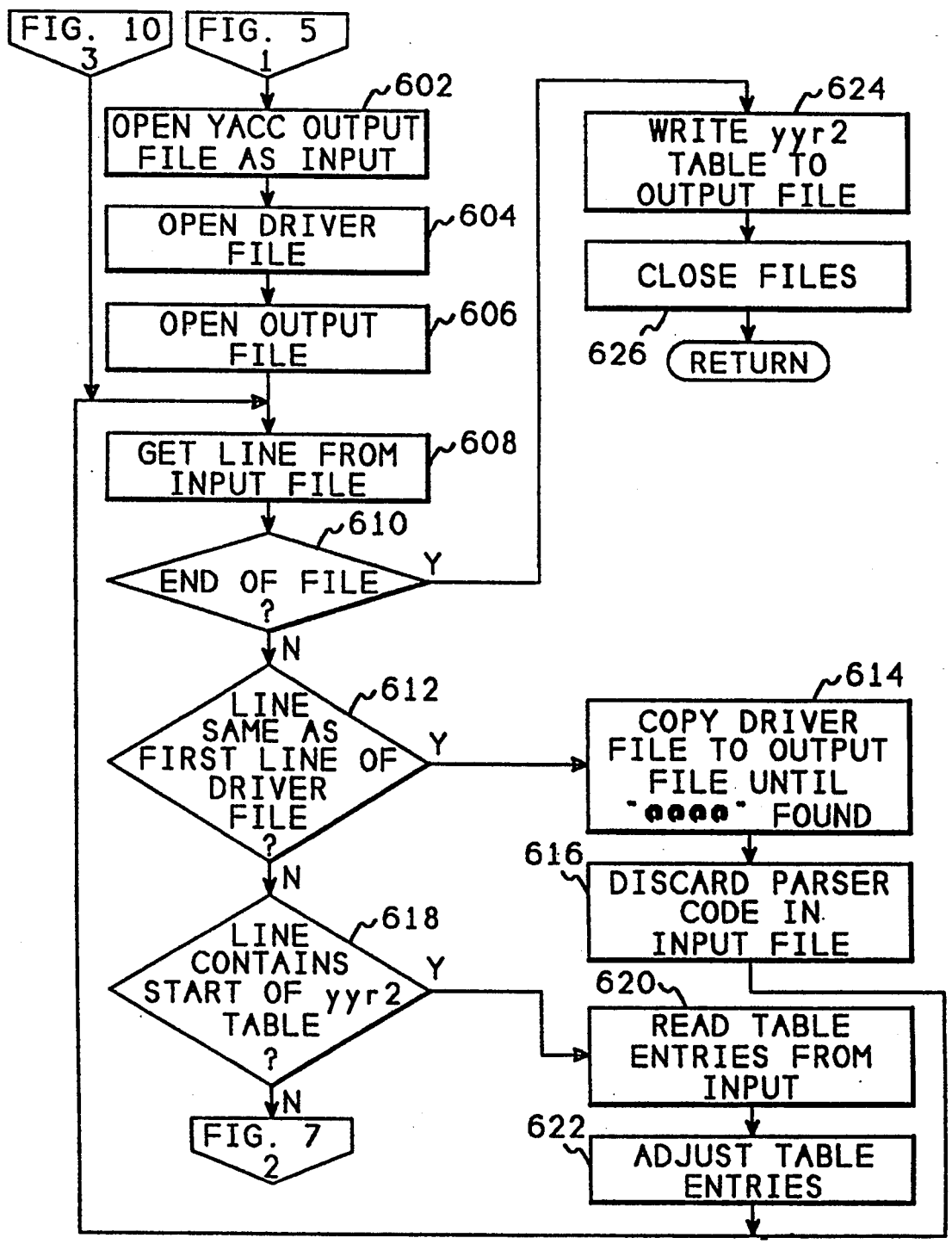
FIGS. 6-7 show a flowchart of the post processor parser of FIG. 4.
Figure 7:
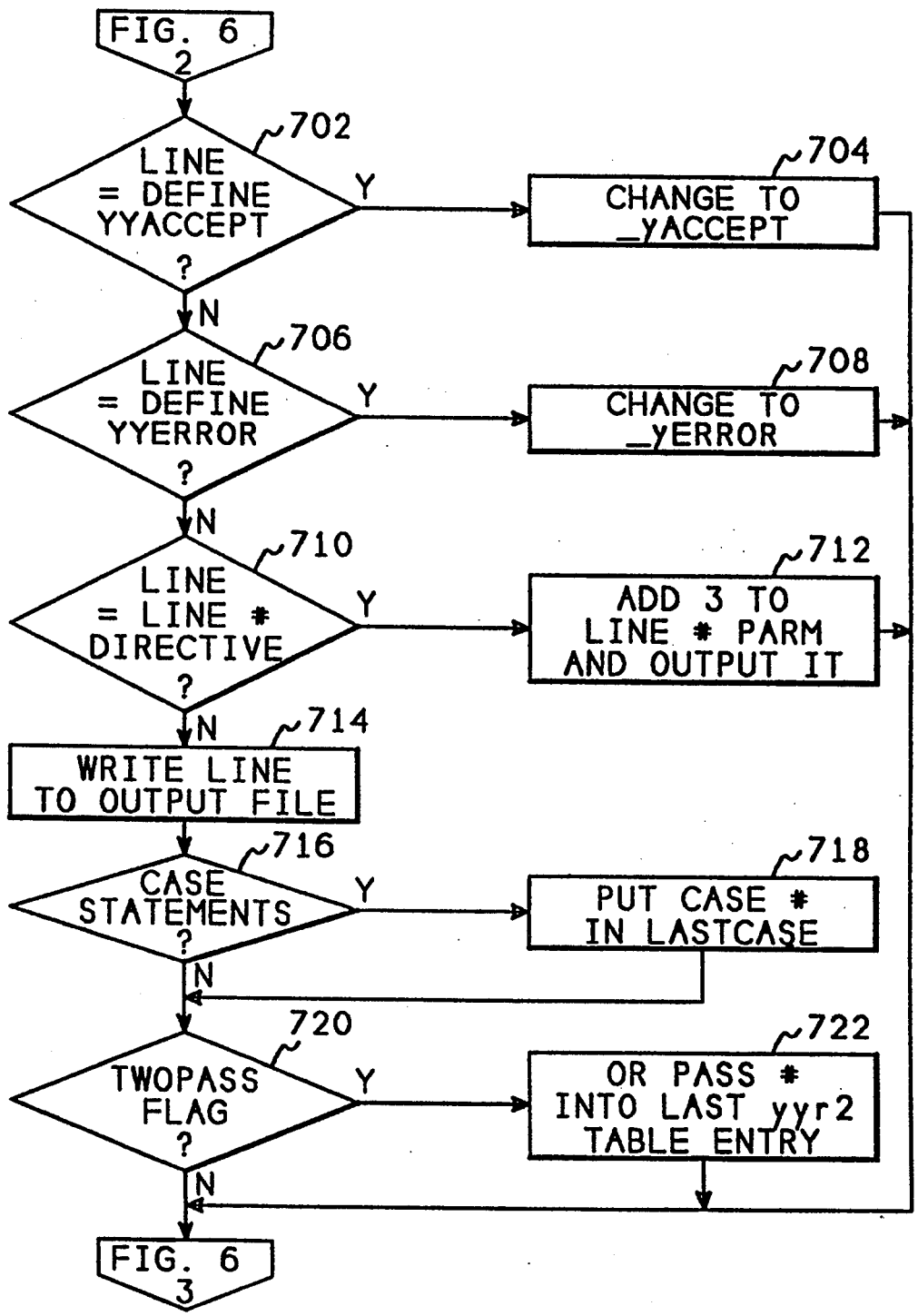

FIGS. 5, 6, and 7 describe the pre/post processor parser 406 of FIG. 4. Referring now to FIGS. 5-7, the pre/post processor parser is entered at block 502 of FIG. 5. When entered, block 502 gets the first or next parameter that was passed on the input command line. Block 504 determines whether this parameter starts with the sequence "-tp:" and if so, transfers to block 506 which processes the parameter, which is for the twopass compiler. If the parameter does not start with this sequence, block 504 transfers to block 508 which saves the parameter to pass to yacc. After processing the parameter or saving the parameter, control goes to block 510 which determines whether more command line parameters are present and if so, transfers back to block 502 to process the next parameter.

Figure 8:
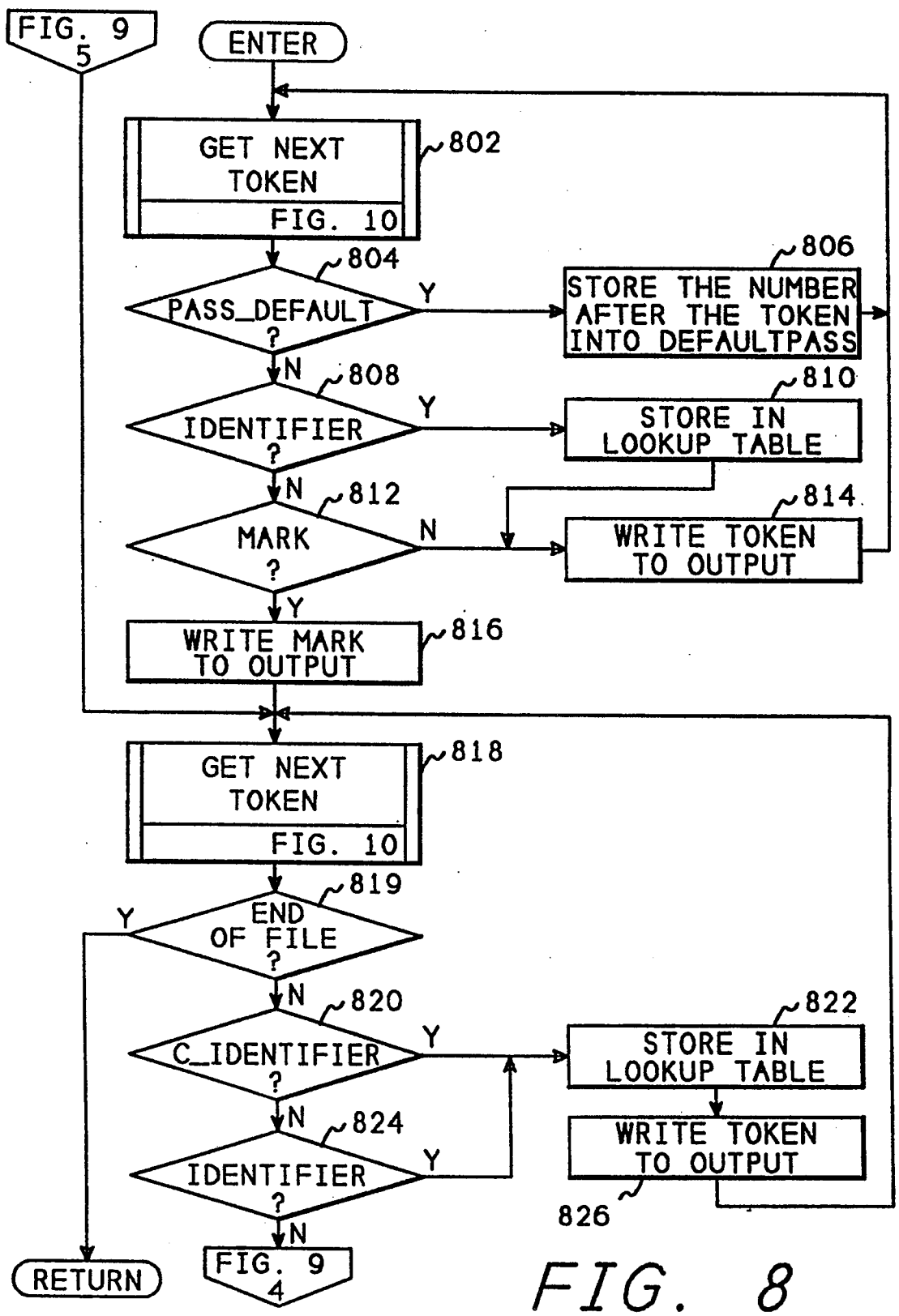
FIGS. 8-9 show a flowchart of the yyparse function called from FIG. 5.

After all command line parameters have been processed, block 510 transfers to block 512 which opens input and output files and then block 514 calls the yyparse function of FIG.8, to process the input file into the intermediate file 410 of FIG. 4. After the input file has been completely processed, the yyparse function returns to block 516 which closes files and then block 518 performs the yacc processor giving the intermediate file 410 as the input file to the yacc parser generator. This parser is shown as block 408 in FIG. 4. The yacc parser generator is performed as a child process in the preferred embodiment, however, it could also be called as a function. The operation of yacc is well known in the art, as described in the Aho and Mason references, and will not be described further.

After the yacc parser generator 408 (FIG. 4) has completed processing, the parser output file 412 has been created, and this file must be post processed by the pre/post processor parser 406. To perform this post processing, block 518 transfers to block 602 which opens the yacc output file 412 as input. Block 604 then opens the twopass driver file 210 (FIG. 2) for input, and block 606 opens the output file 212 of FIG. 2 and 4. Control then goes to block 608 which gets the next line from the input file 412. Block 610 then determines if the entire input file has been processed, and if not, transfers to block 612 which determines whether the line just read is identical to the first line of the driver file. If this is true, block 612 transfers to block 614 which copies lines of the driver file to the output file until a sequence of "@@@@" have occurred. After copying these lines, block 616 discards the parser code from the input file. In this manner, the twopass parser driver file 210 replaces the yyparse() function of the parser driver that is placed into the parser output file 412 by the yacc parser generator 408. After discarding the yyparse function of the parser code from the input file 412, block 616 returns to block 608 to get the next line from the input file.

If the line does not match the first line of the driver file, block 612 transfers to block 618 which determines whether the line contains the start of the yyr2 table. If so, block 618 transfers to block 620 which reads the table entries from the input file, and then block 622 adjusts the table entries for the yyr2 table. These entries are adjusted by including information for each parser state defined, that indicates whether or not any user production code is to be performed for the parser state. Before the adjustment, the lower bit of the yyr2 array tells the standard yacc parser driver whether there is an action associated with a particular state of the parser. After the adjustment, an extra bit is added for the second pass, to inform the twopass parser driver whether there is code to be executed during both passes: the first bit for the first pass, and the second bit for the second pass. After adjusting the table entries, block 622 returns to block 608 to read the next line of the input file.

If the line is not the start of the yyr2 table, block 618 transfers to block 702 which determines whether the line contains a define statement for the constant "YYACCEPT", and if so, control goes to block 704 which changes this define to _YACCEPT before returning to FIG. 6 block 608 to read the next input line. This is done to avoid a naming conflict with the original source.

If this line did not contain a defined for YYACCEPT, control goes to block 706 which determines whether the line contained a defined for "YYERROR" and if so, block 706 transfers to block 708 which changes this to _YERROR before returning to FIG. 6 block 608. This is done to avoid a naming conflict with the original source.

Block 710 determines whether the input line is a line number directive, and if so, transfers to block 712 which adds three to the line number parameter and copies it to the output before returning to FIG. 6 block 608. This adjustment in line number is due to the addition of #define TWOPASS in the beginning of the modified grammar.

If none of these has occurred, block 714 writes the input line to the output file and then block 716 determines whether the line contained a case statement. If so, control goes to block 718 which stores the case number of the case statement in the variable LASTCASE before transferring to block 720. Block 720 determines whether the twopass flag has occurred, which is identified by the character string "/*__TWOPASS__PASS:" and if so, block 722 ORs the last pass number from this flag into the yyr2 table entry for the last case number identified above. The string "/*__TWOPASS__PASS:" is generated by the preprocessor to communicate to the postprocessor what the adjustment should be to the yyr2 table for each parser action. Control then returns to block 608 on FIG. 6.

When block 610 detects end of file, it transfers to block 624 which writes the new yyr2 table to the output file and then block 626 closes files before returning to the operating system.

Figure 9:
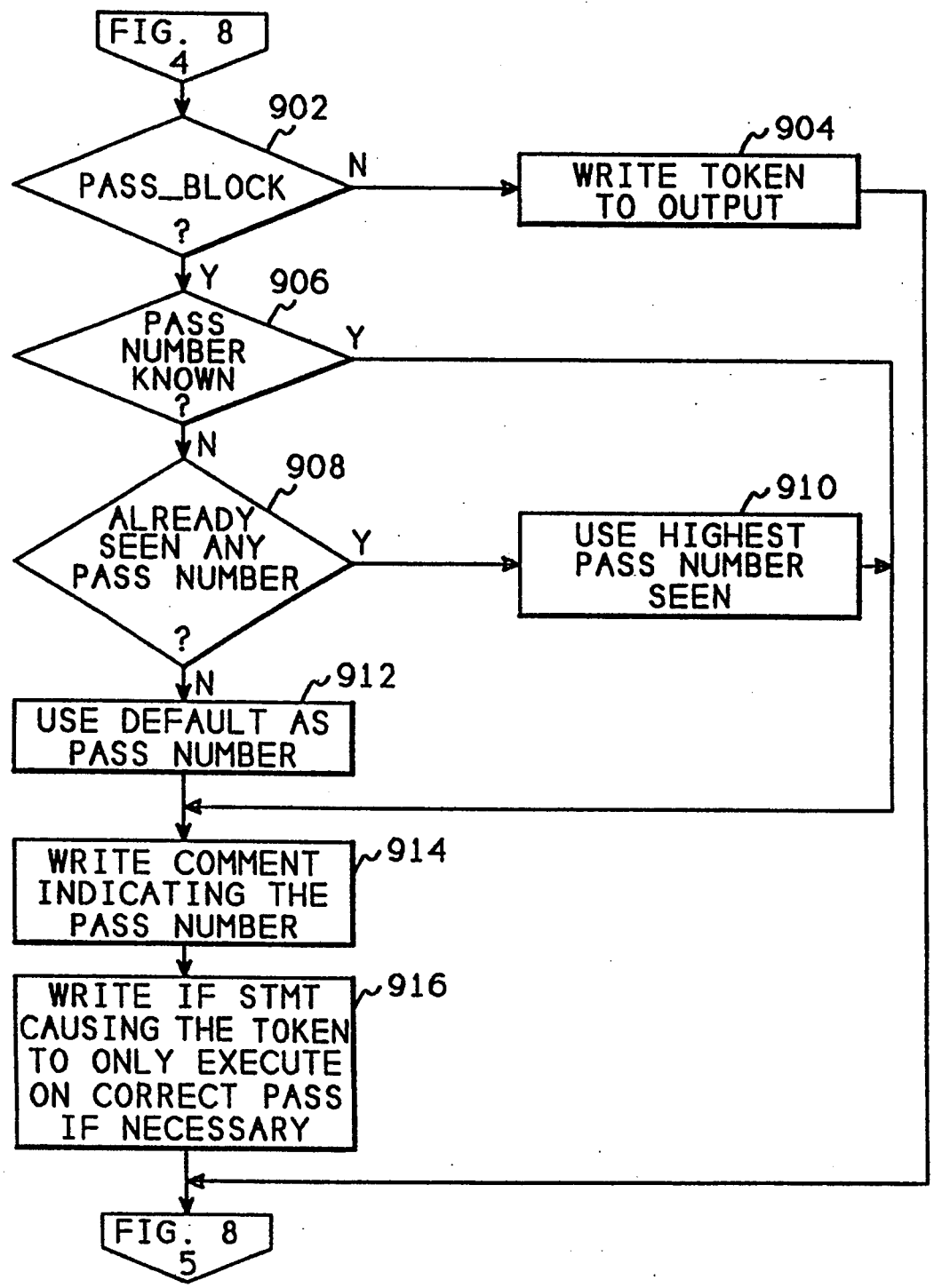

FIGS. 8 and 9 show a flowchart of the yyparse function called from block 514 of FIG. 5. Referring now to FIGS. 8 and 9, entry occurs at block 802 of FIG. 8. Block 802 calls the token function of the scanner of FIG. 10. The scanner returns a value representative of the next token found in the input stream. Block 802 determines whether the token is a PASS_DEFAULT token, that is, it has a value representing the PASS__DEFAULT token, and if so, transfers to block 806 which stores the number following the token into the DEFAULTPASS variable, and then returns to block 802 to get the next token. If the token represents an identifier, block 808 transfers to block 810 which stores the identifier in a lookup table and then transfers to block 814 which writes the token to the output file before returning to block 802 to get the next token. If the next token is not a MARK token, block 812 transfers to block 814 which writes the token to the output file before returning to block 802 to get the next token. In this manner, the input file will be read until the first mark is detected.

When the first mark is detected, block 812 transfers to block 816 which writes the mark to the output file and then block 818 gets the next token from the input file. Block 820 determines whether the next token represents a C_IDENTIFIER, and if so, transfers to block 822 which stores this token in the lookup table and then block 826 writes the token to the output file before returning to block 818 to get the next token. If the next token represents an IDENTIFIER, block 824 transfers to block 822 which stores the identifier in the lookup table and then block 826 writes the token to the output before returning to block 818.

If the next token represents neither a C_IDENTIFIER nor an IDENTIFIER, control transfers to block 902 of FIG. 9 which determines whether the token Is a PASS BLOCK token. If the token is not a PASS BLOCK token, block 902 transfers to block 904 which writes the token to the output before returning to FIG. 8 block 818 to get the next token. If the token read is a PASS_BLOCK token, block 902 transfers to block 906 which determines whether the pass number is currently known, and if so transfers to block 914. If the pass number is not known, block 906 transfers to block 908 which determines whether any pass number has been seen and if so, transfers to block 910 which uses the highest pass number that has been seen so far and then transfers to block 914. If no pass number has been seen, block 908 transfers to block 912 which uses the default pass number for the following code and then transfers to block 914.

Block 914 writes a comment to the output file indicating the pass number and then block 916 writes an if statement which causes the token to only execute on the correct pass before returning to block 818 to get the next token. The if statement is only written if it is actually needed. If all the code in a grammar action is only executed during one of the two passes, the yyr2 table will control the code that is executed in each pass. If there is a mix of pass1 and pass2 code, then the if statement is necessary, and the yyr2 table will allow the grammar action to be executed on each pass. In most cases, each grammar action is only executed in one pass, thus the actual call to the switch statement in yyparse() is unnecessary.

Processing continues until block 819 detects an end of file at which time FIG. 8 returns to FIG. 5 block 516.

FIGS. 10-15 show a flowchart of the pre/post processor scanner 404, and FIGS. 5-12 show a flowchart of the pre/post processor parser 406.

Figure 10:
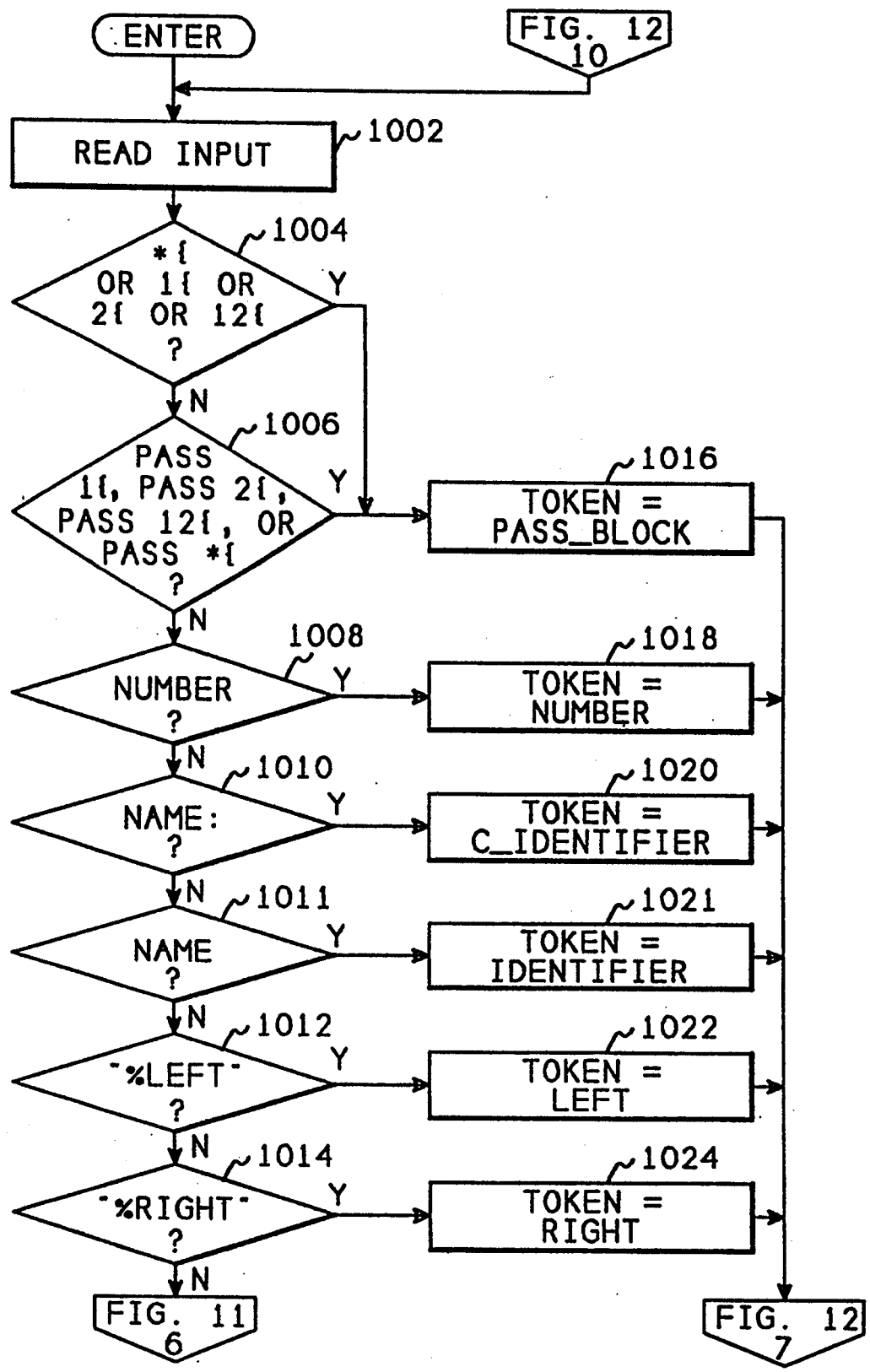
FIGS. 10-12 show a flowchart of the pre/post processor scanner of FIG. 4.
Figure 11:
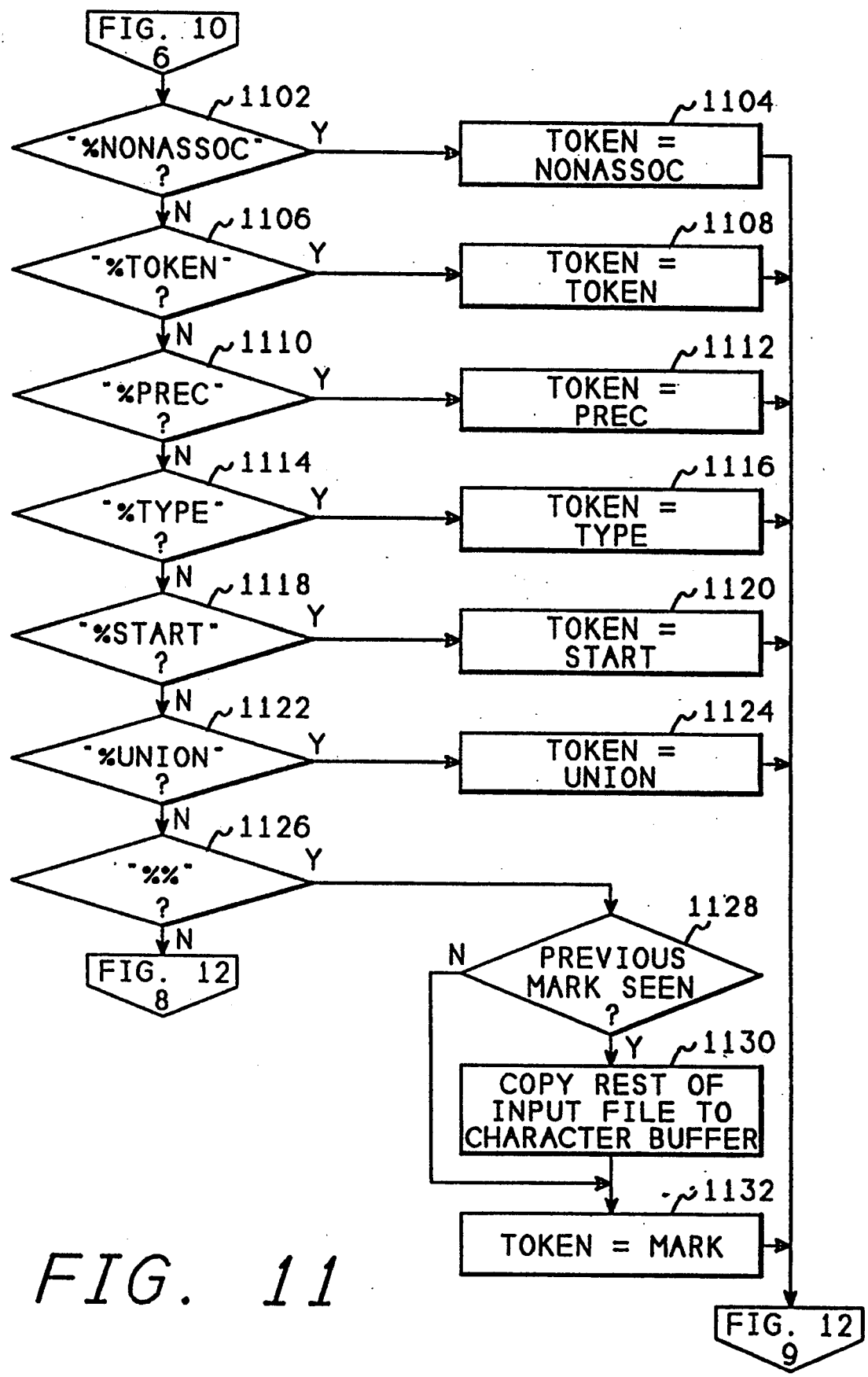
Figure 12:
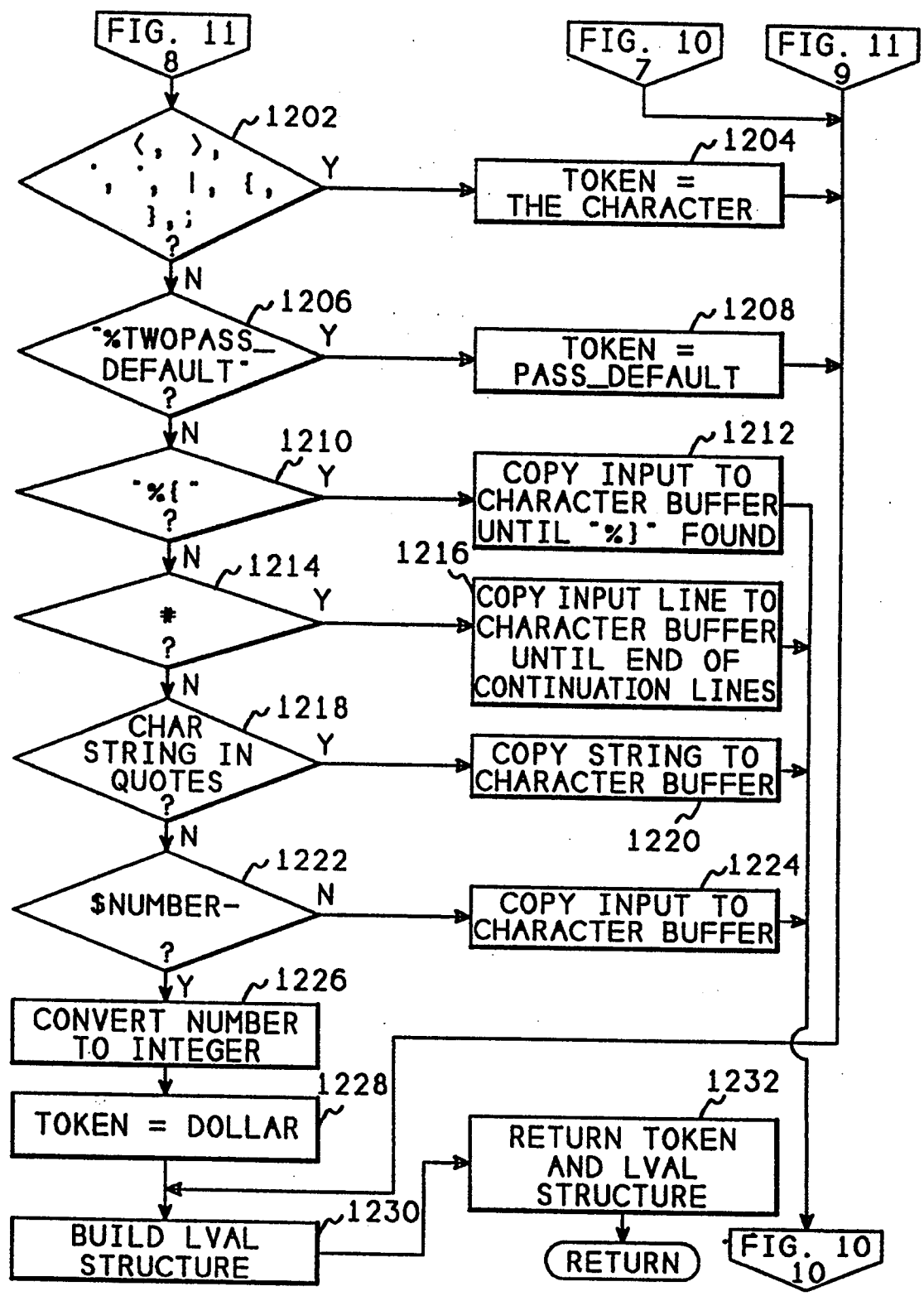

Referring now to FIGS. 10-15, when the scanner is called by the parser from block 802 and from block 818 on FIG. 8, control enters at FIG. 10 block 1002. Block 1002 reads the next character from the input file and block 1004 determines whether the character sequence ",(", or "1(", or "2(", or "12(", has occurred. If not, control goes to block 1006 which determines whether the sequences "pass1(", or "pass2(", or "pass12(", or "pass,(", has occurred. If any of these sequences identified in block 1004 or block 1006 occur, control goes to block 1016 which sets the value of a variable token to the value represented by the token PASS_BLOCK, and then control transfers to FIG. 12 block 1230. FIG. 12 block 1230 builds a structure for the token just found, and transfers to block 1232 which returns the constant value for the token, e.g. the value for PASS BLOCK, and the structure just built to the calling program.

If the sequences identified in blocks 1004 and block 1006 have not occurred, control goes to block 1008 which determines whether a number has been read from the input stream. If a number has been read, control goes to block 1018 which sets the variable token to the value for the token NUMBER and control goes to FIG. 12 block 1230. If the sequence was not a number, control goes to block 1010 which determines whether the sequence is a valid name followed by the ":" symbol. If so, block 1020 sets token to C_IDENTIFIER and then control transfers to FIG. 12 block 1230. If a name followed by a colon has not occurred, control goes to block 1011 which determines whether the sequence is a name not followed by a colon, and if so, control goes to block 1021 which sets the value of token to IDENTIFIER and then control goes to FIG. 12 block 1230. Blocks 1012 and 1014 check for the characters "%LEFT" and "%RIGHT" and either of these occurs, the value for the token is set and control goes to FIG. 12 block 1230.

If neither of these sequences have occurred, control goes to FIG. 11 block 1102 wherein block 1102 through block 1124 check for sequences of characters all starting with a percent sign, and if any are found the value for token is set and control goes to FIG. 12 block 1230. If none of these sequences are found, control goes to block 1126 which determines whether a sequence of 2 percent signs (i.e. "%%") has occurred. If this sequence has occurred, control goes to block 1128 which determines whether a previous equivalent sequence has been seen. This sequence is called a mark, and identifies major breaks within the source code being read. If a previous mark has been seen, control goes to block 1130 which copies the rest of the input file to a character buffer, and then goes to block 1132 which sets the value of token to MARK and then transfers to FIG. 12 block 1230. If a previous mark has not been seen, the buffer is not copied, however, the value of token is set and control still transfers to FIG. 12 block 1230. If a mark sequence has not been seen, control transfers to FIG. 12 block 1202.

FIG. 12, block 1202 checks for special symbols, and if any are found, block 1204 sets the variable token to the actual character before transferring to block 1230 to build the old value structure and return. If the character read is not one of the special characters, control goes to block 1206 which looks for the sequence "%TWO-PASS_DEFAULT" and if this sequence is found, control goes to block 1208 which sets the token to PASS DEFAULT and then transfers to block 1230. If this sequence has not been found, control goes to block 1210 which looks for the sequence "%(" and if this is found, block 1210 transfers to block 1212 which copies all input characters into the character buffer until a terminating sequence "%)" is found. Between these two sequences, the user of the system may place any type of language source code desired, and this source code will be copied directly to the output. After copying this information to the character buffer, control returns to FIG. 10 block 1002 to read the next input character and process it.

If the "%(" sequence has not been found, control goes to block 1214 which looks for a "#" and if found, block 1216 copies this line to the character buffer and any subsequent lines that follow a continuation character at the end of the first line. In this manner, the user may input a language macro and have it copied directly to the output. After performing this copy to the character buffer, block 1216 transfers back to block 1002 to read the next character of input.

If a number sign has not been found, block 1214 transfers to block 1218 which determines whether a character string in quotation marks has been found, and if so, block 1220 copies the character string to the character buffer and returns control to block 1002.

If a character string has not been found, block 1218 transfers to block 1222 which determines whether a dollar sign followed by a string of digits has been found. If not, control goes to block 1224 which copies whatever character has been found to the character buffer and then returns control to block 1002 to read the next character. If a dollar sign followed by digits has been found, control goes to block 1226 which converts the number to an integer, and block 1227 sets the value of the variable token to the constant DOLLAR and then control goes to block 1230 to return the token to the caller.

Figure 13:
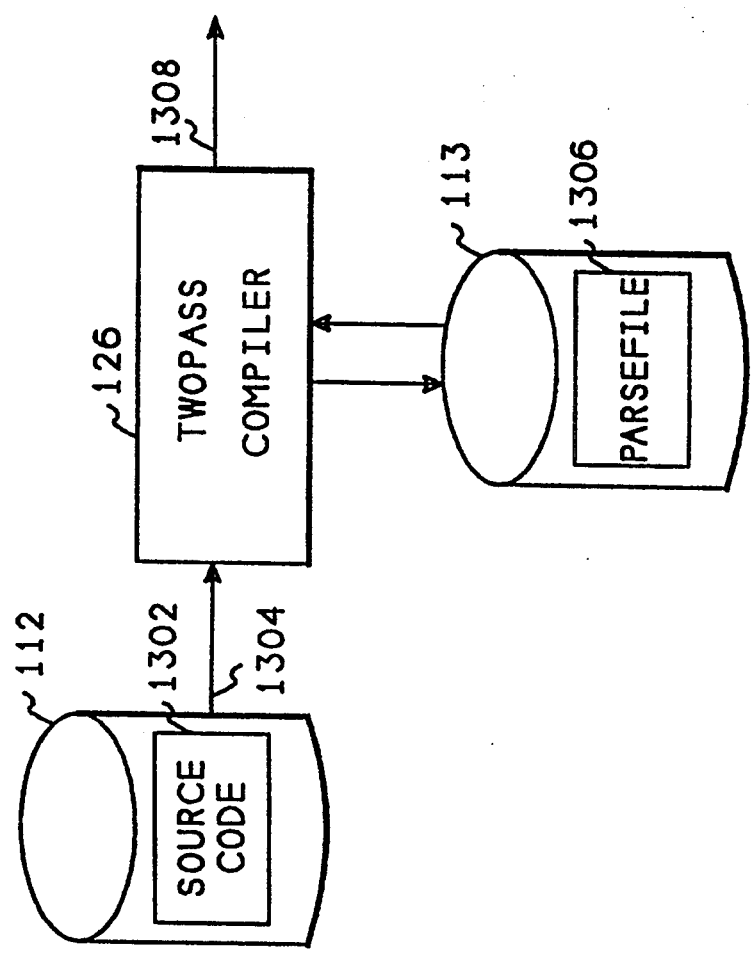
FIG. 13 shows a block diagram of the operation of the twopass compiler 126 of FIG. 2.

FIG. 13 shows a block diagram of the operation of the twopass compiler. Referring now to FIG. 13, source code 1302, which is supplied by a user of the twopass compiler, is input to the twopass compiler 126. The twopass compiler processes the source code file 1302 and creates a parsefile 1306 during pass 1. The parsefile 1306 is read back during pass 2, as will be described below, and the output 1308 is created.

Figure 14:
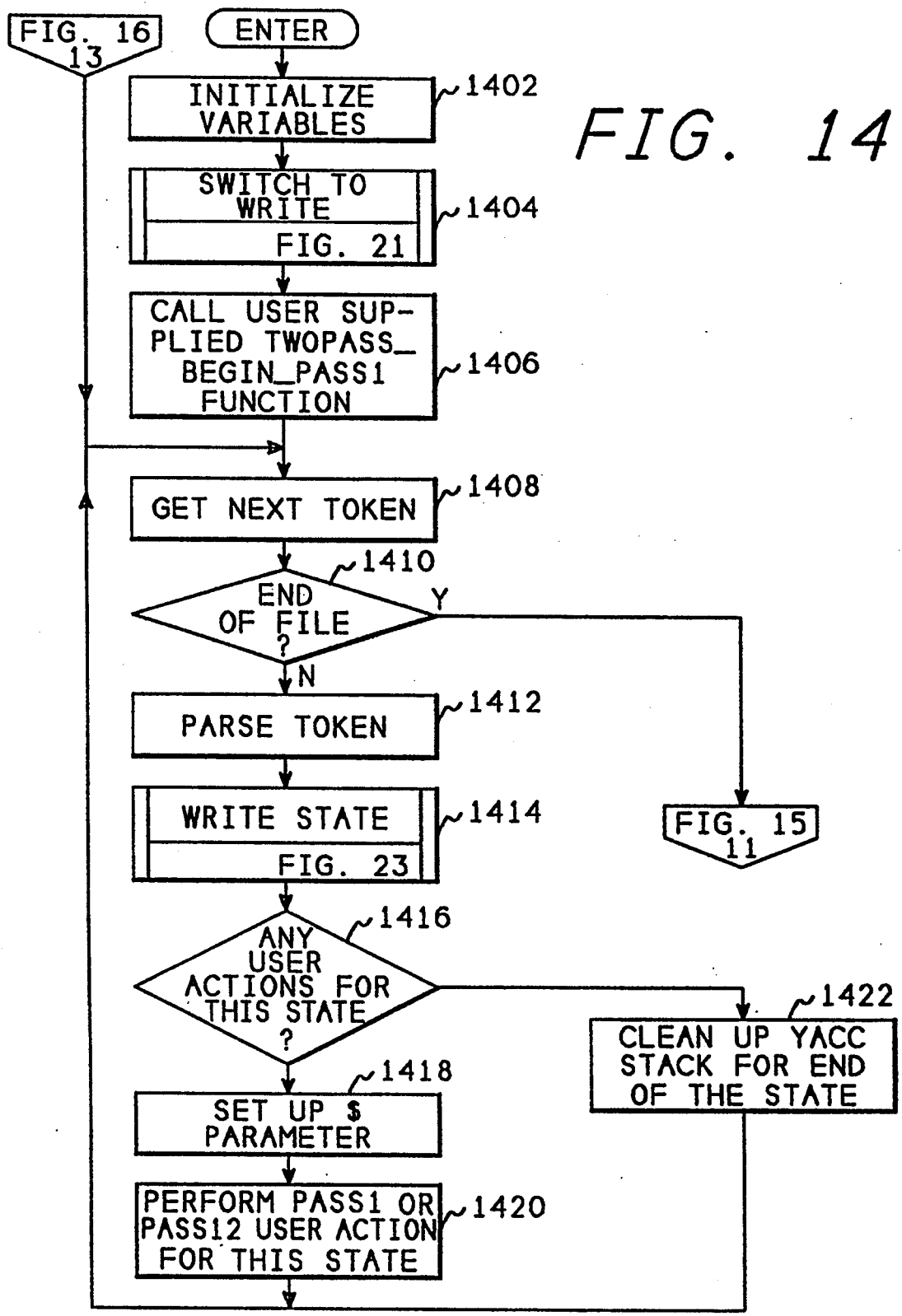
FIGS. 14-16 show a flowchart of the parser for the twopass compiler 126 of FIG. 2.
Figure 15:
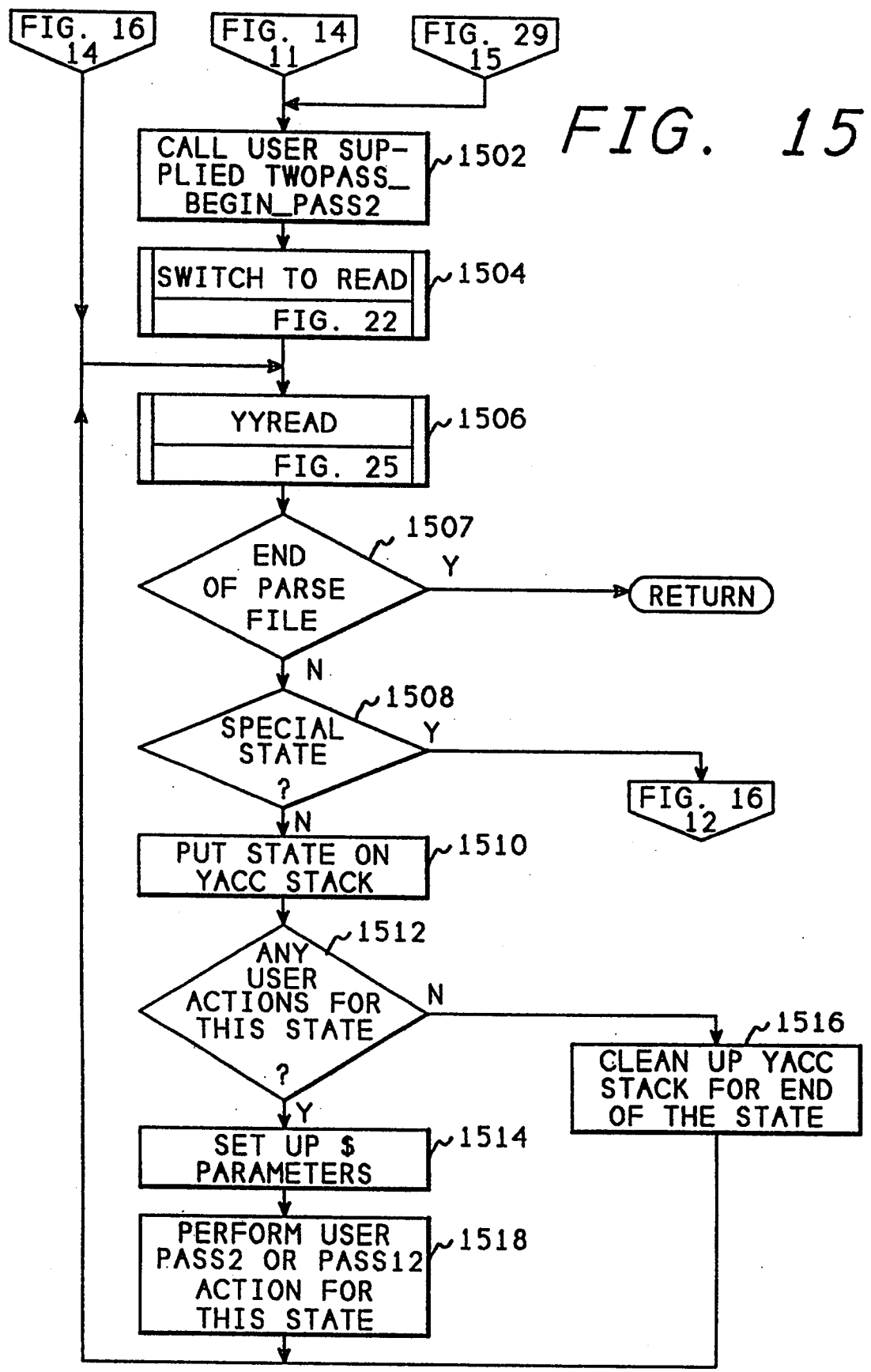
Figure 16:
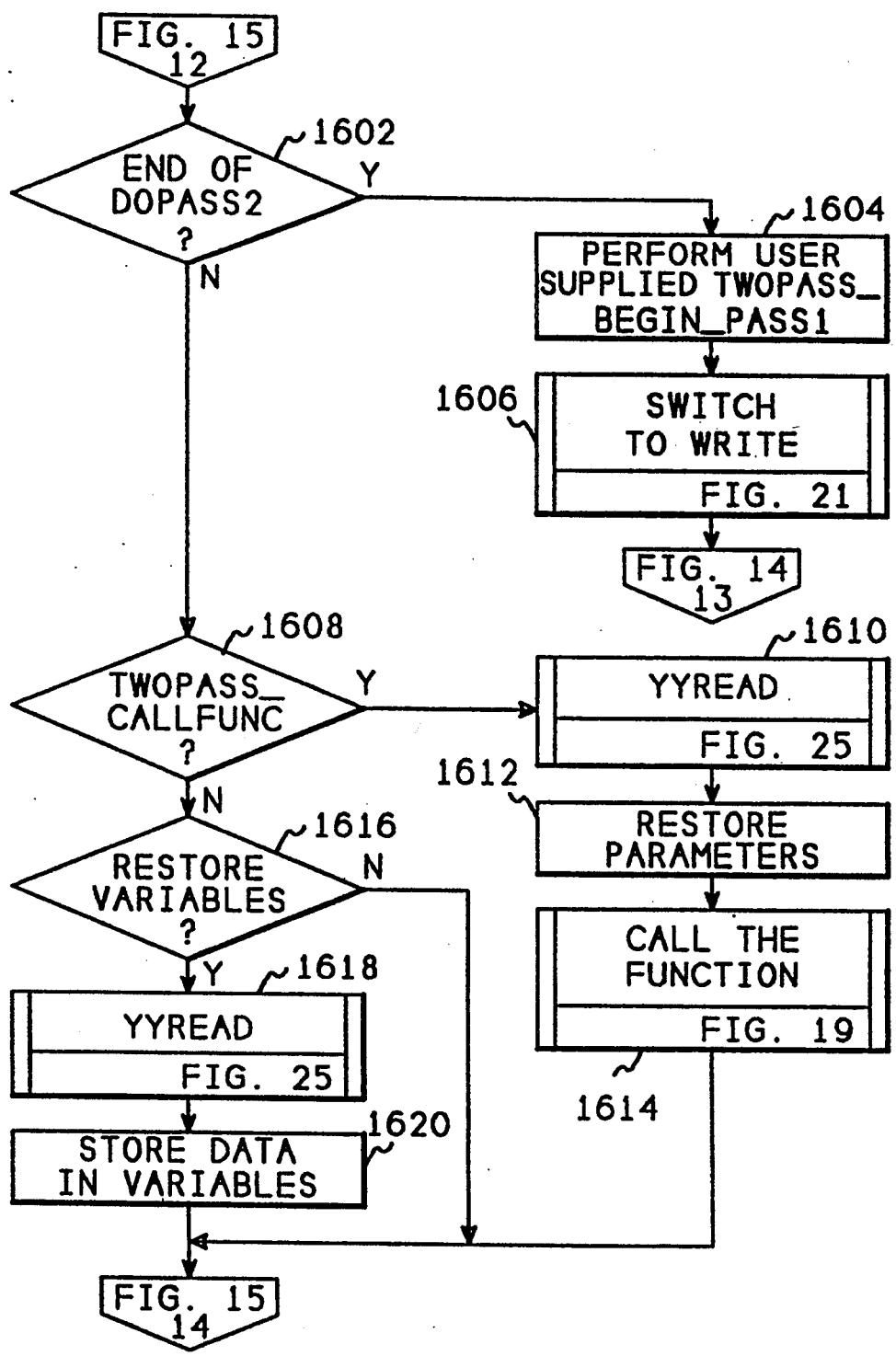

FIGS. 14–16 show a flowchart of the parser for the twopass compiler 126 of FIG. 2. The parser section of the twopass compiler 126 is copied from the twopass parser driver 210 and is incorporated along with the user production code received from the parser 122 through file 208. The post processor 124 combines the user production code from the file 208 with the twopass parser driver code 210 to create a source file 212 which, after being compiled by the compiler 214, becomes the twopass compiler 126. The user production code, of course, is supplied by the user along with the language grammar file 204 and will not be discussed further.

Referring now to FIGS. 14–16, when the twopass compiler is started control enters FIG. 14 at block 1402. Block 1402 puts initial values into all the variables used by the parser, and then block 1404 calls FIG. 21 to switch the parser into the write mode. When the parser is in the write mode, each state of the parser will be written to a parse file for use by pass 2 of the compiler.

The parse file is a linear sequence of two byte control records of the form:

Bits 0–10: New state, or a special token value which indicates a special record.

Bit 11: Many uses: Indicates that a data record follows (from twopass_save) for a normal parser state. Indicates an Error function, if the state identifies this as a twopass_callfunc special record. Provides the upper bit of a TWOPASS VAR delta.

Bits 12–15: Type of special code if New State indicates a Special record. The number of new tokens to be added to the yacc stack for a normal state.

In addition to the control records, data records may follow a control record.

After switching to the write mode, control returns to block which calls the user supplied twopass_begin_pass1 function. This function, supplied by the user code within the language grammar 204 (FIG. 2), allows the user to perform any desired operations prior to the commencement of the pass 1 code. This function is optional and need not be included by the user. After returning from the user supplied function, block 1408 gets the next token from the source file being processed. This token is obtained using a scanner function. This scanner is supplied by the user, and may be defined using the lex program, in a manner similar to the scanner described above with respect to FIGS. 10–12. Block 1410 then determines whether the end of the source file has been reached, and if not, control goes to block 1412 which parses the token received to determine which, if any, production code to execute. This parsing is performed using the yacc parser generator, which is described above and is well known in the art. In the process of performing the parse, the parser will arrive at a particular parser state and pass this state to block 1414 which writes the state to the PARSEFILE, which will be used for pass 2. After writing the state to the PARSEFILE, Block 1416 determines whether there are any user actions for this state. This is determined by using the state as an index into the yyr2 table, which defines actions. If the entry in yyr2 table for this state indicates that there are actions, block 1416 transfers to block 1418 which sets up parameter values. Block 1420 then performs the user pass1 or pass12 action defined for this state. Thus, all the actions designated as pass2, or pass12, will be performed at this point in the processing. After performing the user action, block 1420 transfers back to block 1408 to get the next token. If there are no user actions, block 1416 transfers to block 1422 which cleans up the yacc stack before returning to block 1408. This loop continues until the end of the input source file is reached, unless a twopass_dopass2 function is encountered (see FIG. 28 below), at which time this loop is suspended until the pass two processing is completed, then the loop resumes.

Thus, the processing of pass 1 is similar to conventional, well known, compilers, except that each parser state is saved in the PARSEFILE, and only the productions that are defined to be performed during pass 1 or pass 12 will actually be performed. When the end of the input source file is reached, block 1410 transfers to block 1502 of FIG. 15.

FIGS. 15 and 16 show a flowchart of the processing for the second pass of the twopass compiler. Block 1502 calls the twopass_begin_pass2 function supplied by the user. Like the twopass_begin_pass1 function described above, the user may supply code that will be executed prior to the start of any pass 2 processing. After returning from the user function, block 1504 calls FIG. 22 to switch the processing of the PARSEFILE to read mode. Block 1506 then reads the next state from the PARSEFILE and block 1507 determines if end of file has been reached. If end of file was encountered, control returns to the caller, otherwise block 1508 determines whether this state is a special state. Special states are defined below. If the state is not a special state, block 1508 transfers to block 1510 which puts the state on the yacc stack so that it can be processed.

There are actually two yacc stacks, one for the states being processed, and one for the tokens (and return values from previous productions) involved in each production. During the first pass, the state that is pushed onto the state stack is placed into the intermediate file, along with the most recent change in the token stack (how many tokens had been added since the last reduction). During the second pass, the state stack is irrelevant, since the states come in linear order in the intermediate file. However, the token stack is maintained given the count of tokens that was carried along with the state information. So, in the second pass, the state stack is not modified, and the token stack is only added to. In both passes, the token stack is reduced by the reduction of a production, given the count of tokens to be removed in the yyr2 table.

Block 1512 then determines whether there are any user actions for this state. This is determined by using the state as an index into the yyr2 table, which defines actions. If the entry in yyr2 table for this state indicates that there are actions, block 1512 transfers to block 1514 which takes data read in block 1506 and sets up the parameter values for the parameters as they existed at this point in the pass 1 processing. Block 1518 then performs the user pass1 or pass12 action defined for this state. Thus, all the actions designated as pass2, or pass12, will be performed at this point in the processing. After performing the user action, block 1518 transfers back to block 1506 to read the next state.

If block 1512 determines there are no user actions for this state, it transfers to block 1516 which cleans up the yacc stack in preparation for reading the next state from the PARSEFILE before transferring back to block 1506 to get the next state. Thus, in the manner described above, the pass two functions are all accomplished without having to reparse the tokens from the original input source file.

If block 1508 determines that this is a special state, block 1508 transfers to block 1602 of FIG. 16. Special states are states inserted into the PARSEFILE to set up the conditions for pass 2 processing.

Figure 28:
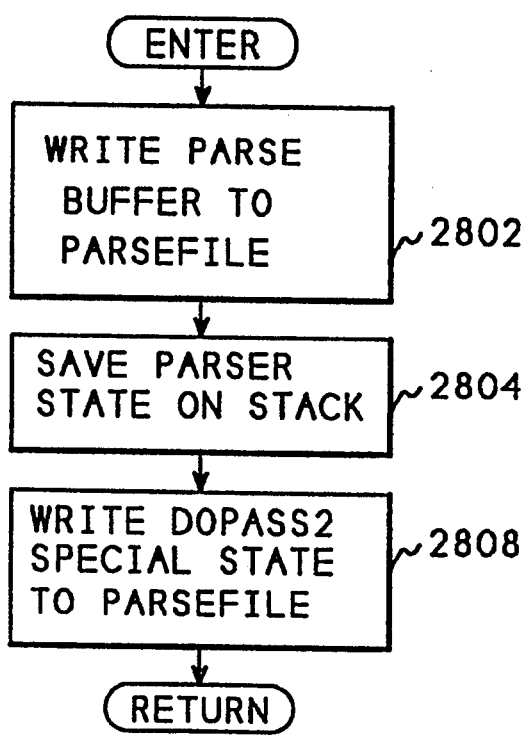
FIG. 28 Shows a flowchart of the twopass_dopass2 function available in the twopass compiler.

Block 1602 determines whether the state is an END OF DOPASS2 state. One of the operations that a user of the system may request is a suspension of pass 1 processing and an immediate processing of pass 2. This is done by using the TOPASS_DOPASS2 macro within user production code. When this macro is encountered, the flowchart of FIG. 28 is processed resulting in a switch from pass 1 processing to pass 2 processing. Before the switch occurs, an END_OF_DOPASS2 token is placed in the PARSEFILE. When this token is encountered during pass 2 processing, block 1602 transfers to block 1604. Block 1604 then performs the user supplied twopass_begin_pass1 function a second time, or subsequent times if the macro is used multiple times, and then block 1606 calls FIG. 21 to switch back to the write state. After FIG. 21 completes its processing, control returns to FIG. 14 block 1408 where pass 1 processing resumes.

Figure 19:
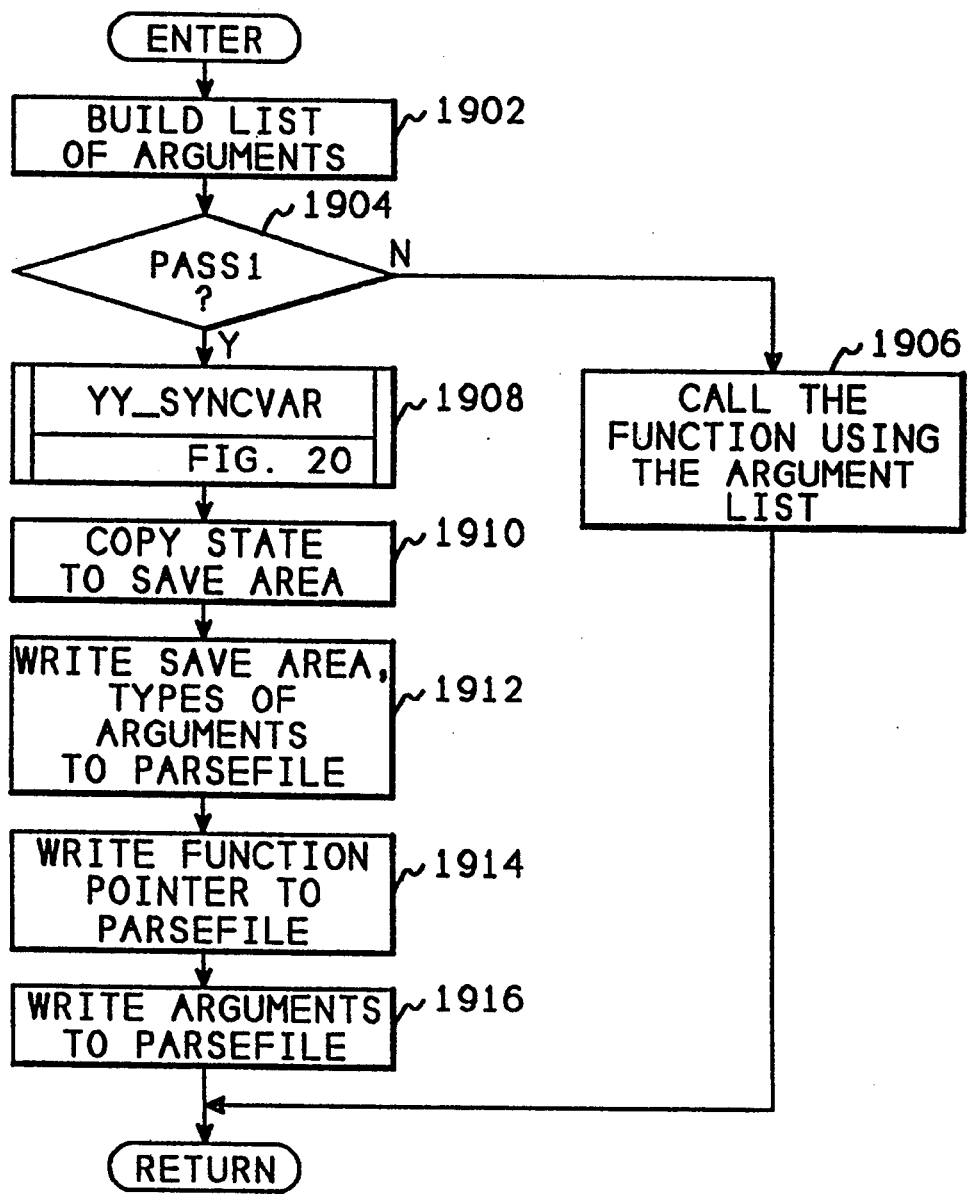
FIG. 19 shows a flowchart of the twopass_callfunc available for use in the twopass compiler.

If the special state is not an END_OF_DOPASS2 state, block 1602 transfers to block 1608 which determines whether the state is a TWOPASS_CALLFUNC state. When the user performs a twopass call function operation, the code described by FIG. 19 is performed which places a TWOPASS_CALLFUNC state and the name of a function to be called during pass 2 into the parser file along with the parameters for calling that function. When this state is encountered during the pass 2 processing, block 1608 transfers to block 1610 which calls FIG. 25 to read the parameters from the PARSEFILE. Block 1612 then restores these parameters in memory and block 1614 calls the function which was specified in the original twopass_callfunc statement. After performing the function, control returns to FIG. 15 block 1506.

If the state is not a TWOPASS CALLFUNC state, control goes to block 1616 which determines whether the state is a restore variables state. If so, control goes to block 1618 which calls FIG. 25 to read the data for the variables, and block 1620 stores the data read into the variables. After restoring the variables, or if the state is not a restore variables state, control returns to FIG. 15, block 1506.

Figure 17:
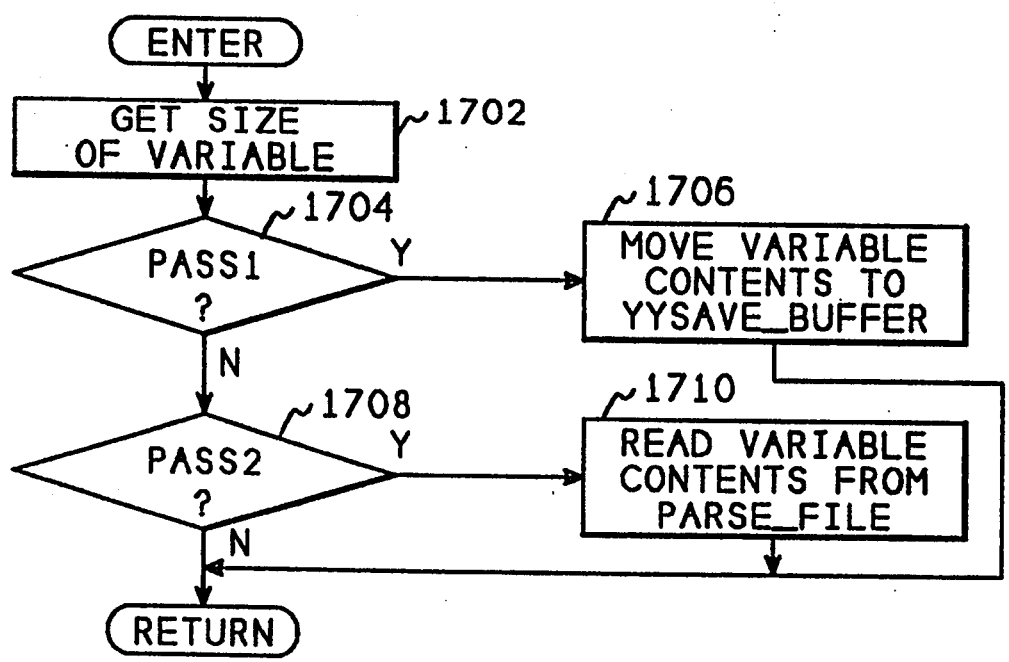
FIG. 17 shows a flowchart of the twopass_save function available for use in the twopass compiler.

FIG. 17 shows a flowchart of the TWOPASS_SAVE function which the user of the system can call at any point in the grammar to save and restore a variable. Since this function is called by the user production code, no call is shown directly above in the description of FIGS. 14-16. When this function is called, block 1702 first gets the size of the variable requested. Block 1704 then determines whether pass 1 is being processed and if it is, transfers to block 1706 which moves the contents of the variable to the yysave_buffer which will be written at the time the parser state is written to the PARSEFILE in block 1414 described above. If the processing is not pass 1, block 1704 transfers to block 1708 which determines whether pass 2 is being processed. If pass 2 is being processed, block 1708 transfers to block 1710 which reads the variable contents from the PARSEFILE and places them back into the variable location in memory. After saving the contents, restoring the contents, or if the pass is not pass 1 or pass 2, FIG. 17 then returns to its caller. Note that twopass_save is called in the first pass and in the second pass at the same point in the source.

Figure 18:
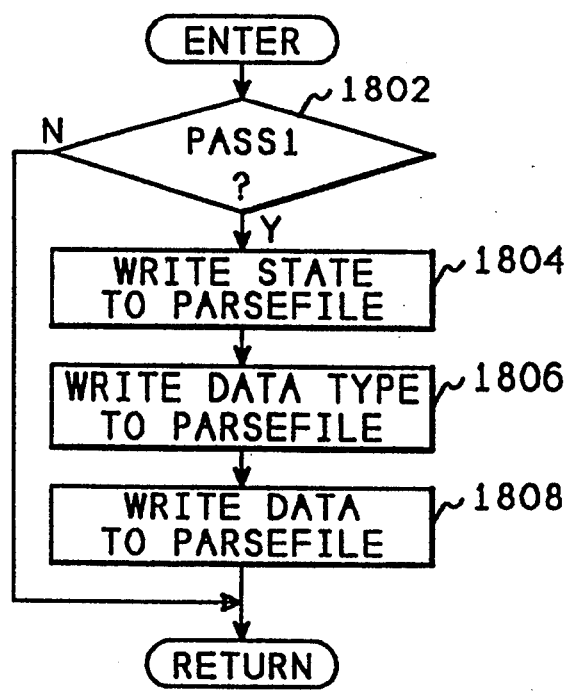
FIG. 18 shows a flowchart of the twopass_restore function available for use in the twopass compiler.

FIG. 18 shows a flowchart of the twopass_restore function described above. When this function is called, either from inside or outside the grammar, block 1802 determines whether the code is within pass 1 and if not, simply returns to its caller, since the restore of the variable during pass 2 is done in the pass 2 special state code of FIG. 16, specifically in blocks 1618 and 1620. If pass 1 is being processed, block 1802 transfers to block 1804 which writes the restore variables state to the PARSEFILE and then block 1806 writes the data type to the PARSEFILE. Finally, block 1808 writes the actual data to the PARSEFILE which will be restored as described above.

Twopass_save and twopass-restore are not related, but are independent functions.

Twopass_save does two different things, based on which pass is involved. During the first pass, twopass_save will save the contents of a variable to the intermediate file. No record of where or how the variable got there are placed in the file with the variable, just the data, in order to reduce the size of the file. During the second pass, twopass_save will restore the value of a variable that was previously stored during the first pass. The second pass needs information on what exists in the intermediate file, however, this information is implicitly provided because the same twopass_save call in the first pass is again executed in the second pass, thus it implicitly has all the same information it had in the first pass when it is executed in the second pass.

Twopass_restore is used for variables outside of the grammar. Instead of insisting that twopass_restore be executed again in exactly the same way in the second pass, which is hard to do outside of the grammar, the first twopass_restore puts a special record in the intermediate file, which contains both the data and the location to which it should be restored. When this record is processed in the second pass, the data is automatically put back in the variable.

FIG. 19 shows a flowchart of the twopass_callfunc which is available to the user of the system. As described above, when the user uses this function, the actual function call is deferred from pass 1 to pass 2. The user provides the name of the function to be called in pass 2, along with the arguments which are to be passed to that function. When the function is performed, the flowchart of FIG. 19 is called at block 1902. Block 1902 builds the list of arguments specified by the user and then block 1904 determines whether the function is being called from pass 1 or pass 2. If it is being called from pass 2, block 1904 transfers to block 1906 which calls the function using the argument list and then returns to the caller. If the function is being called from pass 1, block 1904 transfers to block 1908 which calls FIG. 20 to save all the TWOPASS VAR data as described above. Block 1910 then writes a special record to the PARSEFILE indicating that this is a twopass_callfunc, how many arguments are involved, and if the call is a special error type. Block 1912 then writes the types of the arguments to the PARSEFILE. Block 1914 then writes a pointer to the function to the PARSEFILE and then block 1916 writes the arguments to the PARSEFILE. These will all be read, restored, and the function called during pass 2.

Figure 20:
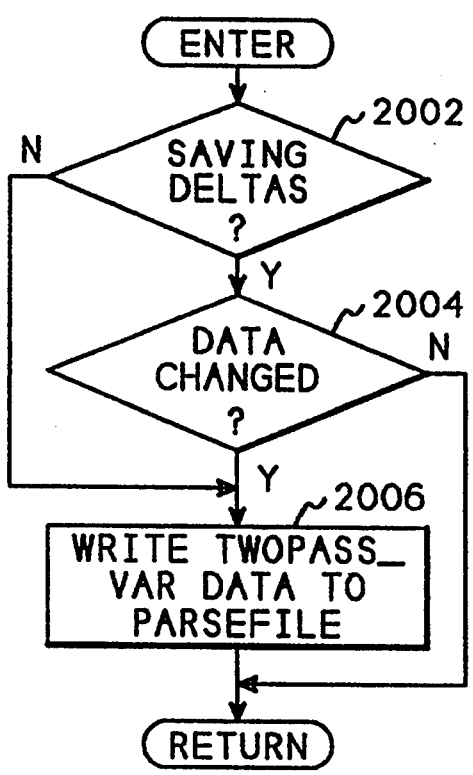
FIG. 20 shows a flowchart of the yy_syncvar function called from FIG. 19.

FIG. 20 shows the yy_syncvar function called from FIG. 19. After entry, block 2002 determines whether deltas are being saved or whether the full variables are being saved. Deltas are used when the change is small. This is very useful for data such as line numbers which usually increment by a small number. The record in the PARSEFILE is structured in such a way that a small delta can fit into three bits (up to a maximum value of 8). If the change cannot fit into this space, then the new value is written. Deltas are used to reduce the size of the intermediate file, and are not necessary.

If deltas are being saved, block 2002 transfers to block 2004 which determines whether any data has changed and if not, it simply returns to the caller. If data has changed, or if deltas are not being saved, control goes to block 2006 which writes the TWOPASS VAR data to the PARSEFILE. This data will be restored during pass 2 processing of the special state described above with respect to FIG. 16.

Figure 21:
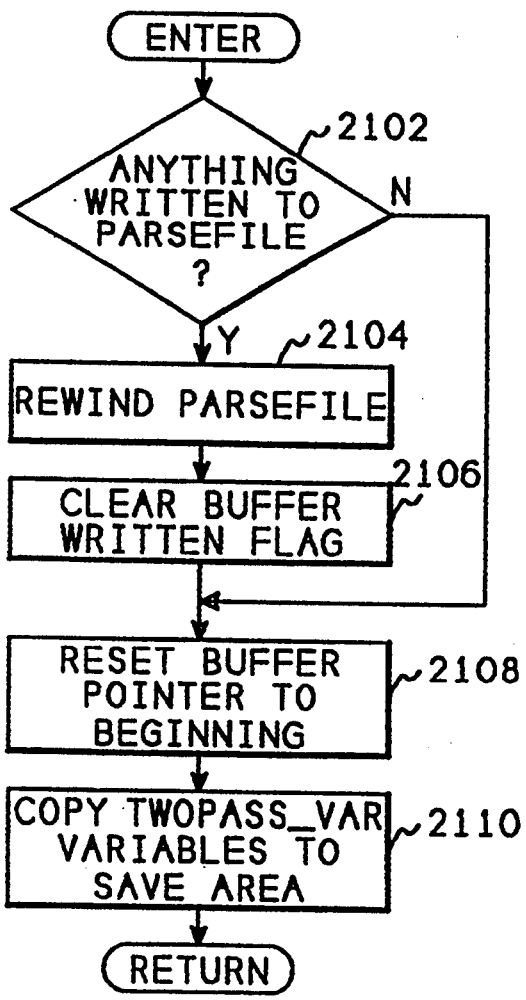
FIG. 21 shows a flowchart of the switch to write function called from, FIGS. 14 and 16.

FIG. 21 shows a flowchart of the switch to write function called from FIGS. 14 and 16. Referring now to FIG. 21, after entry, block 2102 determines whether anything has been written to the PARSEFILE by examining a bytes written counter in memory. If some data has been written to the PARSEFILE, block 2102 transfers to block 2104 which rewinds the PARSEFILE, and then block 2106 clears the buffer written flag. After clearing the flag, or if nothing had been written to the PARSEFILE, control goes to block 2108 which resets the parse buffer pointer to the beginning and then block 2110 copies all of the TWOPASS__ VAR variables to a save area before returning to its caller.

In the PARSEFILE, data is compacted as much as possible to avoid unnecessary I/O. A large buffer is used to avoid unnecessary I/O. In many cases, the intermediate file will not grow beyond the size of the buffer, thus avoiding the need for I/O to a peripheral device. Also, the PARSEFILE is only written and read sequentially, no seeks are performed to improve speed.

Figure 22:
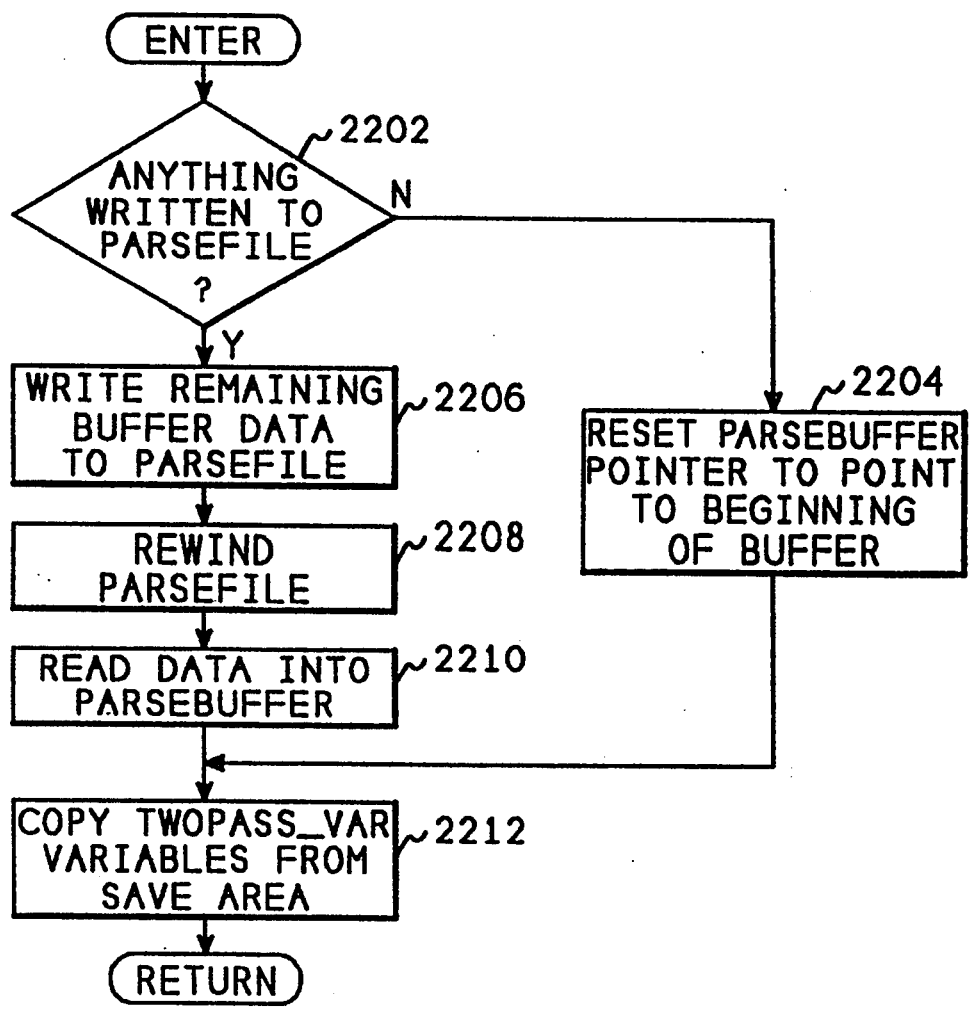
FIG. 22 shows a flowchart of the switch to read function called from FIG. 15.

FIG. 22 shows a flowchart of the switch to read function which is called from FIG. 15. Referring now to FIG. 22, after entry, block 2202 determines whether anything was written to the PARSEFILE by examining a bytes written counter in memory. If something has been written to the PARSEFILE, block 2202 transfers to block 2206 which writes the remaining parse buffer data to the PARSEFILE and then block 2208 rewinds the PARSEFILE. Block 2210 then reads as much data from the PARSEFILE as the parse buffer will hold.

If nothing had been written to the PARSEFILE, block 2202 transfers to block 2204 which resets the parse buffer pointer to point to the beginning of the buffer. After resetting the pointer, or after block 2210 reads data into the parse buffer, control goes to block 2212 which copies all of the TWOPASS_VAR variables data from the save area where they were placed by the switch to write function described above, and then returns to the caller.

Figure 23:
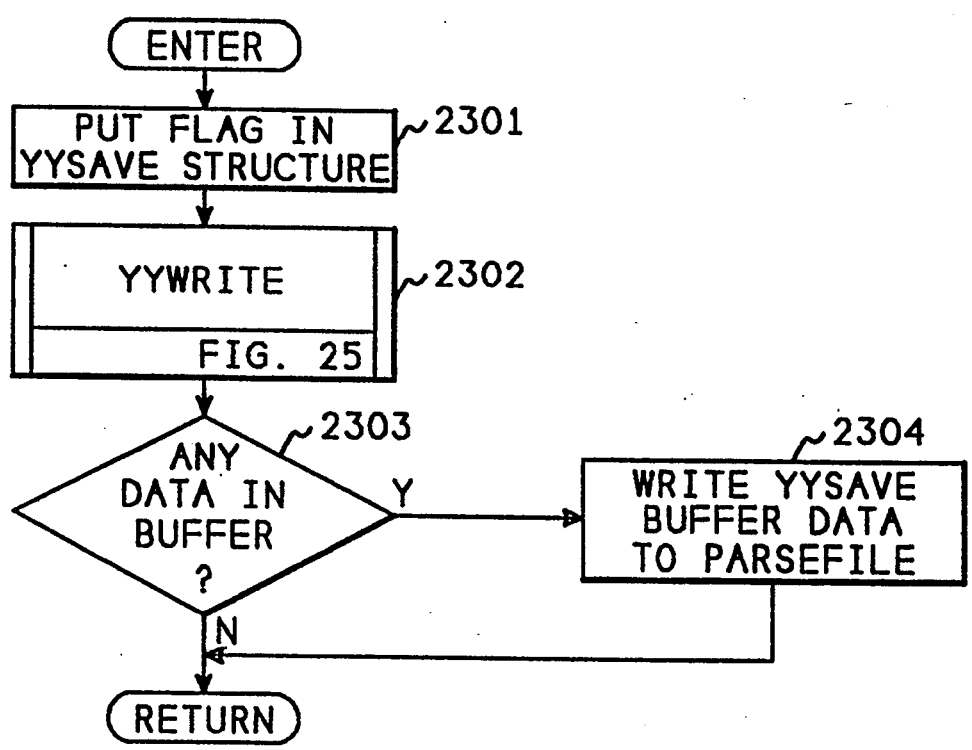
FIG. 23 shows a flowchart of the write state function called from FIG. 14.

FIG. 23 shows a flowchart of the write state function called from FIG. 14. Referring now to FIG. 23, block 2301 puts a flag in the yysave structure indicating whether any data exists in the parse buffer. Block 2302 then writes the yysave structure to the PARSEFILE and block 2303 determines whether there was any data in the buffer and if so, transfers to block 2304 which writes the buffer data to the PARSEFILE.

Figure 24:
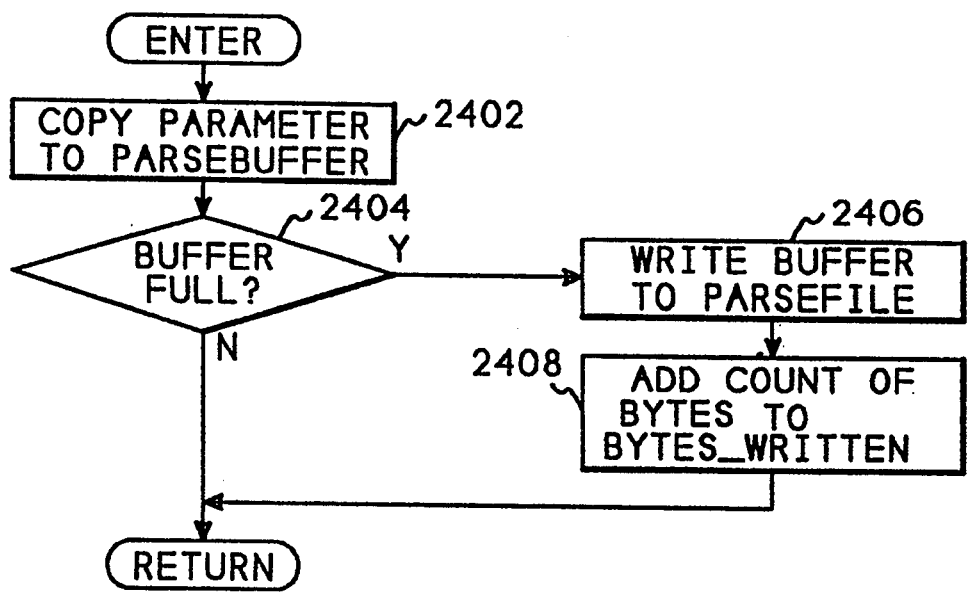
FIG. 24 shows a flowchart of the yywrite function called from FIG. 23.

FIG. 24 shows a flowchart of the yywrite function called from many of the above flowcharts. Referring now to FIG. 24, after entry, block 2402 copies the parameter to the parse buffer and block 2404 determines whether the parse buffer is full. If the parse buffer is full, block 2404 transfers to block 2406 which writes the buffer contents to the PARSEFILE and then block 2408 adds a count of the bytes written to a bytes written counter which indicates that some data has been written to the PARSEFILE. After writing the data to the PARSEFILE, or if the buffer was not full, FIG. 24 returns to its caller.

Figure 25:
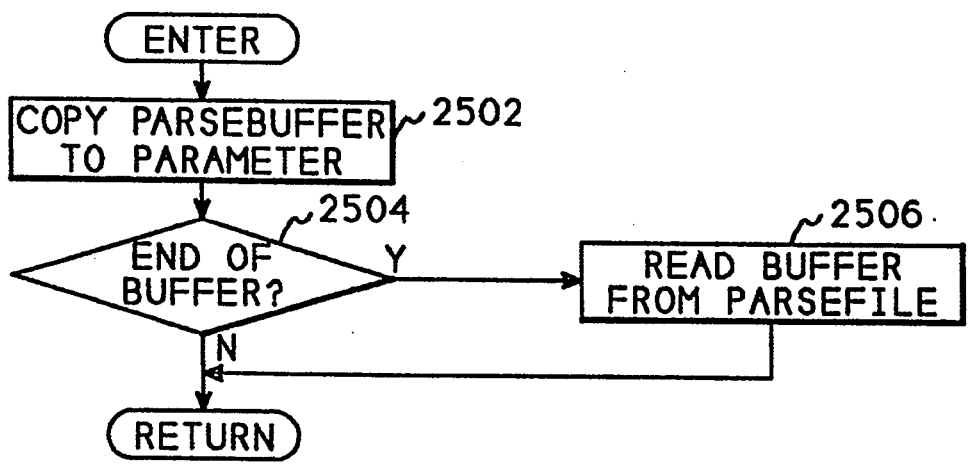
FIG. 25 shows a flowchart of the yyread function called from FIGS. 15 and 16.

FIG. 25 shows a flowchart of the yyread function called from various locations in the above flowcharts. Referring now to FIG. 25, after entry, block 2504 copies data from the parse buffer to the parameter that was requested to be read. Block 2504 then determines whether there is any data left in the parse buffer and if not, transfers to block 2506 which reads buffer data from the PARSEFILE to refill the parse buffer. After refilling the parse buffer, or if the buffers contained more data, FIG. 25 returns to its caller.

Figure 26:
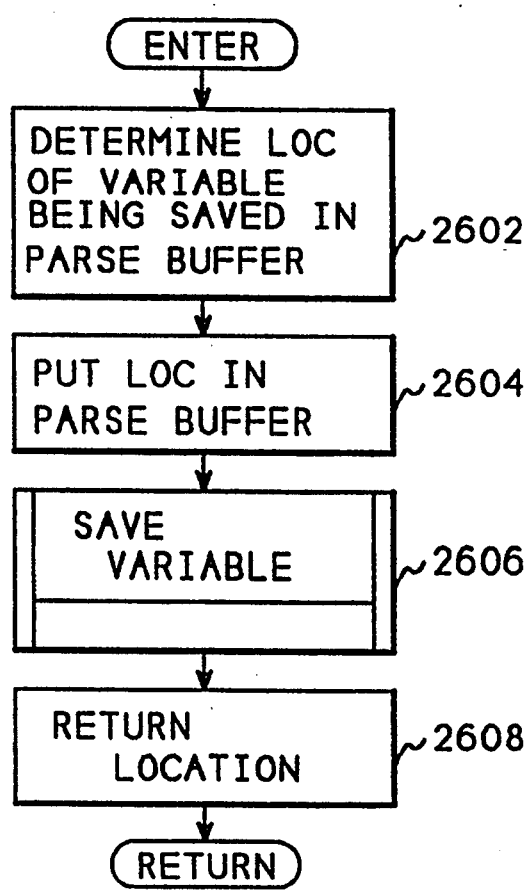
FIG. 26 shows a flowchart of the twopass_save_loc function available in the twopass compiler.

FIG. 26 shows a flowchart of the TWOPASS__SAVE__LOC function available in the twopass compiler. This function, used in conjunction with the TWOPASS__STUFF__LOC function, allows a user to save information and make the information available in pass2 at a location earlier in the processing than where the information is saved. TWOPASS STUFF LOC need not be called, however, in which case TWOPASS SAVE LOC functions in the same manner as twopass-_save.

Referring now to FIG. 26, after entry, block 2602 determines the location in the parse buffer where the next variable will be stored. Block 2604 writes this location to the parse buffer, and block 2606 calls FIG. 17 (twopass__save) to save the variable. Block 2608 then returns the location to the user.

Figure 27:
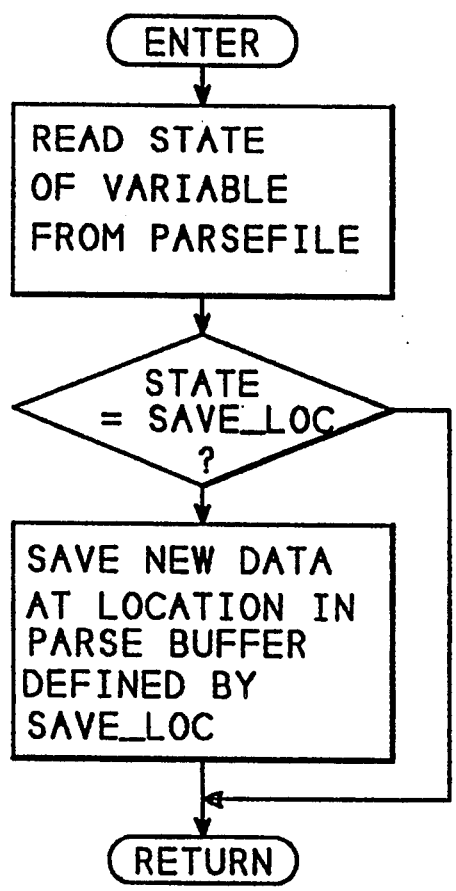
FIG. 27 shows a flowchart of the twopass_stuff_loc function available in the twopass compiler.

FIG. 27 shows a flowchart of the TWOPASS__STUFF__LOC function. Referring now to FIG. 27, after entry, block 2702 uses the location from the TWOPASS SAVE LOC. call earlier to read the state from the PARSEFILE. Block 2704 then determines if the state was a SAVE LOC state, and if so, goes to block 2706 which saves the new data at the location identified by the TWOPASS__SAVE__LOC function. After saving the data, or if the state was not the SAVEo__LOC state, control returns to the caller.

FIG. 28 shows a flowchart of the twopass__dopass2 function available to the user. This function causes the twopass compiler to suspend pass1 operations, and perform all pass2 operations defined already for the source file. Referring now to FIG. 28, after entry, block 2802 writes the parse buffer to the PARSEFILE. Block 2804 then saves the current parser state on the system stack, so that pass1 processing can resume after the pass2 processing is complete. Block 2806 then writes the END__OF__DOPASS2 special state to the PARSEFILE, and transfers to FIG. 15 to start the pass2 processing. When FIG. 15 encounters the END__OF__DOPASS2 special state, it resumes pass1 processing.

The following listings show an example of a compiler implemented using the twopass compiler of the present invention.

Listing 1, shown in Appendix A, shows the input source, Listing 2, also shown in Appendix A, shows the intermediate file 410 (FIG. 4) for this source. Appendix A contains a user's guide for the system, Appendix B contains the source for the lexical scanner described in FIGS. 10–12, Appendix C contains the source code for the parser described in FIGS. 5–9, and Appendix D contains the source code for the run-time parser described in FIGS. 13–28.

APPENDIX-A

Listing 1

```
%{ /* -*-C-*- */

/* Equation solver (VERY simple form); an example Twopass program.
 *
 * This program takes as input a file of equations, of the form
 *       v = expr
 * where v is a single character variable name, and expr is an infix
 * expression of constants and variables.  An equation of the form
 *       y = constant
 * is considered a constant equation, and y in this case is a constant
 * variable.  For the purposes of this program, any expression is considered
 * non constant, even if it consists of only constants.  Only a single
 * floating point number with an optional minus sign in front is considered
 * a constant.
 *
 * This program calculates the values of all non-constant variables and
 * then prints them out upon EOF.
 *
 * All white space in the input
 * is ignored, but a newline does indicate the end of an equation.
 *
 * If this were a one pass program, then we could only use constant variables
 * which had already been defined previously in the file.  As a two pass
 * program, we can use constant variables which are defined ANYWHERE in the
 * file.  Other non-constant variables may also be used, given that they
 * are defined before use.
 *
 * For example the input file:
 *    r = 5
 *    a = r*r * p
 *    s = 2 * r * p
 *    t = a/r*2
 *    p = 3.1415
 * Results in:
 *    a = 78.537498
 *    p = 3.141500
 *    r = 5.000000
 *    s = 31.415001      <---- Typical floating point differences
 *    t = 31.414999      <--/
 * Note that 'p' (short for pi) was used before being defined.  But since
 * it is a constant variable this is ok.  The first pass will pick up
 * these constants for the second pass to use.  Also note that the second
 * pass defined the value for 'a' so that the 't' equation could use it.
 *
 * If this were a multi pass program, then the distinction between
 * a constant and non-constant variable would not be necessary, since we
 * could continue to iterate on the equations until they were either found
 * to be inconsistent, or final values for each variable were obtained.
 */ include <stdio.h>
include <ctype.h> struct
{
    int full;           /* Flag indicating when the variable has a value */
    float val;          /* The value given to this variable */
} variable['z'+1];

int vals;               /* 1 = constant expr, >1 = non-constant expr */
%}

%union {
        float num;      /* Floating point number (constant from user) */
        int var;        /* Variable (ascii code for variable name) */
}
%token NUM VAR %type <num> expr NUM val
%type <var> VAR %left '+' '-'
%left '*' '/'
%right UMINUS %start set
```

```
%%
set:    equ
        2{ int i;
            for( i = 'a'; i <= 'z'; i++ )
                if( variable[i].full )
                {
                    printf( "%c = %f\n", i, variable[i].val );
                    variable[i].full = 0;
                }
        }
        ;

equ:    assign equ
        | /* empty */
        ;

assign: VAR '=' 1{ vals = 0; } expr '\n'
        *{
            1{ if( vals == 1 )
                {
                    variable[$1].val = $4;
                    variable[$1].full = 1;
                }
            }
            TWOPASS_SAVE($1);
            2{
                variable[$1].val = $4;
                variable[$1].full = 1;
            }
        }
        ;

val:    NUM
        *{
          TWOPASS_SAVE( $1 );
          1{ vals++; }
          2{ $$ = $1; }     /* we changed $1 above, need to change $$ too */
        }
        | VAR
        *{
          TWOPASS_SAVE( $1 );
          1{ vals += 2; }
          2{
              if( variable[$1].full )
                  $$ = variable[$1].val;
              else
                  fprintf( stderr,
                          "Use of variable '%c' before definition",
                          $1 );
          } }
        ;

/* The UMINUS production needs to be done on BOTH passes to handle
 * negative constants.
 */
expr:   expr '+' expr           2{ $$ = $1 + $3; }
        | expr '-' expr         2{ $$ = $1 - $3; }
        | expr '*' expr         2{ $$ = $1 * $3; }
        | expr '/' expr         2{ $$ = $1 / $3; }
        | '(' expr ')'          2{ $$ = $2; }
        | '-' expr   %prec UMINUS  *{ $$ = - $2; }
        | val
        ;

%% ifdef YYDEBUG
int yylex()  { int c = real_yylex();
               printf( ">> Token: '%c' (%d)\n", c, c );
               return( c ); }
int real_yylex()
#else
int yylex()
#endif
{
    static int equseen = 0;
    int c;

while( 1 )
    {
        switch( c = getchar() )
```

```
      {
         case EOF:
           return( 0 );
           break;
         case '0': case '1': case '2': case '3': case '4':
         case '5': case '6': case '7': case '8': case '9': case '.':
           ungetc( c, stdin );
           scanf( "%f", &yylval.num );
           return( NUM );
           break;
         case '=':
           equseen = 1;           /* Fall Through! */
         case '-': case '+': case '*': case '/':
         case '(': case ')':
           return( c );
           break;
         case '\n':
           if( equseen ) { equseen = 0; return( '\n' ); }
           break;
         case ' ': case '\t':     /* Spaces are ignored */
           break;
         default:
           if( isalpha( c ) )
           {
                yylval.var = (isupper(c) ? tolower(c) : c);
                return( VAR );
           }
           break;
      }
    }
} main()
{
#ifdef YYDEBUG
    extern int yydebug;
    yydebug = 1;
#endif
    yyparse();
}

/* No need for any code in these... */
twopass_begin_pass1()    ()
twopass_begin_pass2()    ()
yyerror()                ()
```

Listing 2

```
%{
#define TWOPASS 1
%}
%{ /* -*-C-*- */

/* Equation solver (VERY simple form); an example Twopass program.
 *
 * This program takes as input a file of equations, of the form
 *      v = expr
 * where v is a single character variable name, and expr is an infix
 * expression of constants and variables.  An equation of the form
 *      y = constant
 * is considered a constant equation, and y in this case is a constant
 * variable.  For the purposes of this program, any expression is considered
 * non constant, even if it consists of only constants.  Only a single
 * floating point number with an optional minus sign in front is considered
 * a constant.
 *
 * This program calculates the values of all non-constant variables and
 * then prints them out upon EOF.
 *
 * All white space in the input
 * is ignored, but a newline does indicate the end of an equation.
 *
 * If this were a one pass program, then we could only use constant variables
 * which had already been defined previously in the file.  As a two pass
 * program, we can use constant variables which are defined ANYWHERE in the
 * file.  Other non-constant variables may also be used, given that they
 * are defined before use.
 *
 * For example the input file:
 *    r = 5
 *    a = r*r * p
 *    s = 2 * r * p
```

```
*   t = a/r*2
*   p = 3.1415
* Results in:
*   a = 78.537498
*   p = 3.141500
*   r = 5.000000
*   s = 31.415001        <---- Typical floating point differences
*   t = 31.414999        <--/
* Note that 'p' (short for pi) was used before being defined. But since
* it is a constant variable this is ok. The first pass will pick up
* these constants for the second pass to use. Also note that the second
* pass defined the value for 'a' so that the 't' equation could use it.
*
* If this were a multi pass program, then the distinction between
* a constant and non-constant variable would not be necessary, since we
* could continue to iterate on the equations until they were either found
* to be inconsistent, or final values for each variable were obtained.
*/ include <stdio.h>
include <ctype.h> struct
{
    int full;          /* Flag indicating when the variable has a value */
    float val;         /* The value given to this variable */
} variable['z'+1];

int vals;              /* 1 = constant expr, >1 = non-constant expr */
%}

%union {
        float num;     /* Floating point number (constant from user) */
        int var;       /* Variable (ascii code for variable name) */
}

%token NUM VAR

%type <num> expr NUM val
%type <var> VAR

%left '+' '-'
%left '*' '/'
%right UMINUS

%start set

%% set:    equ
        { pass2( /*__TWOPASS_PASS:2*/  int i;
            for( i = 'a'; i <= 'z'; i++ )
                if( variable[i].full )
                {
                        printf( "%c = %f\n", i, variable[i].val );
                        variable[i].full = 0;
                }
        )}
        ;

equ:    assign equ
        | /* empty */
        ;

assign: VAR '=' { pass1( /*__TWOPASS_PASS:1*/  vals = 0; )} expr '\n'
        { pass12( /*__TWOPASS_PASS:7*/
            { if(yydopass&8) pass1( if( vals == 1 )
                {
                    variable[$1].val = $4;
                    variable[$1].full = 1;
                }
            )}
            TWOPASS_SAVE($1);
            { if(yydopass&2) pass2(
                variable[$1].val = $4;
                variable[$1].full = 1;
            )}
        )}
        ;
```

```
val:        NUM
            { pass12( /*__TWOPASS_PASS:7*/
              TWOPASS_SAVE( $1 );
              { if(yydopass&8) pass1( vals++; )}
              { if(yydopass&2) pass2( $$ = $1; )}     /* we changed $1 above, need to change $$ too */
            )}
        |   VAR
            { pass12( /*__TWOPASS_PASS:7*/
              TWOPASS_SAVE( $1 );
              { if(yydopass&8) pass1( vals += 2; )}
              { if(yydopass&2) pass2(
                  if( variable[$1].full )
                      $$ = variable[$1].val;
                  else
                      fprintf( stderr,
                              "Use of variable '%c' before definition",
                              $1 );
              )} )}
            ;

/* The UMINUS production needs to be done on BOTH passes to handle
 * negative constants.
 */
expr:       expr '+' expr               { pass2( /*__TWOPASS_PASS:2*/  $$ = $1 + $3; )}
        |   expr '-' expr               { pass2( /*__TWOPASS_PASS:2*/  $$ = $1 - $3; )}
        |   expr '*' expr               { pass2( /*__TWOPASS_PASS:2*/  $$ = $1 * $3; )}
        |   expr '/' expr               { pass2( /*__TWOPASS_PASS:2*/  $$ = $1 / $3; )}
        |   '(' expr ')'                { pass2( /*__TWOPASS_PASS:2*/  $$ = $2; )}
        |   '-' expr     %prec UMINUS   { pass12( /*__TWOPASS_PASS:3*/ $$ = - $2; )}
        |   val
            ;

%% ifdef YYDEBUG
int yylex()   { int c = real_yylex();
                printf( ">> Token: '%c' (%d)\n", c, c );
                return( c ); }
int real_yylex()
#else
int yylex()
#endif
{
    static int equseen = 0;
    int c;

while( 1 )
    {
        switch( c = getchar() )
        {
          case EOF:
            return( 0 );
            break;
          case '0': case '1': case '2': case '3': case '4':
          case '5': case '6': case '7': case '8': case '9': case '.':
            ungetc( c, stdin );
            scanf( "%f", &yylval.num );
            return( NUM );
            break;
          case '=':
            equseen = 1;           /* Fall Through! */
          case '-': case '+': case '*': case '/':
          case '(': case ')':
            return( c );
            break;
          case '\n':
            if( equseen ) { equseen = 0; return( '\n' ); }
            break;
          case ' ': case '\t':    /* Spaces are ignored */
            break;
          default:
            if( isalpha( c ) )
            {
                yylval.var = (isupper(c) ? tolower(c) : c);
                return( VAR );
            }
            break;
        }
    }
} main()
```

```
{
#ifdef YYDEBUG
    extern int yydebug;
    yydebug = 1;
#endif
    yyparse();
}

/* No need for any code in these... */
twopass_begin_pass1()    {}
twopass_begin_pass2()    {}
yyerror()                {}
```

Appendix B

```
/* -*-C-*- */
/* file twopass.l */
/* Copyright 1993 Hewlett Packard Company, All Rights Reserved */
/* scanner for yacc specification */

%{
#include "y.tab.h"
#include <stdio.h>
include <ctype.h>
#if CHKMEM
#include "chkmem.h"
endif static char *ssb, *sb;

define ret(c,p) \
            { yylval.s = (struct tok *) calloc( 1, sizeof(struct tok) ); \
              if( (yylval.s->space = ssb) ) { *sb = '\0'; ssb = NULL; } \
              yylval.s->token = (char *) malloc( yyleng+1 ); \
              strcpy( yylval.s->token, yytext ); \
              yylval.s->line = yylineno; yylval.s->pass = p; return( c ); } define space_to_2( d1, d2 ) { char c1, c2; \
                               for( c1 = c2 = 1; \
                                    c2 && (c1 != d1 || c2 != d2); \
                                    c1 = c2, c2 = input(), space(c2) ) ; }
#define space_to_1( d1 )     { char c1; \
                               for( c1 = 1; c1 && (c1 != d1); \
                                    c1 = input(), space(c1) ) ; }
define space_str( a )  { char *s; for( s = (char *)(a); *s; s++ ) space(*s); } static void space( int );
%}

%%

"/*"                     { space_str( yytext ); space_to_2( '*', '/' ); }

(([12][12]?)|\*)/[ \t\n]*"{"  { int pass = atoi(yytext);
                                if( pass == 11 || pass == 22 )
                                    { ret( NUMBER, 0 ); }
                                else
                                {
                                    if( pass > 2 || pass == 0 ) pass = 3;
                                    ret( PASS_BLOCK, pass );
                                }
                              }
[0-9]+                   { ret( NUMBER, 0 ); }

"pass"(([12][12]?)|\*)/[ \t\n]*"{"
                              { int pass = atoi(&yytext[4]);
                                if( pass == 11 || pass == 22 )
                                    { ret( IDENTIFIER, 0 ); }
                                else
                                {
                                    if( pass > 2 || pass == 0 ) pass = 3;
                                    ret( PASS_BLOCK, pass );
                                }
                              }
^[a-zA-Z0-9_]+[ \t\n]*":"   { ret( C_IDENTIFIER_AT_BEGINNING, 0 ); }
[a-zA-Z0-9_]+[ \t\n]*":"    { ret( C_IDENTIFIER, 0 ); }
[a-zA-Z0-9_]+              { ret( IDENTIFIER, 0 ); }
\'.\'                      |
\'\\[0-9]{1,3}\'           |
\'\\[a-zA-Z]\'             { ret( IDENTIFIER, 0 ); }

^"%left"                   { ret( LEFT, 0 ); }
```

```
^"%right"                   { ret( RIGHT, 0 ); }
^"%nonassoc"                { ret( NONASSOC, 0 ); }
^"%token"                   { ret( TOKEN, 0 ); }
^"%prec"                    { ret( PREC, 0 ); }
^"%type"                    { ret( TYPE, 0 ); }
^"%start"                   { ret( START, 0 ); }
^"%union"                   { ret( UNION, 0 ); }
^"%%"                       { static int mark_seen = 0;
                                if( mark_seen )
                                {
                                    space( '%' ); space( '%' );
                                    space_to_1( '\0' );
                                    yytext[0] = '\0';
                                }
                                mark_seen = 1;
                                ret( MARK, 0 ); }

^"%twopass_default"         { ret( PASS_DEFAULT, 0 ); }

^"%{"                       { space_str( yytext ); space_to_2( '%', '}' ); }
"<"                         { ret( '<', 0 ); }
">"                         { ret( '>', 0 ); }
","                         { ret( ',', 0 ); }
"|"                         { ret( '|', 0 ); }
"("                         { ret( '(', 0 ); }
")"                         { ret( ')', 0 ); }
";"                         { ret( ';', 0 ); }

"$"("<"[a-zA-Z0-9_]+">")?("$"|([0-9]+))
                            { int dol = 0, place = 1; unsigned char *s;
                                for( s = &yytext[yyleng]; isdigit(*s); s++ )
                                    { dol += ((*s-'0') * place); place *= 10; }
                                ret( DOLLAR, dol );
                            }

\"                          { char c;
                                space_str( yytext );
                                do
                                {
                                    c = input(); space(c);
                                    if( c == '\\' ) { c = input(); space(c); }
                                    else if( c == '"' )
                                    {
                                        c = 0;
                                        do
                                            if( c ) space(c);
                                        while( (c = input()) && isspace(c) );
                                        if( c != '"' )
                                        {
                                            unput(c);
                                            break;
                                        }
                                    }
                                }
                                while( c );
                            }

^\#                         { char c1, c2;
                                space_str( yytext );
                                do
                                {
                                    c2 = 0;
                                    do
                                    {
                                        c1 = input(); space(c1);
                                        if( !isspace(c1) ) c2 = c1;
                                    }
                                    while( c1 != '\n' );
                                }
                                while( c2 == '\\' );
                            }

[ \t\n]
.                           { space_str( yytext ); }

%% yywrap()
{
```

```
    extern FILE *output_fp;
    *sb = '\0'; fputs( ssb, output_fp ); ssb = NULL;
    return( 1 );
} static void space( int c )
{
#define SSB_SIZE 16
    static char *esb;

if( !ssb )
    {
        ssb = sb = (char *) malloc( sizeof(char) * SSB_SIZE );
        esb = ssb + SSB_SIZE - 1;
    }
    if( sb == esb )
    {
        int size = sb-ssb;
        ssb = (char *) realloc( ssb, sizeof(char) * size*2 );
        sb = ssb+size;
        esb = ssb + size*2 - 1;
    }
    *(sb++) = c;
}
```

Appendix C

```
/* file twopass.y */
/* Copyright 1993 Hewlett Packard Corporation, All Rights Reserved */
/* Yacc Input Syntax (from yacc supplemental documents)
 *
 * This is a descroption of the yacc input syntax, as a yacc
 * specificiation. Context dependencies, etc., are not considered.
 * Ironically, the yacc input specification language is most naturally
 * specified as an LR(2) grammar; the sticky part comes when an
 * identifier is seen in a rule, immediately following an action. If this
 * identifier is followed by a colon, it is the start of the next rule;
 * otherwise it is a continuation oif the curent rule, which just happens
 * to have an action embedded in it. As implemented, the lexical
 * analyzer looks ahead after seeing an identifier, and decide whether
 * the next token (skipping blanks, newlines, comments, etc.) is a colon.
 * If so, it returns the token C_IDENTIFIER. Otherwise, it returns
 * IDENTIFIER. Literals (quoted strings) are also returned as
 * IDENTIFIERs, but never as part of C_IDENTIFIERs.
 */

%{
struct term {
    char *name;
    struct use *defs;
    struct use *uses;
    struct term *next;
};

struct use {
    struct term *ft;
    int pass;
    int lineno;
    struct use *next;
};

%}

%union {
    struct tok {
        char *space;
        char *token;
        int pass;
        int line;
        struct tok *left;
        struct tok *right;
    } *s;
    int ival;
}

/* basic entities */
%token   IDENTIFIER     /* includes identifiers and literals */
%token   C_IDENTIFIER   /* identifier (but not literal) followed by colon */
%token   C_IDENTIFIER_AT_BEGINNING
%token   NUMBER         /* [0-9]+ */

/* reserved words: %type => TYPE, %left => LEFT, etc. */
%token   LEFT RIGHT NONASSOC TOKEN PREC TYPE START UNION
```

```
%token   MARK       /* the ^%% mark */
%token   LCURL      /* the ^%( mark */
%token   RCURL      /* the ^%) mark */

/* Special tokens for twopass */
%token  PASS_BLOCK PASS_DEFAULT DOLLAR

/* ascii character literals stand for themselves */

%type  <s> IDENTIFIER C_IDENTIFIER NUMBER MARK LCURL RCURL
%type  <s> C_IDENTIFIER_AT_BEGINNING c_identifier %type  <s> LEFT RIGHT NONASSOC TOKEN PREC TYPE START UNION
%type  <s> '|' ';' '<' '>' '{' '}' ','
%type  <s> rword token ident tokens_minus_idents_and_braces
%type  <s> statement_list statement compound_statement
%type  <s> PASS_BLOCK PASS_DEFAULT DOLLAR
%type  <s> pass_block %start spec %{
define _INCLUDE_POSIX_SOURCE
#include <string.h>
#include <stdio.h>
static int union_on = 0;
#ifdef CHKMEM
#include "chkmem.h"
endif FILE *output_fp, *yyin;

static int defaultpass;
void error( int type, char *s, ... );
#define ERROR -1
#define ERROR_FATAL_LINE -2
#define ERROR_FATAL -3
static int twopass_save;
static int twopass_pass;
const int *mask;
const int mask_normal[] = { 0, 1, 2 };  /* 1-2 used */
const int mask_save[]   = { 0, 8, 2 };  /* 1-2 used */
int seen[4];   /* 1-3 used */
int tokendef = 0;

struct term *rule[256];
int nt;

#define legalpass(a)   (a==1 || a==2 || a==3)
%}

%% spec:    defs MARK { out($2); } rules tail
         ;

tail:    MARK { out($1); }
       | /* empty: the second MARK is optional */
         ;

defs:    /* empty */
       | defs def
         ;

def:     START IDENTIFIER { out($1); out($2); }
       | UNION { out($1); } compound_statement { out($3); }
       | LCURL RCURL { out($1); out($2); }
       | rword { out( $1 ); } tag nlist { tokendef = 0; }
       | twopass_default
         ;

twopass_default: PASS_DEFAULT NUMBER
         { defaultpass = atoi( $2->token );
           if( !legalpass( defaultpass ) )
           {
              error( ERROR, "Bad default pass specification: %d", defaultpass );
              defaultpass = 0;
           }
           free( $1->token ); free( $2->token ); $1->token = $2->token = NULL;
           out( $1 ); out( $2 );
         }
```

```
rword:   TOKEN  { tokendef = 1; }
       | LEFT
       | RIGHT
       | NONASSOC
       | TYPE
       ;

tag:     /* empty: union tag is optional */
       | '<' IDENTIFIER '>' { out( $1 ); out( $2 ); out( $3 ); }
       ;

nlist:   nmno
       | nlist nmno
       | nlist ',' { out( $2 ); } nmno
       ;

nmno:    IDENTIFIER        { if( tokendef ) lookup( $1->token ); out( $1 ); }
       | IDENTIFIER NUMBER { if( tokendef ) lookup( $1->token );
                             out( $1 ); out( $2 ); }
       ;

/* rules section */ rules:   c_identifier
             { nt = 0; rule[nt++] = lookup($1->token); out($1); }
         rbody prec
       | rules rule
       | rules twopass_default
       ;

rule:    c_identifier
             { nt = 0; rule[nt++] = lookup($1->token); out($1); }
         rbody prec
       | '|' { out( $1 ); } rbody prec
       ;

rbody:   /* empty */
       | rbody IDENTIFIER
             { rule[ nt++ ] = lookup( $2->token );
               out( $2 );
             }
       | rbody act
       ;

act:     pass_block '{' statement_list '}'
         {
             int pass;
             int explicit = 0;

/* Figure out default pass
              */
             if( $1->pass == 0 )
             {
                 /* Try taking highest seen (if only one, but 3 is special)
                  */
                 if( (seen[3] && (pass = 3)) ||
                     (seen[1] && !seen[2] && (pass = 1)) ||
                     (seen[2] && !seen[1] && (pass = 2)) ||
                     (seen[1] && seen[2] && (pass = 3)) )
                 { explicit = 1; }

/* Take the default
                  */
                 else /* if( !seen[3] && !seen[2] && !seen[1] ) */
                 {
                     if( defaultpass == 0 )
                     {
                         error( ERROR, "Default pass required, "
                                       "but none specified with %%passdefault; "
                                       "using pass 1 from here on as default" );
                         defaultpass = 1;
                     }
                     pass = defaultpass;
                 }
             }
             else
                 pass = $1->pass;

mask = (twopass_save ? mask_save : mask_normal);
             free($2->token);
```

```
            $2->token = (char *) malloc(25);
            sprintf($2->token,"{ /*__TWOPASS_PASS:%d*/ ",
                    (twopass_pass ? 8 : (pass | (twopass_save ? 4 : 0)) ) );

$1->right = $2; $2->right = $3; $3->right = $4;

process_action( $1, explicit, pass );

twopass_save = twopass_pass = 0;
            seen[1] = seen[2] = seen[3] = 0;
        }
    |   pass_block '{' '}'
        {   out($1);
            free($2->token);
            $2->token = NULL;
            out($2);
            fprintf( output_fp, "{ /*__TWOPASS_PASS:0*/ " );
            out($3);
            seen[1] = seen[2] = seen[3] = 0;
        }
    ;

/* no left, no right */
pass_block:
        PASS_BLOCK
        { if( !legalpass($1->pass) )
                error( ERROR, "Illegal Pass Specification: pass%d", $1->pass );
          seen[$1->pass]++;
        }
    |   /* empty */   { $$ = (struct tok *) calloc( 1, sizeof( struct tok ) ); }
    ;

prec:   /* empty */
    |   PREC IDENTIFIER     { out( $1 ); out( $2 ); }
    |   PREC IDENTIFIER     { out( $1 ); out( $2 ); }  act
    |   prec ';'            { out( $2 ); }
    ;

/* no left, right */
compound_statement:
        pass_block '{' statement_list '}'
            { $1->right = $2; $2->right = $3; $3->right = $4; }
    |   pass_block '{' '}'
            { seen[$1->pass]--; $1->pass = 0;
              $1->right = $2; $2->right = $3; }
    ;

/* left, no right */
statement_list:
        statement
        { $$ = (struct tok *) calloc( 1, sizeof( struct tok ) );
          $$->left = $1;
        }
    |   statement_list statement
        { $$ = (struct tok *) calloc( 1, sizeof( struct tok ) );
          $2->left = $1;
          $$->left = $2;
        }
    ;

/* no left, right */
statement:  compound_statement  /* no left, right */
        |   token               /* no left, no right */
        ;

token:  ident
    |   tokens_minus_idents_and_braces
    ;

tokens_minus_idents_and_braces:
    NUMBER | ';' | ',' | ':' | '|' | '<' | '>'
    ;

ident: IDENTIFIER
        { if( !istr( $1->token, "twopass_save" ) ) twopass_save = 1;
          if( !istr( $1->token, "twopass_pass" ) ) twopass_pass = 1;
        }
    |   C_IDENTIFIER
    |   C_IDENTIFIER_AT_BEGINNING
        { error( $1->line, "warning: colon_identifier at beginnig of line" ); }
    |   DOLLAR
        { $1->pass = 0; $$ = $1; }
```

;

c_identifier: C_IDENTIFIER | C_IDENTIFIER_AT_BEGINNING;

%%

```
include <ctype.h> define MAXHASH 1023
struct term *terms[ MAXHASH ];

struct term *lookup( char *str )
{
    struct term *l;
    int h, shift;
    char *s, c;

/* hash */
    for( shift = 1, h = 0, s = str;
        *s && (isalpha(*s) || isdigit(*s) || *s == '_');
        s++, shift++ )
            h += (*s * shift);
    h = h % MAXHASH;
    c = *s;
    *s = '\0';

/* lookup */
    for( l=terms[h]; l && strcmp( l->name, str ); l=l->next ) ;
    if( !l )
    {
        l = (struct term *) calloc( 1, sizeof( struct term ) );
        l->name = (char *) malloc( sizeof(char) * (shift+1) );
        strcpy( l->name, str );
        l->next = terms[h];
        terms[h] = l;
    }
    *s = c;
    return( l );
} int istr( char *a, char *b )
{
    for( ; *b; b++ )
    {
        char c = *a++;
        if( isalpha( c ) && isupper( c ) )
            c = tolower(c);
        if( c != *b )
            return( 1 );
    }
    return( 0 );
} void out( struct tok *a )
{
    if( a )
    {
        if( a->left )  out( a->left );
        if( a->space ) { fputs( a->space, output_fp ); free( a->space ); }
        if( a->token ) { fputs( a->token, output_fp ); free( a->token ); }
        if( a->right ) out( a->right );
        free( a );
    }
} process_action( struct tok *s, int explicit, int pass )
{
  if( s )
  {
    if( s->pass )
    {
        process_action( s->left, explicit, pass );

if( (pass == 1 || pass == 2) && s->pass != pass )
        {
            error( s->line, "Pass %d block within pass %d block",
                    s->pass == 3 ? 12 : s->pass, pass == 3 ? 12 : pass );
        } if( s->space ) { fputs( s->space, output_fp ); free( s->space ); }
        free( s->token );
```

```c
        if( s->pass != 3 && s->pass != pass )
            fprintf( output_fp, "{ if(yydopass&%d) pass%d",
                     mask[s->pass], s->pass );
        else
            fprintf( output_fp, "{ pass%d", s->pass == 3 ? 12 : s->pass );

process_action( s->right, 0, s->pass );
        fprintf( output_fp, "}" );
    }
    else
    {
        if( explicit && s->token && !(s->token[0]=='{' || s->token[0]=='}') )
        {
            error( s->line, "Explicit pass required for statement/block" );
            explicit = 0;
        }
        process_action( s->left, explicit, pass );
        if( s->space ) { fputs( s->space, output_fp ); free( s->space ); }
        if( s->token ) { fputs( s->token, output_fp ); free( s->token ); }
        process_action( s->right, explicit, pass );
    } free( s );
  }
}

/* Removes spaces at beginning, end; and crunches all spaces in the
 * string into one single space character.
 */
void crunch( char *t, char *s )
{
    for( ; *s && isspace( *s ); s++ ) ;
    while( *s )
    {
        do
            *(t++) = *(s++);
        while( *s && !isspace(*s) );
        for( ; *s && isspace( *s ); s++ ) ;
        if( *s )  *(t++) = ' ';
    }
    *(t) = '\0';
} define  FILE_TP_YACC      "y.twopass"
define  FILE_TP_C         "y.twopass.c"
#define  FILE_YACC_OUT     "y.tab.c"
#define  FILE_TP_DRIVER    "twopass.ypar"
#define  YACC              "/usr/bin/yacc"

define  MAXSTATE          2040 include <sys/wait.h>
include <sys/stat.h>
include <assert.h> define  BUFF_SIZE  1024
char ibuff[ BUFF_SIZE ], dbuff[ BUFF_SIZE ], cbuff[ BUFF_SIZE ];
int yyr2tab[ MAXSTATE ], yyr2num = 0;
char yyr2str[ BUFF_SIZE ];
char ypar[ BUFF_SIZE ];

#define PATH_SEP "/"

char *strrstr( char *, char * );

main( argc, argv )
int argc;
char *argv[];
{
    int t, lastcase;
    char *c, *infile = NULL;
    FILE *input_fp, *driver_fp;
    int nopre = 0, noyacc = 0;
    char *yacc = YACC;
    char *outfile = FILE_YACC_OUT;
    char *args[50];
    int argsc = 1;
    int verbose = 0, noline = 0;
    struct stat sbuf;

#ifdef YYDEBUG
    extern int yydebug;
```

```
#endif
    strcpy( ypar, FILE_TP_DRIVER );

for( t = 1; t < argc && argv[t][0] == '-'; t++ )
    {
        if( !strncmp( argv[t], "-tp:", 4 ) )
        {
            switch( argv[t][4] )
            {
#ifdef YYDEBUG
            case 'd':
                yydebug = 1;
                break;
#endif
            case 'y':
                yacc = &argv[t][ (argv[t][5] == '=' ? 6 : 5) ];
                break;
            case 'v':
                verbose = 1;
                break;
            case 'l':
                noline = 1;
                break;
            case 'p':
                c = &argv[t][ 5 + (argv[t][5] == '=') ];
                if( !stat( c, &sbuf ) )
                {
                    if( S_ISREG( sbuf.st_mode ) )
                        strcpy( ypar, c );
                    else
                        sprintf( ypar, "%s%s%s", &argv[t][5+(argv[t][5]=='=')],
                                (c=strrstr(argv[t],PATH_SEP)) && (!*(c+1))
                                ? "" : PATH_SEP, FILE_TP_DRIVER );
                }
                else
                    error(ERROR_FATAL, "Can't stat -tp:p paramenter '%s'", c);
                break;
            case 'o':
                outfile = &argv[t][ (argv[t][5] == '=' ? 6 : 5) ];
                break;
            case 'n':
                noyacc = 1;
                if( argv[t][5] != 'y' )
                    nopre = 1;
                break;
            default:
                error( ERROR_FATAL, "Unknown twopass switch: %s", argv[t] );
                break;
            }
        }
        else
        {
            args[argsc++] = argv[t];
            if( argv[t][1] == 'b' || argv[t][1] == 'p' )
                args[argsc++] = argv[t++];
        }
    } if( !nopre )
    {
        if( t == argc )
            error( ERROR_FATAL, "no input file name on command line" );
        else
        {
            if( (yyin = fopen( argv[t], "r" )) == NULL )
                error( ERROR_FATAL, "can't open input file '%s'", argv[t] );
            infile = argv[t];
            args[argsc++] = FILE_TP_YACC;
        } if( (output_fp = fopen( FILE_TP_YACC, "w" )) == NULL)
            error( ERROR_FATAL, "can't open output file '" FILE_TP_YACC "'" );

/* Definitions for the user before his code
         * Other definitions that he might use are in twopass.ypar.
         */
        fputs( "%{\n#define TWOPASS 1\n%}\n", output_fp );
#define ADDEDLINES 3
        if( yyparse() != 0 )
            error( ERROR_FATAL, "parse failed" );
        fclose( output_fp );
        fclose( yyin );
```

```c
    if( !noyacc )
    {
        args[0] = yacc;
        args[argsc] = NULL;
        assert( argsc < 50 );
        if( verbose )
        {
            fprintf( stderr, "twopass: exec of '%s' with ", yacc );
            for( t = 0; t < argsc; t++ )
                fprintf( stderr, "%s ", args[t] );
            fprintf( stderr, "\n" );
        }
        if( (t = fork()) == 0 )
        {
            execvp( yacc, &args[0] );
            error( ERROR_FATAL, "exec of '%s' failed", yacc );
        }
        else if( t == -1 )
            error( ERROR_FATAL, "fork of '%s' failed", yacc );
        else
            wait( &t );

if( !WIFEXITED(t) || WEXITSTATUS(t) != 0 )
            error( ERROR_FATAL, "fatal error: yacc failed" );

if( rename( FILE_YACC_OUT, FILE_TP_C ) )
            error( ERROR_FATAL, "can't rename '" FILE_YACC_OUT "' to '"
                    FILE_TP_C "'" );
    }
} if( (driver_fp = fopen( ypar, "r" )) == NULL )
    error( ERROR_FATAL, "can't open twopass yacc driver '%s'", ypar );

fgets( dbuff, BUFF_SIZE, driver_fp );
crunch( dbuff, dbuff );

if( (output_fp = fopen( outfile, "w" )) == NULL )
    error( ERROR_FATAL, "can't open output file '%s'", outfile );

if( (input_fp = fopen( FILE_TP_C, "r" )) == NULL )
    error( ERROR_FATAL, "can't open twopass C file '"
                        FILE_YACC_OUT "'" );

#if 0
    /* This fixes a bug in the 8.0 C compiler on the 700 */
    if( noline )
        fprintf( output_fp, "# line 2 \"%s\"\n", outfile );
endif /* Scan the resulting file, replacing its driver with ours
     * and reading and writing the yyr2 array
     */
    while( fgets( ibuff, BUFF_SIZE, input_fp ) )
    {
        /* make all spaces/tabs into single space,
         * remove spaces from end of line
         */
        crunch( cbuff, ibuff );

/* Check for driver code */
        if( !strcmp( cbuff, dbuff ) )
        {
            /* replace with our code */
            while( fgets( dbuff, BUFF_SIZE, driver_fp ) &&
                    strncmp( dbuff, "aaaa", 4 ) )
                fputs( dbuff, output_fp );

/* read to the end of the input */
            crunch( dbuff, &dbuff[4] );
            while( strcmp( cbuff, dbuff ) &&
                    fgets( ibuff, BUFF_SIZE, input_fp ) &&
                    (crunch( cbuff, ibuff ), 1) ) ;

/* get next part of file to match */
            fgets( dbuff, BUFF_SIZE, driver_fp );
            crunch( dbuff, dbuff );
        }

/* Check for beginning of the yyr2 table */
        else if( strstr( cbuff, "yytabelem yyr2[]" ) )
        {
```

```c
        (c = strstr( cbuff, "={" )) || (c = strstr( cbuff, "= {"));
        assert( c );  *c = '\0';
        strcpy( yyr2str, cbuff );
        fprintf( output_fp, "%s;\n", cbuff );
        while( fscanf(input_fp, " %d ,", &yyr2tab[yyr2num++])==1 );
        yyr2num--;        /* we go one too many in the loop */
        fscanf( input_fp, " } ;" );

for( t = 0; t < yyr2num; t++ )
            yyr2tab[t] = ((yyr2tab[t] >> 1) << 4);
    }

/* Check for special #defines which need hacking */
    else if( (!strncmp( cbuff, "#define", 7 ) && (t=8)) ||
             (!strncmp( cbuff, "# define", 8) && (t=9)) )
    {
        if( !strncmp( cbuff+t, "YYACCEPT", 8 ) )
            *(strstr( ibuff, "YYACCEPT" )) = '_';
        else if( !strncmp( cbuff+t, "YYERROR", 7 ) )
            *(strstr( ibuff, "YYERROR" )) = '_';
        fputs( ibuff, output_fp );
    }

/* Handle line number directives */
    else if( (!strncmp( cbuff, "# line", 6 ) && (t=6)) ||
             (!strncmp( cbuff, "#line", 5 ) && (t=5)) )
    {
        if( !noline )
        {
            if( infile )
            {
                t = atoi(&cbuff[t])-ADDEDLINES;
                fprintf( output_fp, "# line %d \"%s\"\n",
                        t > 0 ? t : 1, infile );
            }
            else
                fputs( ibuff, output_fp );
        }
    }

/* Just output it */
    else
        fputs( ibuff, output_fp );

/* Check for case */
    sscanf( cbuff, "case %d:", &lastcase );

/* Check for our special flag */
    if( c = strstr( ibuff, "/*__TWOPASS_PASS:" ) )
    {
        t = atoi( c+17 );
        yyr2tab[ lastcase ] |= t;
    }
}

/* Some simple error checking */
if( strncmp( dbuff, "aaaa", 4 ) )
    error(ERROR_FATAL,"All substitutions in twopass.ypar not done");
if( yyr2num == 0 )
    error( ERROR_FATAL, "yyr2 array not detected" );

/* Write out new yyr2 table */
fprintf( output_fp, "%s={\n", yyr2str );
for( t = 0; t < yyr2num-1; t++ )
{
    fprintf( output_fp, "%6d,", yyr2tab[t] );
    if( (t+1) % 10 == 0 )
        fprintf( output_fp, "\n" );
}
fprintf( output_fp, "%6d};\n", yyr2tab[yyr2num-1] );

fclose( output_fp );
fclose( input_fp );
fclose( driver_fp );

return( 0 );
} include <stdarg.h>
int yylineno;

yyerror()  { error( ERROR_FATAL_LINE, "Syntax Error" ); }
```

```
void error( int type, char *s, ... )
{
    va_list ap;
    va_start( ap, s );
    if( type < 0 && type != ERROR_FATAL_LINE )
        fprintf( stderr, "twopass: " );
    else
        fprintf( stderr, "twopass: line %d: ", type == ERROR_FATAL_LINE ?
                                                yylineno : type );
    vfprintf( stderr, s, ap );
    fprintf( stderr, "\n" );
    if( type == ERROR_FATAL || type == ERROR_FATAL_LINE )
        exit( 1 );
}
```

Appendix D

*In the following code, inserts from the AT & T version of yaccpar are indentified by italics. The version of yaccpar used for this code is from the Hewlett Packard UNIX operating system HP-UX version 8.0 file /usr/lib/yaccpar.*

```
** yyparse - return 0 if worked, 1 if syntax error not recovered from
** yyparse - return 0 if worked, 1 if syntax error not recovered from
*/
/*SCCS  twopass.ypar    REV(80.14);    DATE(01/07/93    13:42:44) */
/* KLEENIX_ID @(#)twopass.ypar   80.14 92/12/26 */
/* Copyright 1993 Hewlett Packard Corporation, All Rights Reserved */
/* file twopass.ypar */

/**** BEGINING OF CODE SUBSTITUTED BY TWOPASS ******/ ifndef TWOPASS_SAVE
define TWOPASS_SAVE(a) twopass_save(&(a),sizeof(a))
endif ifndef TRUE
define TRUE (1)
#define FALSE (0)
endif if !defined(pass1) && !defined(CHKPASS)
define pass1
#define pass2
#define pass12
#define pass1var(a)
#define pass2var(a)
#define pass12var(a)
endif ifdef TWOPASS_YYPARSE_SPLIT
/* Return types from yyswitch() */
#define YY_FALLOUT              0
#define YY_TWOPASS_INIT         1
#define YY_TWOPASS_ERROR        2
#define YY_TWOPASS_FIX          3
#define YY_DOPASS2              4
#define YY_NEWYYDOPASS_RESET    5
#define YY_NEWYYDOPASS_POP      6
define YY_NEWYYDOPASS          0x10000 define YY_GOTO_TWOPASS_INIT    return( YY_TWOPASS_INIT )
define YY_GOTO_TWOPASS_ERROR   return( YY_TWOPASS_ERROR )
#define YY_GOTO_TWOPASS_FIX     return( YY_TWOPASS_FIX )
#define YY_GOTO_YY_DOPASS2      return( YY_DOPASS2 )
#else /* TWOPASS_YYPARSE_SPLIT */
#define YY_GOTO_TWOPASS_INIT    goto yy_twopass_init
#define YY_GOTO_TWOPASS_ERROR   goto yy_twopass_error
#define YY_GOTO_TWOPASS_FIX     goto yy_twopass_fix
#define YY_GOTO_YY_DOPASS2      goto yydopass2
endif /* TWOPASS_YYPARSE_SPLIT */ ifdef REPORT_YYPASS
define YYACCEPT    { if(yypass==2) { \
                        fprintf( stderr, "yyaccept sbrk(0) = 0x%08x\n", sbrk(0) ); \
                        yypass = 0; _YACCEPT;} else YY_GOTO_TWOPASS_INIT; }
#else
#define YYACCEPT    { if(yypass==2) {yypass = 0; _YACCEPT;} \
                        else YY_GOTO_TWOPASS_INIT; }
#endif
#define YYERROR     { if(yypass==1) YY_GOTO_TWOPASS_ERROR; \
                        else YY_GOTO_TWOPASS_FIX; }
```

```c
#define YY_NORMAL_PASS1 1      /* Code in pass1 without twopass_save */
#define YY_NORMAL_PASS2 2      /* All code in pass2 */
#define YY_SAVE         4      /* twopass_save code */
#define YY_SAVE_PASS1   8      /* Code in pass1 with twopass_save */
#define YYR2_SHIFT      4      /* Shift amount to get length in yyr2[] */

/* User Macros
 */
define TWOPASS_DOPASS2     { if( yypass == 1 ) YY_GOTO_YY_DOPASS2; } define twopass_save(a,b) \
        { if( yydopass & YY_SAVE ) \
            pass1{ memcpy(yysave_buff,(a),(b)); yysave_buff += (b); } \
          else if( yypass == 2 ) \
            pass2{ YYREAD_BYTES((a),(b)); } } define _TWOPASS_PASS_pushdopass { *(yydopass_stack++) = yydopass; \
                                   *(yydopasso_stack++) = yydopass_other; } define _TWOPASS_PASS_popdopass \
        { if( yydopass_stack != &yydopass_stack_real[0] ) { \
            yydopass = *(--yydopass_stack); \
            yydopass_other = *(--yydopasso_stack); } } ifdef TWOPASS_YYPARSE_SPLIT
define _TWOPASS_PASS_new(p1,p2) \
        return( YY_NEWYYDOPASS | ((p1) << 8) | (p2) )
#define TWOPASS_PASS_1on1_2on2  { return( YY_NEWYYDOPASS_POP ); }
#define TWOPASS_PASS_reset      { return( YY_NEWYYDOPASS_RESET ); }
#else
#define _TWOPASS_PASS_new(p1,p2) \
        { _TWOPASS_PASS_pushdopass; \
          yydopass = (p1); yydopass_other = (p2); \
          goto newyydopass; }
#define TWOPASS_PASS_1on1_2on2  { _TWOPASS_PASS_popdopass \
                                  goto newyydopass; }
#define TWOPASS_PASS_reset \
        { yydopass_stack = &yydopass_stack_real[0]; \
          yydopasso_stack = &yydopasso_stack_real[0]; \
          yydopass = YY_NORMAL_PASS1 | YY_SAVE_PASS1 | YY_SAVE; \
          yydopass_other = YY_NORMAL_PASS2; \
          goto newyydopass; }
endif /* If any of these ever don't include YY_SAVE_PASS1 in the first pass, then
 * the and with yydopass will need to changed for special actions.
 */
#define TWOPASS_PASS_12on1_0on2 \
    _TWOPASS_PASS_new( YY_NORMAL_PASS1|YY_NORMAL_PASS2|YY_SAVE_PASS1, 0 )

#define TWOPASS_PASS_0on1_12on2 \
    _TWOPASS_PASS_new( YY_SAVE_PASS1|YY_SAVE, YY_NORMAL_PASS1|YY_NORMAL_PASS2 )

#define TWOPASS_PASS_1on1_0on2 \
    _TWOPASS_PASS_new( YY_NORMAL_PASS1|YY_SAVE_PASS1, 0 )

#define TWOPASS_PASS_0on1_2on2 \
    _TWOPASS_PASS_new( YY_SAVE_PASS1|YY_SAVE, YY_NORMAL_PASS2 )

static pass12 FILE *yyparsefp;
pass12 int yypass;
static pass12 char *yysave_buff;
#define YYSAVE_MAXWRITE (9*1024)

static pass12 char yysave_buffer[YYSAVE_MAXWRITE];

#define YYSAVE_IBUFFSIZE (48*1024)

static pass12 char yysave_ibuffer[YYSAVE_IBUFFSIZE];
#define yysave_ibuff_end (&yysave_ibuffer[YYSAVE_IBUFFSIZE])
static pass12 char *yysave_ibuff;

#if 0
#if 1
#define  YYWRITE(a,type)  { if( sizeof(type) == 2 ) *((type *)yysave_ibuff) = a;    else memcpy(yysave_ibuff,&(a),sizeof(type)); \
    if( (yysave_ibuff += sizeof(type)) >= yysave_ibuff_end ) yysave_flushbuff(); }
#define  YYREAD(a,type)   { if( sizeof(type) == 2 ) a = *((type *)yysave_ibuff);  else memcpy(&(a),yysave_ibuff,sizeof(type)); \
    if( (yysave_ibuff += sizeof(type)) > yysave_ibuff_end ) yysave_readbuff(); }
#else
#define YYWRITE(a,type) { memcpy(yysave_ibuff,&(a),sizeof(type)); \
```

```
   if( (yysave_ibuff += sizeof(type)) >= yysave_ibuff_end ) yysave_flushbuff(); }
#define YYREAD(a,type) { memcpy(&(a),yysave_ibuff,sizeof(type)); \
   if( (yysave_ibuff += sizeof(type)) > yysave_ibuff_end ) yysave_readbuff(); }
#endif
#define YYWRITE_BYTES(a,b) { memcpy(yysave_ibuff,(a),(b)); \
   if( (b) & 1 ) yysave_ibuff++; \
   if( (yysave_ibuff += (b)) >= yysave_ibuff_end ) yysave_flushbuff(); \
   /* fprintf( stderr, "YYWRITE_BYTES(0x%08x,%d) results in 0x%08x\n", a, b, yysave_ibuff ); */ }
#define YYREAD_BYTES(a,b) { memcpy((a),yysave_ibuff,(b)); \
   if( (b) & 1 ) yysave_ibuff++; \
   if( (yysave_ibuff += (b)) > yysave_ibuff_end ) yysave_readbuff(); }
#else
#define YYWRITE(a,type) \
{ char *__yysave_ibuff = yysave_ibuff; \
   if( (yysave_ibuff+=sizeof(type)) >= yysave_ibuff_end ) \
      { yysave_flushbuff(sizeof(type)); __yysave_ibuff = yysave_ibuffer; } \
   if( sizeof(type) == 2 ) *((type *) __yysave_ibuff) = a; \
      else memcpy(__yysave_ibuff,&(a),sizeof(type)); }
#define YYREAD(a,type) \
{ char *__yysave_ibuff = yysave_ibuff; \
   if( (yysave_ibuff+=sizeof(type)) >= yysave_ibuff_end ) \
      { yysave_readbuff(sizeof(type)); __yysave_ibuff = yysave_ibuffer; } \
   if( sizeof(type) == 2 ) a = *((type *) __yysave_ibuff); \
      else memcpy(&(a),__yysave_ibuff,sizeof(type)); }
#define YYWRITE_BYTES(a,b) \
{ char *__yysave_ibuff = yysave_ibuff; \
   if( (yysave_ibuff+=((unsigned int)(b))) >= yysave_ibuff_end ) \
      { yysave_flushbuff((b)); __yysave_ibuff = yysave_ibuffer; } \
   memcpy(__yysave_ibuff,(a),(b)); \
   if( (b) & 1 ) yysave_ibuff++; }
#define YYREAD_BYTES(a,b) \
{ char *__yysave_ibuff = yysave_ibuff; \
   if( (yysave_ibuff+=(b)) >= yysave_ibuff_end ) \
      { yysave_readbuff((b)); __yysave_ibuff = yysave_ibuffer; } \
   memcpy((a),__yysave_ibuff,(b)); \
   if( (b) & 1 ) yysave_ibuff++; }
#define YYSEEK_BYTES(b) \
{ char *__yysave_ibuff = yysave_ibuff; \
   if( (yysave_ibuff+=(b)) >= yysave_ibuff_end ) \
      { yysave_readbuff((b)); __yysave_ibuff = yysave_ibuffer; } \
   if( (b) & 1 ) yysave_ibuff++; }
endif static pass12 int yysave_bufferwrote;
static pass12 unsigned long yysave_byteswrote;
#ifdef REPORT_YYPASS
static long yysave_intersize;
static long yysave_maxintersize;
endif static pass1 void yysave_flushbuff(int size)
{
    yysave_ibuff -= size;

if( !yyparsefp )
        yyparsefp = tmpfile();

yysave_bufferwrote = TRUE;
    yysave_byteswrote +=
        fwrite( yysave_ibuffer, 1, yysave_ibuff - yysave_ibuffer, yyparsefp );
    yysave_ibuff = yysave_ibuffer + size;
} static pass2 void yysave_readbuff(int size)
{
    unsigned int i;
    yysave_ibuff -= size;
    i = yysave_ibuff_end - yysave_ibuff;
    if( i ) memcpy( yysave_ibuffer, yysave_ibuff, i );
    fread(yysave_ibuffer+i,1,YYSAVE_IBUFFSIZE-i,yyparsefp);
    yysave_ibuff = yysave_ibuffer + size;
} ifdef TWOPASS_VAR1
extern TWOPASS_VAR1_TYPE TWOPASS_VAR1;
static TWOPASS_VAR1_TYPE yysave_var1, yyold_var1;
#endif
#ifdef TWOPASS_VAR2
extern TWOPASS_VAR2_TYPE TWOPASS_VAR2;
static TWOPASS_VAR2_TYPE yysave_var2, yyold_var2;
#endif
#ifdef TWOPASS_VAR3
```

```c
extern TWOPASS_VAR3_TYPE TWOPASS_VAR3;
static TWOPASS_VAR3_TYPE yysave_var3, yyold_var3;
endif static pass1 void yysave_switchtoread()
{
    if( yysave_bufferwrote )
    {
        yysave_flushbuff(0);
        rewind( yyparsefp );
        yysave_ibuff = yysave_ibuff_end;
        pass2( yysave_readbuff(0); }
    }
    else
    {
        yysave_ibuff = yysave_ibuffer;
    } ifdef TWOPASS_VAR1
    TWOPASS_VAR1 = yysave_var1;
#endif
#ifdef TWOPASS_VAR2
    TWOPASS_VAR2 = yysave_var2;
#endif
#ifdef TWOPASS_VAR3
    TWOPASS_VAR3 = yysave_var3;
#endif
} static pass2 void yysave_switchtowrite()
{
    if( yysave_bufferwrote )
    {
        rewind( yyparsefp );
        yysave_bufferwrote = 0;
        yysave_byteswrote = 0;
#ifdef REPORT_YYPASS
        if( yysave_intersize > yysave_maxintersize )
            yysave_maxintersize = yysave_intersize;
        yysave_intersize = 0;
#endif
    }
    yysave_ibuff = yysave_ibuffer;

#ifdef TWOPASS_VAR1
    yysave_var1 = yyold_var1 = TWOPASS_VAR1;
#endif
#ifdef TWOPASS_VAR2
    yysave_var2 = yyold_var2 = TWOPASS_VAR2;
#endif
#ifdef TWOPASS_VAR3
    yysave_var3 = yyold_var3 = TWOPASS_VAR3;
#endif
} struct yy_save
{
    unsigned short state:11,    /* Up to 2048-specials States */
                   data:1,      /* Data follows for new state
                                 * Error routine for callfunc
                                 * Low bit of smallvar
                                 */
                   newtokens:4; /* Number of newtokens for normal
                                 * Type of code for special
                                 * Upper bits of smallvar
                                 */
};
#define YYSAVE_SPECIAL                  0x7ff
#define    YYSAVE_SPECIAL_BIGNEWTOKENS  0x0    /* Inc is next long */
#define    YYSAVE_SPECIAL_CALLFUNC      0x1
#define    YYSAVE_SPECIAL_VAR1          0x2
#define    YYSAVE_SPECIAL_VAR2          0x3
#define    YYSAVE_SPECIAL_VAR3          0x4
#define    YYSAVE_SPECIAL_END           0x5
#define    YYSAVE_SPECIAL_DOPASS2       0x6
#define    YYSAVE_SPECIAL_BIGRESTORE    0x7    /* size is next long */
#define    YYSAVE_SPECIAL_STUFF         0x8    /* offset in next short */
#define YYSAVE_SMALL_VAR1               0x7fe  /* Inc in newtokens */
#define YYSAVE_SMALL_VAR2               0x7fd
#define YYSAVE_SMALL_VAR3               0x7fc
#define YYSAVE_NEWDOPASS                0x7fb  /* yydopass in newtokens */
#define YYSAVE_RESTORE                  0x7fa  /* ptr in next long, value of
                                                * size newtokens follows */
```

```
#define YYSAVE_LOWSPECIAL               0x7fa
#define YYSAVE_MAXSMALLNEWTOKENS        0xf
#define YYSAVE_MAXSMALLVAR              0x1f
define YYSAVE_MAXRESTORESIZE           0x7 ifdef REPORT_YYPASS
static int numsavestates;
static int numbignewtokens;
static int maxnewtokens;
static int numbiglinenoinc;
static int numsmalllinenoinc;
static int yynumlextokens;
endif struct yy_stuff_block {
    long loc;
    unsigned short offset;
};
struct yy_stuff_block yysblock[10];
int yysnum;

static void pass1 __twopass_stuff(long loc, void *a, long b)
{
    if( loc >= yysave_byteswrote )
    {
        memcpy( &yysave_ibuffer[ loc-yysave_byteswrote ], a, b );
    }
    else if( loc >= 0 )
    {
        long l = ftell( yyparsefp );
        fseek( yyparsefp, loc, SEEK_SET );
        fwrite( a, 1, b, yyparsefp );
        fseek( yyparsefp, l, SEEK_SET );
    }
    /* Negative values fall through */
} static void pass1 __twopass_pull(long loc, void *a, long b)
{
    if( loc >= yysave_byteswrote )
    {
        memcpy( a, &yysave_ibuffer[ loc-yysave_byteswrote ], b );
    }
    else if( loc >= 0 )
    {
        long l = ftell( yyparsefp );
        fseek( yyparsefp, loc, SEEK_SET );
        fread( a, 1, b, yyparsefp );
        fseek( yyparsefp, l, SEEK_SET );
    }
    /* Negative values fall through */
} define twopass_save_loc(a,b)    _twopass_save_loc(a,b,yydopass)
static long pass12 _twopass_save_loc(void *a, long b, int yydopass)
{
    struct yy_save yys;
    long ret = yysave_byteswrote + (yysave_ibuff - yysave_ibuffer);
    unsigned short s;

if( yydopass & YY_SAVE )
    {
        yysblock[yysnum].loc = ret;
        yysblock[yysnum++].offset = (yysave_buff - yysave_buffer);

yys.state = YYSAVE_SPECIAL;
        yys.newtokens = YYSAVE_SPECIAL_STUFF;
        YYWRITE( yys, struct yy_save );
        s = 0xffff;
        YYWRITE( s, unsigned short );
    } twopass_save( a, b );
    return( ret );
} static void pass1 twopass_stuff_loc( long loc, void *a, long b )
{
    struct yy_save yys;

__twopass_pull( loc, &yys, sizeof(struct yy_save) );
    if( yys.state == YYSAVE_SPECIAL && yys.newtokens == YYSAVE_SPECIAL_STUFF )
```

```
{
    unsigned short s;

__twopass_pull(loc+sizeof(struct yy_save),&s,sizeof(unsigned short));
        if( s == 0xffff )
        {
            int t;
            for( t = 0; t < yysnum && yysblock[t].loc != loc; t++ ) ;
            if( t < yysnum )
                memcpy( &yysave_buff[yysblock[t].offset], a, b );
        }
        else
            __twopass_stuff( loc+s, a, b );
    }
} if defined(TWOPASS_VAR1) || defined(TWOPASS_VAR2) || defined(TWOPASS_VAR3)
static pass1 void yy_syncvar()
{
    struct yy_save yysave;

#define __VAR_DELTA(num) { long l; \
    if( (l = (long) (TWOPASS_VAR##num - yyold_var##num) )) { \
        if( l > 0 && l <= YYSAVE_MAXSMALLVAR ) { \
                yysave.state = YYSAVE_SMALL_VAR##num; \
                yysave.newtokens = l >> 1; yysave.data = l&1; \
                YYWRITE( yysave, struct yy_save ); } \
        else { \
                yysave.state = YYSAVE_SPECIAL; \
                yysave.newtokens = YYSAVE_SPECIAL_VAR##num; \
                YYWRITE( yysave, struct yy_save ); \
                YYWRITE( TWOPASS_VAR##num, TWOPASS_VAR##num##_TYPE ); } \
        yyold_var##num = TWOPASS_VAR##num; } }
#define __VAR(num) { \
    if( yyold_var##num != TWOPASS_VAR##num ) { \
                yysave.state = YYSAVE_SPECIAL; \
                yysave.newtokens = YYSAVE_SPECIAL_VAR##num; \
                YYWRITE( yysave, struct yy_save ); \
                YYWRITE( TWOPASS_VAR##num, TWOPASS_VAR##num##_TYPE ); } \
        yyold_var##num = TWOPASS_VAR##num; } ifdef TWOPASS_VAR1
ifdef TWOPASS_VAR1_NODELTA
        __VAR(1)
#else
        __VAR_DELTA(1)
#endif
#endif
#ifdef TWOPASS_VAR2
#ifdef TWOPASS_VAR2_NODELTA
        __VAR(2)
#else
        __VAR_DELTA(2)
#endif
#endif
#ifdef TWOPASS_VAR3
#ifdef TWOPASS_VAR3_NODELTA
        __VAR(3)
#else
        __VAR_DELTA(3)
#endif
#endif
}
else
#define yy_syncvar()
endif enum { yysave_arg_zero, yysave_arg_int, yysave_arg_asciiz };

static pass2 int yysave_callfunc_getarg( int type )
{
    /* We need at least 6 since we have at most 6 args,
     * but must also be a power of 2 (for the 'and' below)
     */
define YYBUFFS  8 int i;
    static char *asciiz_buff[YYBUFFS];
    static unsigned int asciiz_size[YYBUFFS];
    static int buff_num;

switch( type )
    {
```

```c
        case yysave_arg_zero:
            i = 0;
            break;
        case yysave_arg_int:
            YYREAD( i, int );
            break;
        case yysave_arg_asciiz:
            buff_num = (buff_num+1) & (YYBUFFS-1);
            i = strlen( yysave_ibuff ) + 1;
            if( i > asciiz_size[ buff_num ] )
            {
                if( asciiz_buff[ buff_num ] )
                    free( asciiz_buff[ buff_num ] );
                if( (asciiz_buff[ buff_num ] = (char *) malloc( i )) == NULL )
                {
                    fprintf( stderr, "Twopass: malloc failure\n" );
                    exit( -1 );
                }
                asciiz_size[ buff_num ] = i;
            }
            YYREAD_BYTES( asciiz_buff[ buff_num ], i );
            i = (int) asciiz_buff[ buff_num ];
            break;
    }
    return( i );
#undef YYBUFFS
} static pass1 void yysave_callfunc_putarg( int type, long arg )
{
    static char zero = 0;

switch( type )
    {
        case yysave_arg_zero:
            return;
        case yysave_arg_int:
            YYWRITE( arg, long );
            return;
        case yysave_arg_asciiz:
            if( arg )
                { YYWRITE_BYTES( arg, strlen((char *) arg)+1 ); }
            else
                { YYWRITE_BYTES( &zero, 1 ); }
            return;
    }
} include <stdarg.h>
typedef void (*funcptr)();

static void pass12 twopass_callfunc_null(void) {} define twopass_callfunc_override(a,b) \
        { funcptr __func = (b); \
          __twopass_stuff((a),&__func,sizeof(__func)); } long pass1 twopass_callfunc( void (*func)(), const char *types, ... )
{
    va_list ap;
    struct yy_save yysave;
    short arg_types = 0;
    long args[6];
    int t, g;
    int error_func = 0;
    long ret;

va_start( ap, types );
    for( t = 0; types && *types && t < 8; t++, types++ )
    {
        switch( *types )
        {
            case 'z': case 'Z':
                args[t] = va_arg( ap, int );
                break;
            case 'd': case 'D': case 'x': case 'X':
                args[t] = va_arg( ap, int );
                if( args[t] != 0 )
                    /* If it is zero, let the 'z' descriptor take care of it */
                    arg_types |= (yysave_arg_int << (t*2));
                break;
            case 's': case 'S':
```

```
                    args[t] = (long) va_arg( ap, char * );
                    arg_types |= ((args[t] == NULL ? yysave_arg_zero :
                                   yysave_arg_asciiz) << (t*2));
                    break;
                case 'E':
                    error_func = 1;
                    /* Fall through */
                default:
                    t--;
                    break;
            }
        } if( yypass == 1 )
        {
            yy_syncvar();

yysave.state = YYSAVE_SPECIAL;
            yysave.newtokens = YYSAVE_SPECIAL_CALLFUNC;
            yysave.data = error_func;
            YYWRITE( yysave, struct yy_save );
            YYWRITE( arg_types, short );
            ret = yysave_byteswrote + (yysave_ibuff - yysave_ibuffer);
            YYWRITE( func, funcptr );
            for( g = 0; g < t; g++ )
                yysave_callfunc_putarg( (arg_types >> (g*2)) & 3, args[g] );
        }
        else
        {
            (*func)(args[0],args[1],args[2],args[3],args[4],args[5]);
            ret = -1;
        } return( ret );
}
void pass1 _twopass_restore( void *a, const int size )
{
    struct yy_save yysave;
    if( yypass == 1 )
    {
        if( size <= YYSAVE_MAXRESTORESIZE )
        {
            yysave.state = YYSAVE_RESTORE;
            yysave.newtokens = size;
            YYWRITE( yysave, struct yy_save );
        }
        else
        {
            yysave.state = YYSAVE_SPECIAL;
            yysave.newtokens = YYSAVE_SPECIAL_BIGRESTORE;
            YYWRITE( yysave, struct yy_save );
            YYWRITE( size, int );
        }
        YYWRITE( a, void * );
        YYWRITE_BYTES( a, size );
    }
} define __VAR_BIG_CASE(num) \
        case YYSAVE_SPECIAL_VAR##num: \
        YYREAD( TWOPASS_VAR##num, TWOPASS_VAR##num##_TYPE ); \
        break;
#define __VAR_SMALL_CASE(num) \
        case YYSAVE_SMALL_VAR##num: \
        TWOPASS_VAR##num += (yysave.newtokens << 1) + yysave.data; \
        break;

pass12 void twopass_error_callfunc()
{
    struct yy_save yysave;

if( yypass == 1 )
    pass1{
        yysave.state = YYSAVE_SPECIAL;
        yysave.newtokens = YYSAVE_SPECIAL_END;
        YYWRITE( yysave, struct yy_save );

twopass_begin_pass2();
        yypass = 2;
        yysave_switchtoread();
    }
```

```
        if( yypass == 2 )
        pass2(
            yypass = 3;
            for( ;; )
            {
                YYREAD( yysave, struct yy_save );
                switch( yysave.state )
                {
                    case YYSAVE_SPECIAL:
                        switch( yysave.newtokens )
                        {
                            case YYSAVE_SPECIAL_END:
                            case YYSAVE_SPECIAL_DOPASS2:
                                return;
#ifdef TWOPASS_VAR1
                            __VAR_BIG_CASE(1)
#endif
#ifdef TWOPASS_VAR2
                            __VAR_BIG_CASE(2)
#endif
#ifdef TWOPASS_VAR3
                            __VAR_BIG_CASE(3)
#endif
                            case YYSAVE_SPECIAL_CALLFUNC:
                                {
                                    funcptr callfunc;
                                    short arg_types;
                                    long a1, a2, a3, a4, a5, a6;

YYREAD( arg_types, short );
                                    YYREAD( callfunc, funcptr );
                                    a1=yysave_callfunc_getarg( arg_types & 3 );
                                    a2=yysave_callfunc_getarg( (arg_types>>2) & 3 );
                                    a3=yysave_callfunc_getarg( (arg_types>>4) & 3 );
                                    a4=yysave_callfunc_getarg( (arg_types>>6) & 3 );
                                    a5=yysave_callfunc_getarg( (arg_types>>8) & 3 );
                                    a6=yysave_callfunc_getarg( (arg_types>>10) & 3 );
                                    if( yysave.data )
                                        (*callfunc)( a1, a2, a3, a4, a5, a6 );
                                }
                                break;
                            case YYSAVE_SPECIAL_BIGNEWTOKENS:
                                break;
                            case YYSAVE_SPECIAL_BIGRESTORE:
                                {
                                    unsigned short size;
                                    void *a;
                                    YYREAD( size, unsigned short );
                                    YYREAD( a, void * );
                                    YYREAD_BYTES( a, size );
                                }
                                break;
                            case YYSAVE_SPECIAL_STUFF:
                                {
                                    unsigned short off;
                                    YYREAD( off, unsigned short );
                                }
                                break;
                        }
                        break;
                    case YYSAVE_NEWDOPASS:
                        break;
#if defined(TWOPASS_VAR1) && !defined(TWOPASS_VAR1_NODELTA)
                    __VAR_SMALL_CASE(1)
#endif
#if defined(TWOPASS_VAR2) && !defined(TWOPASS_VAR2_NODELTA)
                    __VAR_SMALL_CASE(2)
#endif
#if defined(TWOPASS_VAR3) && !defined(TWOPASS_VAR3_NODELTA)
                    __VAR_SMALL_CASE(3)
#endif
                    case YYSAVE_RESTORE:
                        {
                            void *a;
                            YYREAD( a, void * );
                            YYREAD_BYTES( a, yysave.newtokens );
                        }
                        break;
                    default:
                        if( yysave.data )
                        {
                            unsigned short size;
```

```
                YYREAD( size, unsigned short );
                YYSEEK_BYTES( size );
            }
            break;
        }
    }
  }
} ifdef TWOPASS_YYPARSE_SPLIT
static int yyswitch( register YYSTYPE *yypvt, int yydopass );
endif int pass12
```

*Insert the first three lines begining with "yyparse()"*

```
        struct yy_save yysave;
        long yynewtokens;
        int yydopass;
        int yydopass_other;
        char yydopass_stack_real[10];
        char yydopasso_stack_real[10];
        char *yydopass_stack = &yydopass_stack_real[0];
        char *yydopasso_stack = &yydopasso_stack_real[0];
        int yypass2start = 0;

#ifdef REPORT_YYPASS
        fprintf( stderr, "Sizeof(yy_save) = %d\n", sizeof(struct yy_save) );
        fprintf( stderr, "yyparse start sbrk(0) = 0x%08x\n", sbrk(0) );
#endif
```

*Insert from comment begining with*

```
        /*
        ** Initialize externals - yyparse may be called more than once
        */
```
*up to the initialization of yychar*

```
        yypass = 1;
        yysave_buff = yysave_buffer;
        yynewtokens = 0;

yydopass = YY_NORMAL_PASS1 | YY_SAVE_PASS1 | YY_SAVE;
        yydopass_other = YY_NORMAL_PASS2;

yysave_bufferwrote = 0;
        yysave_switchtowrite();
        twopass_begin_pass1();
```

*Insert from*
```
        goto yystack;
```
*through the declaration of local variables*

```
        pass2{
            pass1{
        yy_twopass_init:
                yysave.newtokens = YYSAVE_SPECIAL_END;

yy_twopass_dopass2:
#ifdef REPORT_YYPASS
                fprintf( stderr, "pass2 sbrk(0) = 0x%08x\n", sbrk(0) );
#endif
                twopass_begin_pass2();
                yysave.state = YYSAVE_SPECIAL;
                YYWRITE( yysave, struct yy_save );
                yysave_switchtoread();
            } /* pass1 */
                yypass = 2;
                yydopass = YY_NORMAL_PASS2;
                yypvt = &yyv[yypass2start];
                goto yy_twopass;

yy_twopass_fix:
                yypvt = yypv;
                *(++yypvt) = yyval;

yy_twopass:
                YYREAD( yysave, struct yy_save );
                if( (yy_state = yysave.state) >= YYSAVE_LOWSPECIAL )
```

```
                    {
                    switch( yy_state )
                    {
                      case YYSAVE_SPECIAL:
                        switch( yysave.newtokens )
                        {
                          case YYSAVE_SPECIAL_END:
#ifdef REPORT_YYPASS
                            fprintf( stderr, "Number of SaveStates: %d\n",
                                    numsavestates );
                            fprintf( stderr, "Number of MaxNewTokens: %d\n",
                                    maxnewtokens );
                            fprintf( stderr, "Number of BigNewTokens: %d\n",
                                    numbignewtokens );
                            fprintf( stderr, "Number of SmallLineNoIncs: %d\n",
                                    numsmalllinenoinc );
                            fprintf( stderr, "Number of BigLineNoIncs: %d\n",
                                    numbiglinenoinc );
                            fprintf( stderr, "Number of Lex Tokens: %d\n",
                                    yynumlextokens );
                            fprintf( stderr, "Size of Intermediate File: %d\n",
                                    yysave_maxintersize );
#endif
                            YYACCEPT;
                            break;
                          case YYSAVE_SPECIAL_DOPASS2:
                          {
                                twopass_begin_pass1();
                                yysave_switchtowrite();
                                _TWOPASS_PASS_popdopass;
                                yypass = 1;
                                yy_pv = yypv = yypvt;
                                yy_ps = yyps;
                                yy_state = yystate = *yyps;
                                yypass2start = yypvt-yyv;
                                goto yy_newstate;
                          }
ifdef TWOPASS_VAR1
                            __VAR_BIG_CASE(1)
#endif
#ifdef TWOPASS_VAR2
                            __VAR_BIG_CASE(2)
#endif
#ifdef TWOPASS_VAR3
                            __VAR_BIG_CASE(3)
#endif
                          case YYSAVE_SPECIAL_CALLFUNC:
                          {
                            funcptr callfunc;
                            short arg_types;
                            long a1, a2, a3, a4, a5, a6;

YYREAD( arg_types, short );
                            YYREAD( callfunc, funcptr );
                            a1=yysave_callfunc_getarg( arg_types & 3 );
                            a2=yysave_callfunc_getarg( (arg_types>>2) & 3 );
                            a3=yysave_callfunc_getarg( (arg_types>>4) & 3 );
                            a4=yysave_callfunc_getarg( (arg_types>>6) & 3 );
                            a5=yysave_callfunc_getarg( (arg_types>>8) & 3 );
                            a6=yysave_callfunc_getarg( (arg_types>>10) & 3 );
#ifdef DEBUG_YYPASS
                            fprintf( stderr, "Calling 0x%08x with "
                    "(0x%08x, 0x%08x, 0x%08x, 0x%08x, 0x%08x, 0x%08x)\n",
                                    callfunc, a1, a2, a3, a4, a5, a6 );
#endif
                            (*callfunc)( a1, a2, a3, a4, a5, a6 );
                            break;
                          }
                          case YYSAVE_SPECIAL_BIGNEWTOKENS:
                          {
                            long l;
                            YYREAD( l, long );
                            yypvt += l;
                            break;
                          }
                          case YYSAVE_SPECIAL_BIGRESTORE:
                          {
                            unsigned short size;
                            void *a;
                            YYREAD( size, unsigned short );
                            YYREAD( a, void * );
                            YYREAD_BYTES( a, size );
                            break;
```

```
                }
                case YYSAVE_SPECIAL_STUFF:
                {
                    unsigned short off;
                    YYREAD( off, unsigned short );
                    break;
                }
                }
                break;
            case YYSAVE_NEWDOPASS:
                yydopass = yysave.newtokens;
                break;
#if defined(TWOPASS_VAR1) && !defined(TWOPASS_VAR1_NODELTA)
                __VAR_SMALL_CASE(1)
#endif
#if defined(TWOPASS_VAR2) && !defined(TWOPASS_VAR2_NODELTA)
                __VAR_SMALL_CASE(2)
#endif
#if defined(TWOPASS_VAR3) && !defined(TWOPASS_VAR3_NODELTA)
                __VAR_SMALL_CASE(3)
#endif
            case YYSAVE_RESTORE:
                {
                    void *a;
                    YYREAD( a, void * );
                    YYREAD_BYTES( a, yysave.newtokens );
                }
                break;
            }
            goto yy_twopass;
        }
        else
        {
#ifdef DEBUG_YYPASS
            fprintf( stderr, "Twopass @%d: state %d tokens %d yydopass %d\n",
                    yypvt-yyv, yysave.state,
                    yysave.newtokens, yydopass );
#endif
            yypvt += yysave.newtokens;
            yy_n = yyr2[ yy_state ];
            if( yysave.data )
                YYSEEK_BYTES( sizeof(unsigned short) );

if( !(yy_n & yydopass) )    /* No Action */
            {
                yypvt -= ((yy_n >> YYR2_SHIFT)-1);
                goto yy_twopass;
            }
            else
            {
                yypv = yypvt;
                yyval = (yypv -= (yy_n >> YYR2_SHIFT))[1];
                yytmp = yy_state;
                goto yy_switch;
            }
        }
        /* Should not reach here (everybody goto's above) */
    } /* pass2 */
    pass1{
```

*Insert from the following comment*

```
        /*
        ** get globals into registers.
        ** branch to here only if YYBACKUP was called.
        */
```

*up to the comment*

```
                                    /* length of production doubled with extra bit */
```

*plus one line, with the following changes:*

*after "if ( yyerrflag > 0 )*
              *yyerrflag--;"*

*insert*
      *"yynewtokens++;*
*#ifdef REPORT_YYPASS*
        *yynumlextokens++;*
*#endif"*

*after "if ( ( yy_n = yyxi[1] ) < 0 )"*
*replace "YYACCEPT" with "goto yy_twopass_init"*

*after "yy_state = yyact[ yy_n ];"*
*insert "yynewtokens++;"*

*after "yy_pv--;"*
*insert "yynewtokens--;"*

```
#ifdef REPORT_YYPASS
                       if( yynewtokens > maxnewtokens )
                           maxnewtokens = yynewtokens;
                       numsavestates++;
#endif
                       if( yynewtokens > YYSAVE_MAXSMALLNEWTOKENS ||
                           yynewtokens < 0 )
                       {
                           yysave.state = YYSAVE_SPECIAL;
                           yysave.newtokens = YYSAVE_SPECIAL_BIGNEWTOKENS;
                           YYWRITE( yysave, struct yy_save );
                           YYWRITE( yynewtokens, long );
                           yynewtokens = 0;
#ifdef REPORT_YYPASS
                           numbignewtokens++;
#endif
                       }
                       yysave.state = yytmp;
                       yysave.newtokens = yynewtokens;
                       yynewtokens = 0;
#ifdef DEBUG_YYPASS
                       fprintf( stderr, "Reduce %d len=%d States @%d yydopass=%d",
                                yytmp, yyr2[ yytmp ]>>YYR2_SHIFT, yypvt-yyv, yydopass );
endif /* If executed on second pass, save lineno */
                       if( yy_len & yydopass_other )
                           yy_syncvar();
```

*insert from    "if ( !( yy_len & 01) )"*
*          to "yypv = yy_pv;"*
*with the following changes:*
*    change "if ( !( yy_len & 01) )"*
*    to "if ( !( yy_len & yydopass) )"*
*    change all occurances of "yylen >>= 1"*
*    to "yylen >>= YYR2_SHIFT"*
*    before the line "goto yy_stack"*
*    insert "yysave.data = 0;*
*           YYWRITE( yysave, struct yy_save );"*

```
                       }
                   } /* pass1 */ pass2( /* default pass supplied by user */
    yy_switch:
#ifdef DEBUG_YYPASS
        fprintf( stderr, "Switch Called: %d\n", yytmp );
#endif
#define __WRITE_STATE \
    if( yypass == 1 ) pass1( \
        unsigned short size; \
        yysave.data = ((size = (yysave_buff - yysave_buffer)) != 0); \
        YYWRITE( yysave, struct yy_save ); \
        if( size ) { \
            YYWRITE( size, unsigned short );      \
            if( yysnum ) { int t; \
      long l = yysave_byteswrote + (yysave_ibuff - yysave_ibuffer); \
                for( t = 0; t < yysnum; t++ ) { \
                    short s = (l - yysblock[t].loc) + yysblock[t].offset; \
                    __twopass_stuff( yysblock[t].loc+2, &s, sizeof(unsigned short) ); \
                } yysnum = 0; } \
            YYWRITE_BYTES( yysave_buffer, yysave_buff-yysave_buffer); \
            yysave_buff = yysave_buffer; } }
#ifdef TWOPASS_YYPARSE_SPLIT
    { int t;
        switch( t = yyswitch( yypvt, yydopass ) )
        {
          case YY_FALLOUT:
            __WRITE_STATE;
            if( yypass == 1 )
                goto yystack;
            else
```

```
            goto yy_twopass_fix;
          break;
        case YY_TWOPASS_ERROR:
          __WRITE_STATE;
          _YERROR;
          break;
        case YY_DOPASS2:
          __WRITE_STATE;
          *(++yyps) = yystate;
          _TWOPASS_PASS_pushdopass;
          yysave.newtokens = YYSAVE_SPECIAL_DOPASS2;
          goto yy_twopass_dopass2;
          break;
        case YY_NEWYYDOPASS_RESET:
          yydopasso_stack = &yydopasso_stack_real[0];
          yydopass = YY_NORMAL_PASS1 | YY_SAVE_PASS1 | YY_SAVE;
          yydopass_other = YY_NORMAL_PASS2;
          goto yynewdopass_save;
        case YY_NEWYYDOPASS_POP:
          _TWOPASS_PASS_popdopass;
          goto yynewdopass_save;
        default: /* YY_NEWYYDOPASS + new pass codes */
        {
          struct yy_save yysave;
          _TWOPASS_PASS_pushdopass;
          yydopass = (t >> 8) & 0xff;
          yydopass_other = t & 0xff;
yynewdopass_save:
          yysave.state = YYSAVE_NEWDOPASS;
          yysave.newtokens = yydopass_other;
          YYWRITE( yysave, struct yy_save );
        }
          __WRITE_STATE;
          if( yypass == 1 )
              goto yystack;
          else
              goto yy_twopass_fix;
          break;
        }
      }
    }
} static int yyswitch( register YYSTYPE *yypvt, int yydopass )
{
#endif /* TWOPASS_YYPARSE_SPLIT */
/******** END OF CODE SUBSTITUTED BY TWOPASS **********/

/*
        ** code supplied by user is placed in this switch
        */
        switch( yytmp )
aaaa    switch( yytmp )
        goto yystack;           /* reset registers in driver code */
/******** BEGINNING OF CODE SUBSTITUTED BY TWOPASS **********/
#ifdef TWOPASS_YYPARSE_SPLIT
        return( YY_FALLOUT );
#else
} /* default pass supplied by user */
yystore_state:
    __WRITE_STATE
    if( yypass == 1 )
        goto yystack;
    else
        goto yy_twopass_fix;
yy_twopass_error:
    __WRITE_STATE
    _YERROR;
newyydopass:
    pass1{ struct yy_save yysave;
           yysave.state = YYSAVE_NEWDOPASS;
           yysave.newtokens = yydopass_other;
           YYWRITE( yysave, struct yy_save );
           goto yystore_state; }
yydopass2:
    __WRITE_STATE
    *(++yyps) = yystate;
    _TWOPASS_PASS_pushdopass;
    yysave.newtokens = YYSAVE_SPECIAL_DOPASS2;
    goto yy_twopass_dopass2;
#endif
/****** END OF CODE SUBSTITUTED BY TWOPASS ********/
aaaa    goto yystack;           /* reset registers in driver code */
aaaa    <----- end of file marker (two "aaaa" in a row)
```

Having thus described a presently preferred embodiment of the present invention, it will now be appreciated that the aspects of the invention have been fully achieved, and it will be understood by those skilled in the art that many changes in construction and circuitry and widely differing embodiments and applications of the invention will suggest themselves without departing from the spirit and scope of the present invention. The disclosures and the description herein are intended to be illustrative and are not in any sense limiting of the invention, more preferably defined in scope by the following claims.

What is claimed is:

1. A computer implemented method for compiling a first computer language into a second computer language, wherein said compiling requires at least two compilation passes, said computer implemented method comprising the steps of:

reading a compiler definition file containing a plurality of definitions of parser states for compiling said first computer language into said second computer language, and wherein said compiler definition file further contains at least one production function for execution during at least one of said parser states; and processing said compiler definition file to compile said first computer language and create said second computer language, comprising the steps of performing a first compilation pass comprising the steps of reading a source file containing statements of said first computer language and creating a plurality of tokens, one for each symbol contained in each of said statements of said source file, parsing said tokens to determine which of said plurality of parser states to perform for said tokens, wherein said parsing defines an order of performing each of said parser states, executing all said production functions identified for execution during performance of each of said plurality of parser states, and writing said parser states to a data storage area in said order of performing, performing a second pass comprising the steps of retrieving said parser states from said data storage area in said order of performing, and executing all said production functions identified for execution during performance of each of said parser states, wherein said production functions create said second computer language.

2. The computer implemented method of claim 1 wherein each of said production functions is specified for execution during said first compilation pass, or specified for execution during said second compilation pass, or specified for execution during both said first compilation pass and said second compilation pass.

3. The computer implemented method of claim 1 further comprising the step of saving data during execution of at least one of said production functions executed during said first compilation pass, and restoring said saved data during execution of said production function during said second pass, wherein said data is saved and restored at a same location in said order of performing said parser states in each of said passes.

4. The computer implemented method of claim 3 wherein said saving and restoring said data occurs between performing each of said parser states.

5. The computer implemented method of claim 3 wherein said saving and restoring said data occurs when a predefined production function is executed in each of said compilation passes.

6. The computer implemented method of claim 1 further comprising the step of identifying at least one production function in said first compilation pass for execution in said second compilation pass.

7. The computer implemented method of claim 6 further comprising the step of saving parameter data to be passed to said at least one production function in said first compilation pass and passing said parameter data to said at least one production function when said at least one production function is executed in said second compilation pass.

8. The computer implemented method of claim 1 further comprising the step of suspending processing of said first compilation pass, performing said second compilation pass to process all said parse states stored in said data storage area in said second compilation pass, and resuming processing of said first pass, when a predefined production function is executed during said first compilation pass.

9. The computer implemented method of claim 1 further comprising the step of saving data during execution of at least one of said production functions executed during said first compilation pass, and restoring said saved data during execution of said production function during said second compilation pass, wherein said data is saved at a first location in said order of performing said parser states in said first compilation pass and restored at an earlier location in said order of performing said parser states in said second compilation pass.

10. The computer implemented method of claim 9 wherein a location for said saving is identified when a first predefined production function is executed in said first compilation pass, and wherein said data is saved when a second predefined production function is executed in said first compilation pass.

11. A computer fmplemented method for compiling a first computer language into a second computer language, wherein said compiling requires at least two compilation passes, said computer implemented method comprising the steps of:

reading a compiler definition file containing a plurality of definitions of parser states for compiling said first computer language into said second computer language, and wherein said compiler definition file further contains at least one production function for execution during at least one of said parser states, and wherein each of said at least one production function is specified for execution in either a first compilation pass, specified for execution in a second compilation pass or specified for execution in both said first and said second compilation passes; and processing said compiler definition file to compile said first computer language and create said second computer language, comprising the steps of performing said first compilation pass comprising the steps of reading a source file containing statements of said first computer language and creating a plurality of tokens, one for each symbol contained in each of said statements of said source file, parsing said tokens to determine which of said plurality of parser states to perform for said tokens, wherein said parsing defines an order of performing each of said parser states, executing all said production functions specified for execution during performance of each of said plurality of parser states in said first compilation pass and executing all said production functions specified for execution during performance of each of said plurality of parser states in both said compilation passes, and writing said parser states to a data storage area in said order of performing, performing said second pass comprising the steps of retrieving said parser states from said data storage area in said order of performing, and executing all said production functions specified for execution during performance of each of said parser states in said second compilation pass and executing all said production functions specified for execution during performance of each of said parser states in both said compilation passes, wherein said production functions create said second computer language.

12. The computer implemented method of claim 11 further comprising the step of saving data during execution of at least one of said production functions executed during said first compilation pass, and restoring said saved data during execution of said production function during said second pass, wherein said data is saved and restored at a same location in said order of performing said parser states in each of said passes.

13. The computer implemented method of claim 12 wherein said saving and restoring said data occurs between performing each of said parser states.

14. The computer implemented method of claim 12 wherein said saving and restoring said data occurs when a predefined production function is executed in each of said compilation passes.

15. The computer implemented method of claim 11 further comprising the step of identifying at least one production function in said first compilation pass for execution in said second compilation pass.

16. The computer implemented method of claim 15 further comprising the step of saving parameter data to be passed to said at least one production function in said first compilation pass and passing said parameter data to said at least one production function when said at least one production function is executed in said second compilation pass.

17. The computer implemented method of claim 11 further comprising the step of suspending processing of said first compilation pass, performing said second compilation pass to process all said parse states stored in said data storage area in said second compilation pass, and resuming processing of said first pass, when a predefined production function is executed during said first compilation pass.

18. The computer implemented method of claim 11 further comprising the step of saving data during execution of at least one of said production functions executed during said first compilation pass, and restoring said saved data during execution of said production function during said second compilation pass, wherein said data is saved at a first location in said order of performing said parser states in said first compilation pass and restored at an earlier location in said order of performing said parser states in said second compilation pass.

19. The computer implemented method of claim 18 wherein a location for said saving is identified when a first predefined production function is executed in said first compilation pass, and wherein said data is saved when a second predefined production function is executed in said first compilation pass.

20. A computer implemented method for compiling a first computer language into a second computer language, wherein said compiling requires at least two compilation passes, said computer implemented method comprising the steps of:

reading a compiler definition file containing a plurality of definitions of parser states for compiling said first computer language into said second computer language, and wherein said compiler definition file further contains at least one production function for execution during at least one of said parser states; and processing said compiler definition file to compile said first computer language and create said second computer language, comprising the steps of performing a scan compilation pass comprising the steps of reading a source file containing statements of said first computer language and creating a plurality of tokens, one for each symbol contained in each of said statements of said source file, parsing said tokens to determine which of said plurality of parser states to perform for said tokens, wherein said parsing defines an order of performing each of said parser states, executing all said production functions identified for execution during performance of each of said plurality of parser states, and writing said parser states to a data storage area in said order of performing, performing at least one pass subsequent to said scan pass comprising the steps of retrieving said parser states from said data storage area in said order of performing, and executing all said production functions identified for execution during performance of each of said parser states, wherein said production functions create said second computer language.

21. The computer implemented method of claim 20 wherein each of said production functions is specified for execution during said scan compilation pass, or specified for execution during said at least one pass subsequent to said scan compilation pass, or specified for execution during said scan compilation pass and said at least one pass subsequent to said scan compilation pass.

22. The computer implemented method of claim 20 further comprising the step of saving data during execution of at least one of said production functions executed during said scan compilation pass, and restoring said saved data during-execution of said production function during said second pass, wherein said data is saved and restored at a same location in said order of performing said parser states in each of said passes subsequent to said scan compilation pass.

23. The computer implemented method of claim 22 wherein said saving and restoring said data occurs between performing each of said parser states.

24. The computer implemented method of claim 22 wherein said saving and restoring said data occurs when a predefined production function is executed in each of said compilation passes.

25. The computer implemented method of claim 20 further comprising the step of identifying at least one production function in said scan compilation pass for execution in said at least one pass subsequent to said scan compilation pass.

26. The computer implemented method of claim 25 further comprising the step of saving parameter data to be passed to said at least one production function in said scan compilation pass and passing said parameter data to said at least one production function when said at least one production function is executed in said at least one pass subsequent to said scan compilation pass.

27. The computer implemented method of claim 20 further comprising the step of suspending processing of said scan compilation pass, performing said at least one pass subsequent to said scan compilation pass to process all said parse states stored in said data storage area, and resuming processing of said scan compilation pass, when a predefined production function is executed during said scan compilation pass.

28. The computer implemented method of claim 20 further comprising the step of saving data during execution of at least one of said production functions executed during said scan compilation pass, and restoring said saved data during execution of said production function during said at least one pass subsequent to said scan compilation pass, wherein said data is saved at a first location in said order of performing said parser states in said scan compilation pass and restored at an earlier location in said order of performing said parser states in said at least one pass subsequent to said scan compilation pass.

29. The computer implemented method of claim 28 wherein a location for said saving is identified when a first predefined production function is executed in said scan compilation pass, and wherein said data is saved when a second predefined production function is executed in said scan compilation pass.

* * * * *